(12) United States Patent
Saunkeah et al.

(10) Patent No.: US 11,978,086 B2
(45) Date of Patent: May 7, 2024

(54) DYNAMIC MODIFICATION OF DIGITAL REDEMPTION TRANSACTIONS

(71) Applicant: Loop Commerce, Inc., Stamford, CT (US)

(72) Inventors: Gabriel Saunkeah, Berkeley, CA (US); Jenny Jeansonne, Stamford, CT (US); Julia McCaffrey, Stamford, CT (US); Soren Mills, Stamford, CT (US)

(73) Assignee: LOOP COMMERCE, INC., Stamford, CT (US)

( * ) Notice: Subject to any disclaimer, the term of this patent is extended or adjusted under 35 U.S.C. 154(b) by 0 days.

(21) Appl. No.: 18/186,074

(22) Filed: Mar. 17, 2023

(65) Prior Publication Data

US 2023/0298065 A1 Sep. 21, 2023

Related U.S. Application Data

(60) Provisional application No. 63/321,578, filed on Mar. 18, 2022.

(51) Int. Cl.
*G06Q 30/0226* (2023.01)
*G06Q 30/0207* (2023.01)

(52) U.S. Cl.
CPC ..... *G06Q 30/0233* (2013.01); *G06Q 30/0224* (2013.01)

(58) Field of Classification Search
CPC .................. G06Q 30/0233; G06Q 30/0224
See application file for complete search history.

(56) References Cited

U.S. PATENT DOCUMENTS

| | | | | |
|---|---|---|---|---|
| 2006/0253320 | A1* | 11/2006 | Heywood | G06Q 30/02 705/14.18 |
| 2012/0215603 | A1* | 8/2012 | Pivato | G06Q 30/0208 705/14.1 |
| 2018/0240179 | A1* | 8/2018 | Yamamoto | B41J 2/17509 |
| 2021/0365973 | A1* | 11/2021 | Guild | G06Q 30/0235 |
| 2021/0398092 | A1* | 12/2021 | Boruhovin | G06Q 20/389 |
| 2022/0343306 | A1* | 10/2022 | Jeong | G06Q 20/207 |

\* cited by examiner

*Primary Examiner* — Ilana L Spar
*Assistant Examiner* — Allan J Woodworth, II
(74) *Attorney, Agent, or Firm* — Polsinelli LLP

(57) ABSTRACT

Systems and methods describe providing alternate redemption options. One aspect involves receiving an order, analyzing consumer information using a redemption options algorithm to obtain redemption options including an alternate redemption option, providing an initial gift notification to a recipient device based on the gift order, the initial gift notification including the alternate redemption option, receiving an alternate redemption request, transmitting an alternate redemption information request, receiving alternate redemption information, adding alternate redemption information to the historical consumer information to obtain updated historical consumer information, training the redemption options algorithm using the updated historical consumer information to obtain an updated redemption options algorithm, and performing an alternate redemption action set using the alternate redemption information. Alternate redemption options may include an option to regift a gift, to donate the value of a gift to a donation recipient, and/or to donate a positive balance remaining after the redemption of a gift.

32 Claims, 11 Drawing Sheets

DYNAMIC MODIFICATION OF DIGITAL REDEMPTION TRANSACTIONS

CROSS-REFERENCE TO RELATED APPLICATIONS

This application claims the benefit of U.S. Provisional Application No. 63/321,578, filed Mar. 18, 2022, titled "DYNAMIC MODIFICATION OF DIGITAL REDEMPTION TRANSACTIONS," which is hereby incorporated by reference, in entirety and for all purposes.

FIELD

The present disclosure relates to systems and methods for dynamically providing alternate gift redemption options, including regifting and donation, to a recipient of a gift.

BACKGROUND

There are several ways to purchase and send gifts to friends and family, including purchasing an item directly in a store, purchasing the item online and delivering it to the gift recipient, reimbursing someone for purchasing a gift for him/herself, purchasing an item on a gift registry, or purchasing a gift card. Gift buying is a personal gesture. One where much thought and creativity goes into. When a buyer puts in the thought of selecting a gift on her/his own, the buyer cares about the perceived effort and thoughtfulness put into selecting the gift. The buyer wants the recipient to know that effort and thoughtfulness existed in the process and the buyer has specifically thought about the recipient when making the purchase.

In many cases, buyers wanting to purchase a gift online and send a personal and thoughtful gift are unable to do so due to constraints. For example, the constraints can include: not knowing exactly what to get and the social awkwardness of asking the recipient; not getting enough support at the time of purchase to find the 'right gift', not knowing personal attributes such as size or color of a product; not knowing the physical address required to ship the gift to; inability to get the gift they want delivered on time; etc. An alternative stemming from these constraints on a gift purchase could be purchasing a gift card. However, the gift card leaves the gift buyer unsatisfied and frustrated because the buyer could not convey the thoughtfulness in choosing a personal and unique gift and because the buyer is forced to highlight the amount given for the gift instead of the thoughtfulness of the gift. The recipient is sometimes also left unsatisfied with the gift or gift card, as there is a disappointment in the lack of effort and thoughtfulness put into the gift buying process on behalf of the buyer. When a buyer uses a gift registry or allows a recipient to select a gift on his/her own, the element of surprise is ruined.

In addition, recipients getting the wrong gift are left with the hassle of returning or exchanging the gifts, which is unpleasant. The thought of a return or an exchange may also frustrate the buyer knowing that they are purchasing a gift that most likely would be returned or exchanged.

Aside from the consumer, online merchants have high operational costs due to excess returns and exchanges. The online merchants further lose sales due to inability to complete transactions online due to the situations described above ending in shopping cart abandonment. Many merchants further lack brand awareness for being a gift destination as they carry items that are hard to gift, such as clothing or cosmetics. Even with the multitude of online gift cards and gift registry services, buyers and recipients are still left unsatisfied with the balance between personalization and ease of gift transactions.

SUMMARY

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and such references mean at least one of the embodiments.

One aspect is a system. The system includes one or more processors and memory storing thereon instructions that, as a result of being executed by the one or more processors, cause the system to: receive a gift order, analyze historical consumer information using a redemption options algorithm to obtain redemption options including an alternate redemption option, provide an initial gift notification to a recipient device based on the gift order, the initial gift notification including the alternate redemption option, receive an alternate redemption request, transmit an alternate redemption information request, receive alternate redemption information, add alternate redemption information to the historical consumer information to obtain updated historical consumer information, train the redemption options algorithm using the updated historical consumer information to obtain an updated redemption options algorithm, and perform an alternate redemption action set using the alternate redemption information.

Another aspect is a non-transitory computer readable medium. The non-transitory computer readable medium includes instructions that, when executed by one or more processors of a device, cause the device to: receive a gift order, analyze historical consumer information using a redemption options algorithm to obtain redemption options including an alternate redemption option, provide an initial gift notification to a recipient device based on the gift order, the initial gift notification including the alternate redemption option, receive an alternate redemption request, transmit an alternate redemption information request, receive alternate redemption information, add alternate redemption information to the historical consumer information to obtain updated historical consumer information, train the redemption options algorithm using the updated historical consumer information to obtain an updated redemption options algorithm, and perform an alternate redemption action set using the alternate redemption information.

Another aspect is a computer-implemented method. The computer-implemented method comprises receiving a gift order, analyzing historical consumer information using a redemption options algorithm to obtain redemption options including an alternate redemption option, providing an initial gift notification to a recipient device based on the gift order, the initial gift notification including the alternate redemption option, receiving an alternate redemption request, transmitting an alternate redemption information request, receiving alternate redemption information, adding alternate redemption information to the historical consumer information to obtain updated historical consumer information, training the redemption options algorithm using the updated historical consumer information to obtain an updated redemption options algorithm, and performing an alternate redemption action set using the alternate redemption information.

Some such aspects operate where the alternate redemption information includes a regift recipient identifier, and wherein performing the alternate redemption action set includes transmitting an updated gift notification using the regift recipient identifier.

Some such aspects operate where the alternate redemption information includes a regift recipient identifier, and wherein performing the alternate redemption action set includes delivering a gift to a regift recipient associated with the regift recipient identifier based on the alternate redemption information.

Some such aspects operate where performing the alternate redemption action set includes transmitting a gift redemption information request including a plurality of gift customization options.

Some such aspects operate where performing the alternate redemption action set includes transmitting a gift redemption information request including an alternate gift option.

Some such aspects further comprise decrementing, in response to receiving the alternate redemption request, a regift counter, where the regift counter is initially set to a maximum allowed regifts quantity, and where, when the regift counter reaches zero, no additional regift offers are presented in association with a gift corresponding to the gift order.

Some such aspects operate where the alternate redemption request includes a donation request.

Some such aspects operate where the alternate redemption information request includes a plurality of donation recipient options, and the plurality of donation recipient options are determined by a gifting entity associated with the gift order.

Some such aspects operate where performing the alternate redemption action set includes transmitting a donation information set associated with the gift order, wherein the donation information set comprises a donation recipient selection, and wherein, when the donation information set is received at a gifting entity device, a gifting entity associated with the gifting entity device initiates a donation using the donation recipient selection.

The computer-implemented method of claim 1, wherein the alternate redemption information includes a donation recipient selection, and performing the alternate redemption action set includes initiating a donation based on the donation recipient selection, wherein the donation is based on a value of a gift associated with the gift order.

Some such aspects operate where the alternate redemption information includes a donation recipient selection, and performing the alternate redemption action set includes transmitting donation information, wherein when the donation information is received at the recipient device, a recipient associated with the recipient device initiates a donation using the donation information.

Some such aspects operate where the alternate redemption information includes a donation recipient selection, and performing the alternate redemption action set comprises: determining a value of a gift associated with the gift order; determining an alternate value representation based on the value and the donation recipient selection; and transmitting the alternate value representation to the recipient device.

Some such aspects operate where performing the alternate redemption action set comprises: determining a difference between a value of a gift associated with the gift order and a redeemed gift associated with the alternate redemption information to obtain a value difference, and transmitting a donation option to a gifting entity device associated with the gift order, wherein the donation option facilitates a donation of the value difference by a gifting entity associated with the gifting entity device.

Some such aspects operate where performing the alternate redemption action set comprises: determining a difference between a value of a gift associated with the gift order and a redeemed gift associated with the alternate redemption information to obtain a value difference; and transmitting a donation option to the recipient device, wherein the donation option facilitates a donation of the value difference by a recipient associated with the recipient device.

Reference to "one embodiment", one or more embodiments, or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Figure 1:
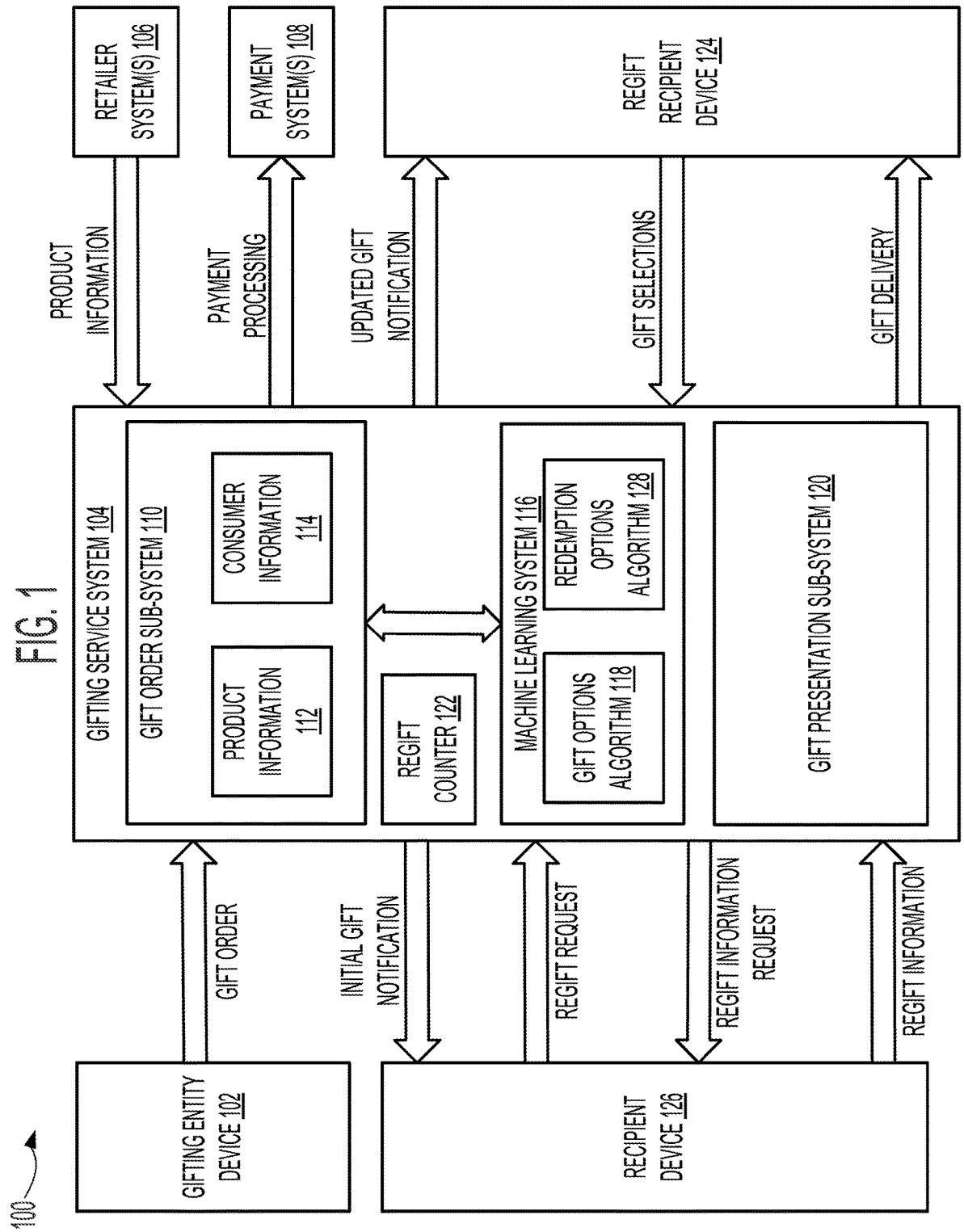
FIG. 1 shows an illustrative example of an environment in which a gifting entity interacts with a gifting service system via a gifting entity device in order to provide a productor other item as a gift to a recipient, and in which the intended recipient is provided an alternate gift redemption option to regift the gift from the gifting entity to another recipient.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Entities, such as consumers and businesses, may decide to provide a gift to a recipient. The gift may be redeemed via a process in which the recipient uses a recipient device to interact with a gifting service system to view details associated with the gift, make various gift customization selections, provide various items of information related to receiving the gift (e.g., delivery information, recipient information, etc.), etc. However, in both consumer and corporate gifting scenarios, a recipient of a gift may not want or need an item they were gifted, or may desire to give the gift to a separate recipient. Additionally, in scenarios where a recipient chooses to redeem a gift, the value of the gift redeemed may differ from the value of the gift the gifting entity paid to provide. As an example, the gifting entity may have provided payment for a gift item, but the cost of the gift decreased prior to the redemption of the gift by the recipient. As another example, a recipient may have been presented alternate gift options, and selected an alternate gift option that costs less than the gift item gifted by the gifting entity. In either case, the value difference may result in a positive balance, which may be provided to the gifting entity or to the recipient.

Embodiments disclosed herein may provide a framework for dynamically providing alternate gift redemption options to gift recipients that do not want or need a gifted item, that desire to provide the gift to a separate recipient, and/or have a positive balance remaining after a gift redemption. In one or more embodiments, the alternate gift redemption options may include an option to regift the gift to a separate recipient. In one or more embodiments, the alternate gift redemption options may include an option to donate the value of the gifted item (e.g., to a charity). In one or more embodiments, the alternate gift redemption options may include providing the recipient or the gifting entity (i.e., the entity purchasing or otherwise providing a gift for a recipient) an option to donate a balance remaining after a gift is redeemed by the recipient in scenarios where the cost of the redeemed gift was less than the purchase price paid by the gifting entity, resulting in the left over balance.

Whether alternate gift redemption options are presented to a recipient, and/or which alternate gift redemption options are presented, may be dynamically determined by a gifting service system when generating an initial gift notification to be transmitted to a recipient device of the intended recipient of a gift. Such a dynamic determination may be based on historical information and/or information obtained in real-time associated with the gifting entity, the recipient, the product being gifted, and/or any combination thereof.

FIG. 1 shows an illustrative example of an environment 100 in which a gifting entity (e.g., a consumer, a corporate entity, etc.) interacts with a gifting service system 104 via a gifting entity device 102 in order to provide a product (e.g., goods, services) or other item (e.g., gift card, coupon, etc.) as a gift to a recipient (not shown), and in which the intended recipient is provided an alternate gift redemption option to regift the gift from the gifting entity to another recipient. A gift may be any item, such as a product, service, gift card, coupon, etc. Other items may be gifts without departing from the scope of embodiments described herein.

Figure 11:
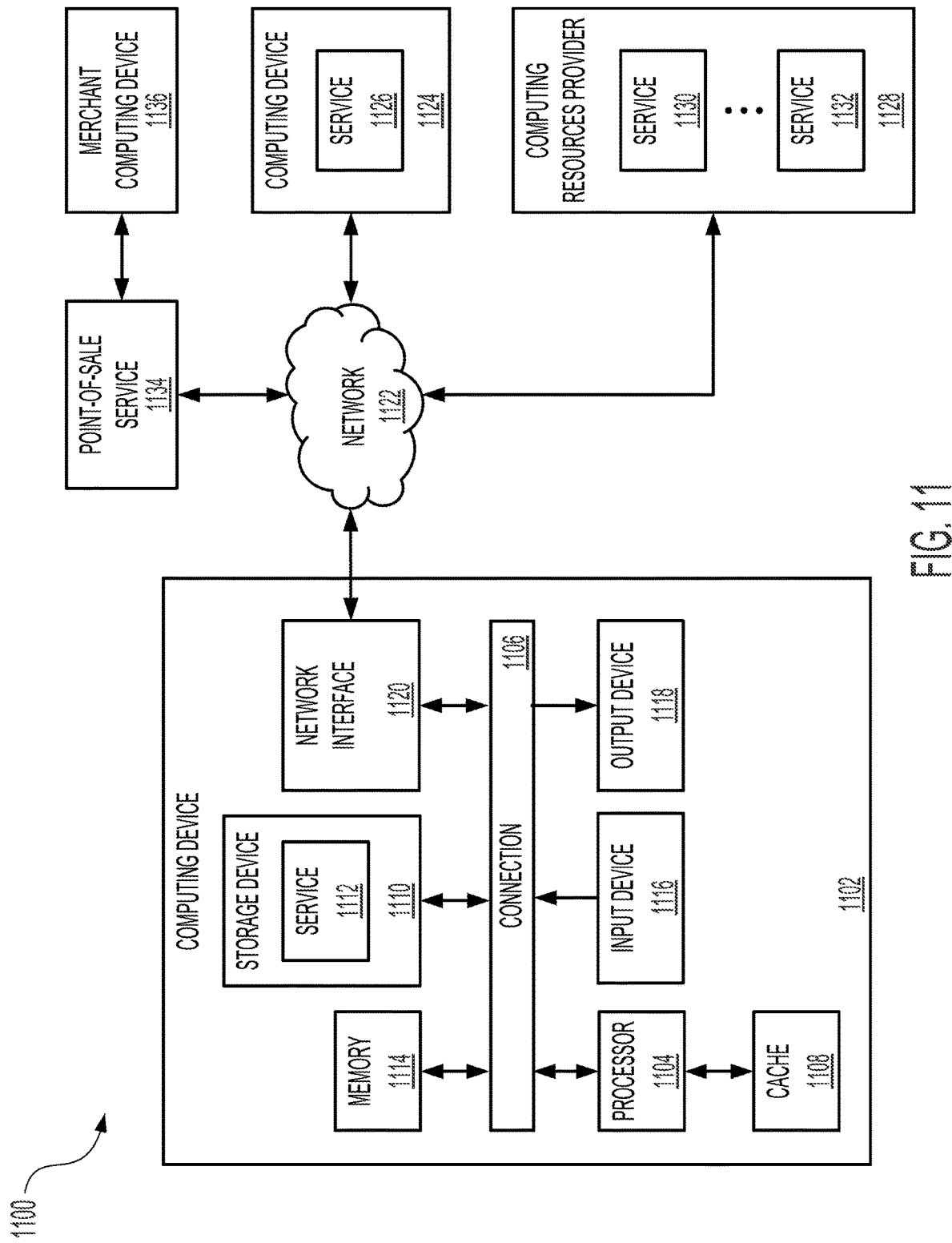
FIG. 11 shows a computing system architecture including various components in electrical communication with each other using a connection in accordance with various embodiments.

The gifting entity device 102 may be a computing device such as the computing device 1102 described herein at least in connection with FIG. 11. The computing device may be, for example, a laptop computer, a desktop computer, a smartphone, a tablet, a smart watch, or any other type of computing device such as those described herein. As another example, an entity, such as a business, non-profit organization, charity, etc. may offer gifts to consumers online or in a physical establishment setting (e.g., a retail establishment, trade show, etc.). In such a scenario, the entity may use a gifting entity device 102 to interact with the gifting service prior to an offer of a gift being made in order to provide details about at least one gift option that may be offered to one or more potential recipients. As an example, a company may use the gifting entity device 102 to provide information about a customizable item (e.g., team jersey, bottled beverage, etc.) that the company would like to offer to potential recipients at a tradeshow, in a retail establishment, or online, which may be facilitated by the gifting service system 104.

The gifting service system 104 may be one or more computing devices such as the computing device 1102 described herein at least in connection with FIG. 11. As an example, the gifting service system 104 may be one or more server computing devices controlled or otherwise used by a gifting service (not shown). In one or more embodiments, a gifting service is any entity that provides a framework through which gifting entities can order gifts to be provided to recipients.

In one or more embodiments, the gifting entity, via the gifting entity device 102, selects a gift and transmits a gift order to the gifting service system 104. As an example, when the gifting entity is a consumer, the gift may be selected after the consumer views one or more advertisements on the gifting entity device that advertise one or more gift options to the consumer. Such advertisements may, for example, be based on historical data and/or data obtained in real-time about the consumer, which may be included in consumer information 114 stored by the gifting service system 104. Historical data associated with a consumer may include, but is not limited to, browsing history, search history, previous gift sending history, information gained from a consumer during previous interactions between the consumer and the gifting service system 104 and/or any number of retailer systems 106, data related to consumers obtained via various online sources (e.g., cookies, clickstream data, search data, purchase data, user profile data, etc.), data corresponding to content presented on a website or application (e.g., dates, product details, images, videos, other advertisements, comments, news stories and headlines, etc.), data obtained from e-mails or social media posts/comments, etc.

Such advertisements may further be based on product information received from one or more retailer system(s) 106. The retailer system 106 may be one or more computing devices such as the computing device 1102 described herein at least in connection with FIG. 11. As an example, the retailer system 106 may be one or more server computing devices controlled or otherwise used by a retailer (not shown). In one or more embodiments, a retailer is any entity that offers for sale any number of products (i.e., goods and/or services).

In one or more embodiments, product information is information related to any product that may be offered by one or more retailer system(s) 106, which may be stored as product information 112 by the gifting service system 104. Product information may include categorization information defining what one or more categories of products that a given product is in. Product information may include product pricing information. Product information may include information related to inventory levels of one or more products of a retailer. Product information may include any other information related to any number of products without departing from the scope of embodiments described herein. Product information may be dynamically updated. As an example, retailers, via the retailer system(s) 106, may provide updated and/or new product information from time to time, which may be used to dynamically update the product information 112.

In one or more embodiments, the gifting service system 104 includes a gift order sub-system. The gift order sub-system 110 may be implemented on one or more computing devices of the gifting service system 104, or any portion thereof. Alternatively, the gift order sub-system 110 may be implemented as an application or other executable process on one or more computing devices of the gifting service system 104.

In one or more embodiments, the gift order sub-system 110 is configured, at least in part, to generate gift advertisements, and to transmit said advertisements to the gifting entity device 102. The gift order sub-system 110 may include storage of any type (e.g., storage device 1110 of FIG. 11), and store thereon product information 112 (described above) and consumer information 114. Consumer information 114 may be any information related to any number of gifting entities, such as information associated with a consumer (described above) or associated with any other gifting entity, such as a corporation or other business entity. Consumer information 114 may also include any information associated with any number of possible gift recipients. Such information may include historical information. As an example, information about gifting entities and/or potential gift recipients may have previously been obtained by the gifting service system 104, such as through previous interactions with between the gifting entities and/or potential gift recipients and the gifting service system 104, or via any other technique for obtaining information associated with an entity, such a search data, purchase data, user profile data, social media data, clickstream data, etc. As another example, consumer information 114 may also include information obtained in real-time, which may be dynamically added to the consumer information 114 as it is obtained about a particular gifting entity and/or potential gift recipient.

In one or more embodiments, an advertisement to a gifting entity related to giving a gift to a recipient may be based on and/or generated, at least in part, using the product information 112, the consumer information 114, or any combination thereof. The advertisement may advertise any number of possible gift options or ideas. As an example, the advertisement may be based on contextual signals, such as the time of year (e.g., Mother's Day, a social media friend's birthday, etc.), content being viewed on a website, social media posts, etc., and the gift options may relate to the contextual signals (e.g., related to the relevant holiday, related to content being viewed, etc.) The advertisement may include any information about any number of possible gift options, such as images, descriptions, prices, available customization options, etc. The advertisement may be presented in any format. Examples include, but are not limited to, advertisements appearing on a webpage being viewed in a browser application on the gifting entity device 102, advertisements appearing in conjunction with a social media account of a gifting entity, advertisements presented as a gifting entity is making one or more purchases (e.g., from the retailer system 106), etc. In one or more embodiments, an advertisement for one or more gift options may include an interactive element that a gifting entity may use to initiate the process for selecting a gift to be sent to a recipient.

Examples of such an interactive element include, but are not limited to, a button, a text hyperlink, a Quick Response (QR) code, etc.

Although the above-description contemplates a gifting entity using a gifting entity device 102 to initiate a gift order in response to an advertisement, gift orders may be initiated without such an advertisement. As an example, a gifting entity may choose to navigate to a website provided by the gifting service system 104 can initiate a gift order without having viewed an advertisement of one or more gift options. As another example, the gifting entity may be an entity (e.g., a company) that has a pre-existing relationship with the gifting service and initiates a gift order by interacting with the gifting service system 104 to facilitate being able to offer one or more gifts to potential recipients (e.g., at a trade show).

In one or more embodiments, the gifting service system 104 includes a machine learning system 116. The machine learning system 116 may be implemented on one or more computing devices of the gifting service system 104, such as the computing device 1102 described herein at least in connection with FIG. 11, or any portion of such computing devices. Additionally or alternatively, the machine learning system 116 may be implemented as an application or other executable process on one or more computing devices of the gifting service system 104.

The machine learning system 116 may include a gift options algorithm 118 that is configured to analyze consumer information 114 (e.g., gifting entity information, recipient information, etc.), product information 112, or any combination thereof, to determine gift options to present to a gifting entity via the gifting entity device 102.

The gift options algorithm 118 may be implemented on one or more computing devices of the gifting service system 104, such as the computing device 1102 described herein at least in connection with FIG. 11, or any portion of such computing devices. Additionally or alternatively, the gift options algorithm 118 may be implemented as an application or other executable process on one or more computing devices of the gifting service system 104.

In one or more embodiments, when the gifting service system 104 presents gift options to a gifting entity (e.g., in an advertisement, on a website of the gifting service, etc.), the gifting service system 104 may invoke the gift options algorithm 118 of the machine learning system 116 to determine what gift options to present. As an example, the gift options algorithm may include a machine learning model that is trained to use historical data and data obtained in real-time about the gifting entity, similar gifting entities, products from retailers, etc. (e.g., the product information 112 and the consumer information 114) to predict gift options that a gifting entity may be more likely to select as a gift to provide to a recipient. In one or more embodiments, additional product information 112 and consumer information 114 are obtained in real-time, combined with the results of offering gift options to gifting entities (e.g., whether or not a gifting entity selected an option to provide as a gift to a recipient), and added to a training data set for the gift options algorithm 118 in order to dynamically update the gift options algorithm 118 in real-time.

In one or more embodiments, a gifting entity, via the gifting entity device 102, selects a gift from among presented gift options, or decides on a gift for which the gifting entity may provide information, and transmits a gift order to the gifting service system 104. In one or more embodiments, a gift order is an order for a gift that is to be provided to one or more recipients (not shown). As discussed above, the gift order may be in response to an advertisement of one or more gift options presented to a gifting entity. A gift order may also be an order for a gift selected by a gifting entity separate from and prior to transmitting a gift order to the gifting service system 104. As an example, a business entity may desire to offer as a gift one or more specific items to recipients. For example, a business may have a booth at a trade show, and offer a sports team jersey that can be customized with the name of the recipient, and thus place gift orders for said jerseys with the gifting service system 104.

In one or more embodiments, a gift order is transmitted from the gifting entity device 102 to the gifting service system 104 over a network (not shown), such as the network 1122 described herein at least in connection with FIG. 11. In one or more embodiments, a gift order includes any information related to a gift selected by a gifting entity to give to a recipient, such as an identification of the gift selected by the gifting entity (e.g., from among various gift options presented), any customization options related to the gift, and/or information associated with the intended recipient of the gift (e.g., name, contact information such as email address, etc.). In certain scenarios, information associated with the intended recipient may not be included with the gift order. As an example, a gifting entity may be a business that sets up a booth in a retail establishment from which the business intends to provide gifts to consumers (i.e., gift recipients). In such a scenario, the business may generate a gift order when a consumer approaches the booth and is interested in receiving the gift. The consumer (i.e., the gift recipient) may then use a device provided by the business and/or their own device to provide gift recipient information.

As another example, a gifting entity may be a consumer using a browser application (not shown) of the gifting entity device 102, who is provided an advertisement from the gifting service system 104 while viewing the content of a webpage and interacts with an interactive element (e.g., a button) of the advertisement to initiate a gift selection process, select a particular gift, and provide relevant additional information (e.g., name and contact information for the intended gift recipient), in order to place a gift order with the gifting service system 104. As another example, a gifting entity may be a corporation that interacts with the gifting service system 104 via the gifting entity device 102 to have the gifting service system 104 prepare to facilitate providing the gift to potential recipients that interact with the corporation (e.g., online, at a trade show, at a retail establishment, etc.).

In one or more embodiments, the gift order is received at the gift order sub-system of 110 of the gifting service system 104. The gift order sub-system 110 may interact further with the gifting entity device 102 in order to obtain any additional information to complete the gift order. For example, if intended recipient information was not included in the gift selection, the gift order sub-system 110 may request such information from the gifting entity device 102. As another example, the gift order sub-system may request any additional information related to the gift being ordered (e.g., color, size, etc.). As another example, the gift order sub-system 110 may request payment information from the gifting entity so that the gift may be paid for. In one or more embodiments, the gifting order sub-system may further transmit transaction information for purchase of the gift to one or more payment systems 108 for payment authorization and processing.

As an example, a gift order process may include presenting a page including the one or more gift options to the gifting entity associated with the gifting entity device 102 that includes an interactive element (e.g., a button) that, when selected (after selecting a gift if more than one is offered), navigates the gifting entity to another page where additional information is requested from the gifting entity. The page may include any number of different requests for information. As an example, the page may request that the gifting entity select a communication channel (e.g., email, text, messenger service, printed mail delivery, etc.) through which the gifting entity wants the intended recipient to receive notification of the gift. As another example, the page may include a request for a recipient identifier. The recipient identifier may include the name of the intended recipient of the gift, as well as information that facilitates the receipt, by the recipient, of a notification of the gift. The portion of the recipient identifier information facilitating the notification may be based on the communication channel selected (e.g., email address if email is selected, phone number if text message is selected, messenger service name or handle if messenger service is selected, address if mail delivery is selected, etc.). As another example, the page may include a request for the gifting entity to provide the gifting entity's name and, optionally, a message to be delivered to the recipient as part of the notification of the gift. As another example, the page may include a request for the gifting entity to select from among various options for virtual gift wrapping that will appear in the notification. Although the above description contemplates various presentations and pages provided to the consumer to complete the gift order process, all or any portion of the presentations and pages may be combined into a single page, or divided differently into separate pages without departing from the scope of embodiments described herein.

In one or more embodiments, once the gifting entity makes all requested selections and provides all requested information (which may be referred to collectively as a gift order), the gifting entity device 102 transmits the gift order to the gifting service system 104. The gift order may be transmitted over a network (e.g., network 1122 of FIG. 11), and the various items of information included as part of the gift order may be sent as part of the same transmission, or broken into any number of separate transmissions to the gifting service system 104. In response to receipt of the gift order from the gifting entity device 102, the gifting service system 104 may generate an initial gift notification, and transmit the initial gift notification to a recipient device 126 associated with the intended recipient of the gift. The recipient device 126 may be a computing device such as the computing device 1102 described herein at least in connection with FIG. 11. The computing device may be, for example, a laptop computer, a desktop computer, a smartphone, a tablet, a smart watch, or any other type of computing device such as those described herein. The initial gift notification may be generated by a gift order sub-system 110 of the gifting service system 104.

In one or more embodiments, the initial gift notification is transmitted to the recipient device 126 using a communication channel selected by the gifting entity, which may include using at least a portion of the recipient identifier provided by the gifting entity (or the intended recipient, depending on the scenario). For example, if email was selected as the communication channel, the initial gift notification may be transmitted using an email address of the recipient provided by the gifting entity. As another example, if text message was selected as the communication channel, then a phone number of the recipient associated with the recipient device 126 may be used to send the initial gift notification. As another example, the gifting entity may be a business or other entity that is offering a gift to a recipient that is physically present (e.g., at a retail establishment, a trade show, etc.). In such a scenario, the initial gift notification may be provided to the recipient on a device provided by the gifting entity to the recipient, or via a QR code (or any similar mechanism) that the recipient scans on their own recipient device 126.

In one or more embodiments, the initial gift notification includes an indication that the recipient has been sent a gift. The indication may or may not identify the sender of the gift (e.g., "Kelly got you a gift!"). The initial gift notification may include any other information without departing from the scope of embodiments described herein. As an example, the initial gift notification may include an image of virtual gift wrapping, and an interactive element that, when selected by the recipient, reveals (e.g., "unwraps") the gift. The interactive element may include a signal indicating to the recipient to select the interactive element to begin the gift redemption process (e.g., "SEE YOUR GIFT") As another example, the initial gift notification may include explanatory information that provides the recipient with various details related to the receipt of the gift (e.g., "You have received a gift. To redeem your gift, select the button above, and provide your address to have your gift shipped to you"). As another example, the initial gift notification may include information that provides the recipient with other details about the gift redemption process (e.g., that the recipient will have the option to exchange the gift for another gift, that the recipient will have the option to select certain customization options related to the gift, etc.).

In one or more embodiments, when the recipient selects to reveal the gift using the interactive element of the gift notification, or otherwise views the gift, the recipient may be navigated to a page that displays the gift that was selected by the gifting entity in the gift order. The display of the gift may include an image of the gift, the name of the gift, details related to the gift, etc. The page may also include an interactive element that, when selected, continues the gift redemption process. The interactive element may include a signal to the recipient indicating that the recipient should select the interactive element (e.g., a button) to continue the gift redemption process. For example, the interactive element may include text, such as "REDEEM YOUR GIFT". In one or more embodiments, the page is generated by the gift order sub-system 110.

In one or more embodiments, a page that allows a recipient to redeem a gift (e.g., via an interactive element) may also include one or more alternate redemption options. A recipient may not want or need a gift provided from the gifting entity, or may desire to provide the gift to another recipient. In such scenarios, the page provided may include one or more additional interactive elements that provide alternate redemption options. Such alternate redemption options may include, for example, an option to regift the gift to a regift recipient. In one or more embodiments, regifting is a process by which a gift recipient can select to begin a process for providing the gift to another recipient. The gifting entity that provided (and paid for) the gift may not be notified that the recipient has decided to regift the gift, or be provided any information about an intended regift recipient. In one or more embodiments, regifting a gift counts as a redemption of the gift.

In one or more embodiments, whether a recipient of a gift is presented with an option to regift the gift is determined, at least in part, using a redemption options algorithm 128 of the machine learning system 116 of the gifting service system 104. The redemption options algorithm 128 may be configured to analyze consumer information 114 (e.g., gifting entity information, recipient information, etc.), product information 112, or any combination thereof, to determine whether to present a regift option to the recipient device 126.

The redemption options algorithm 128 may be implemented on one or more computing devices of the gifting service system 104, such as the computing device 1102 described herein at least in connection with FIG. 11, or any portion of such computing devices. Additionally or alternatively, the redemption options algorithm 128 may be implemented as an application or other executable process on one or more computing devices of the gifting service system 104.

In one or more embodiments, the redemption options algorithm 128 is invoked by the gifting service system 104 in response to receiving or otherwise obtaining a gift order from the gifting entity device 102. The redemption options algorithm 128 may include any number of rules to be evaluated in order to determine whether a regift option should be provided to the recipient device 126. As an example, the redemption options algorithm 128 may include a rule that evaluates whether the gift order included an indication from the gifting entity that regifting should or should not be allowed. Based on an evaluation of such a rule, the redemption options algorithm 128 may only provide the regift option to the recipient when the gift order includes an indication that regifting is to be allowed for the gift, or, alternatively, that the gift order does not include an indication that regifting is not to be allowed for the gift.

As another example, the redemption options algorithm 128 may include a rule to evaluate various aspects of the gift selected by the gifting entity to determine whether the initial gift notification should include a regift option. The redemption options algorithm 128 may include evaluation of rules related to the price of the gift (e.g., regifting option to be presented only when gift is over a certain price, under a certain price, within a certain price range, etc.). For example, the redemption options algorithm 128 may include a rule that a purchase of more than $100 qualifies the gift to have a regift option presented to the recipient.

As another example, the redemption options algorithm 128 may include evaluating a rule that indicates that gifts of a certain type, brand, etc. may or may not qualify to have a regift option presented to a recipient. For example, the rule, when evaluated, may indicate, at least in part, that a regift option may be presented for a gift of a product from Brand X, but not from Brand Y.

The redemption options algorithm 128 may include rules that indicate that gift orders made within a certain data range qualify to allow a regift option to be presented to a recipient. For example, the redemption options algorithm 128 may include a rule that any gift order made in the month of February qualifies to allow a regift option to be presented to a recipient.

The redemption options algorithm 128 may include rules that a recipient having certain demographic characteristics qualifies for to receive a regift option. For example, the redemption options algorithm 128 may include a rule that any recipient in a certain geographic region, that is of a certain age, that is married, etc. qualifies to allow a regift option to be presented to a recipient.

The redemption options algorithm 128 may include logic that indicates a relationship between the quantity of a selected gift in a gift order that exists in the inventory (e.g., of a retailer, of a gifting entity, etc.) and whether a regift option may be presented. As an example, a regift option may not be presented if the selected gift does not exist in sufficient quantity in inventory, as the gift may be more likely to become unavailable for redemption by a regift recipient. In one or more embodiments, inventory information related to products that may be selected as gifts by a gifting entity may be included in the product information 112 of the gift order sub-system 110, which the redemption options algorithm 128 may analyze as part of making a determination as to whether a regift option should be presented to a gift recipient.

In one or more embodiments, the above-described rules, and/or any other such rules, may be evaluated by the redemption options algorithm 128 in any combination to determine whether a regift option should be presented to a recipient. As an example, a combination of rules may be evaluated by the redemption options algorithm 128 that indicate that a regift option may be presented when a gift order explicitly includes an indication that the gifting entity wants to allow regifting, the selected gift exists in sufficient quantity in the inventory of a retailer, and the price of the gift is over $25.

In one or more embodiments, the redemption options algorithm 128 may be or include a machine learning model (which may also be referred to as an artificial intelligence model) that is trained to determine whether to present a regift option to a recipient of a gift. As an example, historical product information 112 and/or consumer information 114 may be combined with previous outcomes (e.g., a regift option was presented and selected, a regift option was not presented and the gift was not redeemed, a regift option was presented and not selected, etc.) to create a training data set for the machine learning model. In one or more embodiments, when an initial gift notification is transmitted from the gifting service system 104 to the recipient device 126, consumer information 114 and/or product information 112, historical and/or obtained in real-time, may be used as input to the trained machine learning model to predict whether presenting a recipient with an option to regift a gift results in a positive outcome, such as the recipient being more likely to engage the services of the gifting service associated with the gifting service system 104 in the future. In one or more embodiments, if the prediction of the machine learning model has a confidence level above a defined threshold, then the redemption options algorithm 128 may make a determination that a regift option should be presented to the recipient.

Other machine learning techniques may be used as part of the redemption options algorithm 128 without departing from the scope of embodiments described herein. As an example, a clustering machine learning algorithm (e.g., k-means clustering algorithms, fuzzy c-means (FCM) algorithms, expectation-maximization (EM) algorithms, hierarchical clustering algorithms, density-based spatial clustering of applications with noise (DBSCAN) algorithms, etc.) may be used to identify whether the product information 112 and/or consumer information 114 associated with the gift order and intended gift recipient include characteristics similar to other scenarios for which a regift option resulted in a positive outcome.

In one or more embodiments, when the redemption options algorithm 128 determines that a regift option should be presented to a recipient of a gift, the regift option is included in an initial gift notification. In one or more embodiments, the initial gift notification is generated by the gift order sub-system 110, and transmitted from the gifting service system 104 to the recipient device 126. In one or more embodiments, the regift option is included in the initial gift notification as an interactive element, such as a button, text hyperlink, QR code, etc. The interactive element may include and/or be accompanied by a signal to the recipient that the option to regift the gift presented in the initial gift notification is available (e.g., a button that includes the text "Re-Gift this to someone else").

The regift option interactive element may accompany any number of other items in the initial gift notification, such as information related to the gift that was selected by the gifting entity to gift to the recipient, an option to decline the gift, and/or options to exchange the gift, such as for a gift card or for one or more alternate gift options. Alternatively, the initial gift notification may include information related to the gift (e.g., an image, gift details, etc.) and a request for the recipient to indicate whether they want to begin a redemption process. In such a scenario, the regift option, decline option, and/or alternate gift options may be presented on a subsequent page to which the recipient is navigated upon using an interactive element in the initial gif notification to redeem the gift.

Any alternate gift options presented to the recipient may be determined by the gift options algorithm 118. For example, the a machine learning model of the gift options algorithm may use as input all or any portion of the consumer information 114 and/or the product information 112, which may be historical and/or obtained in real-time, in order to predict any number of alternate gift options that a recipient may be more likely to accept.

In one or more embodiments, when a recipient uses an interactive element to indicate a desire to regift a gift to a separate recipient, either from the initial gift notification or from a subsequent page in the redemption process, the indication, which may be referred to as a regift request, is transmitted from the recipient device 126 to the gifting service system 104. In one or more embodiments, the transmission of the regift request initiates a regift process. In one or more embodiments, the regift process includes the gifting service system 104 requesting various items of information from the recipient, which may be presented as one or more pages transmitted to the recipient device 126. Each page may request all or any portion of the information necessary to regift the gift.

As an example, the regift information request may be presented to the recipient device 126 as a series of pages that request that the recipient associated with the recipient device 126 provide the name of the intended regift recipient, a communication channel through which the regift recipient may be notified of the regift, contact information based on the communication channel selected (e.g., email address when email is the communication channel, phone number when text message is the communication channel, etc.), updated virtual gift wrapping options, updated personalization options (e.g., the name of the recipient that is regifting the gift, a message for the regift recipient, etc.). In one or more embodiments, other options may be presented to the initial intended recipient during the regift process. As an example, the initial intended recipient may be presented with an option to add to the gift, such as by adding additional funds when the gift is a gift card. As another example, the gifting service system 104 may present additional gift options determined by the gift options algorithm 118 as suggestions to add to the gift (e.g., when the gift is a belt, an option to send a hat with the belt for an additional cost). As another example, the initial intended recipient may be given an option to swap the intended gift for any number of possible alternate gift options (e.g., that are generated by the gift options algorithm 118).

In one or more embodiments, the set of information provided by the recipient during the regift process, which may collectively be referred to as regift information, is transmitted from the recipient device 126 to the gifting service system 104. In one or more embodiments, after receiving the regift information, the gifting service system 104 increments a regift counter 122. In one or more embodiments, the regift counter 122 is hardware, software, or any combination thereof that includes functionality to track a quantity of instances that a gift has been regifted. In one or more embodiments, the gifting entity that initially transmitted the gift order to the gifting service system 104 may be presented with an opportunity to indicate a maximum number of allowed times that a gift may be regifted. Alternatively, the gifting service system 104 may include a predetermined or configurable maximum number of allowed times that a gift may be regifted. In one or more embodiments, whether a gift has reached the maximum number of regift instances is tracked, at least in part, by the regift counter 122.

As an example, the regift counter 122 may be a counter that is incremented each time a gift is regifted (e.g., when a recipient indicates a desire to regift a gift and provides regift information). In such a scenario, the redemption options algorithm 128 may include logic for checking the regift counter to determine if the maximum number of allowed regifts has been reached (e.g., the regift counter 122 has been incremented such that it stores a value equal the maximum allowed number of regifts) and, if so, not present a regift option to the next regift recipient. As another example, the regift counter 122 may be configured with the maximum number of allowed regifts, and decremented each time a regift occurs. In such a scenario, the redemption options algorithm 128 may include logic for checking the regift counter to determine if the maximum number of allowed regifts has been reached (e.g., the regift counter 122 has reached zero) and, if so, not present a regift option to the next regift recipient.

In one or more embodiments, after receiving the regift information from the recipient device 126, the gifting service system 104 may generate an updated gift notification. The updated gift notification may be transmitted by the gifting service system 104 to a regift recipient device 124 associated with the intended regift recipient (not shown). The regift recipient device 124 may be implemented on one or more computing devices, such as the computing device 1102 described herein at least in connection with FIG. 11. The updated gift notification may be generated by a gift presentation sub-system 120 of the gifting service system 104. The gift presentation sub-system 120 may be implemented on one or more computing devices of the gifting service system 104, such as the computing device 1102 described herein at least in connection with FIG. 11, or any portion of such computing devices. Additionally or alternatively, the gift presentation sub-system 120 may be implemented as an application or other executable process on one or more computing devices of the gifting service system 104.

In one or more embodiments, the updated gift notification is transmitted to the regift recipient device 124 using a communication channel selected by the recipient associated with the recipient device 126, which may include using at least a portion of the regift recipient information provided by the recipient. For example, if email was selected as the communication channel, the updated gift notification may be transmitted using an email address of the regift recipient provided by the recipient. As another example, if text message was selected as the communication channel, then a phone number of the regift recipient associated with the recipient device 124 may be used to send the updated gift notification.

In one or more embodiments, the updated gift notification includes an indication that the regift recipient has been sent a gift. The updated gift notification may not include an indication that the gift is a regift. The indication may or may not identify the recipient as the sender of the gift (e.g., "Kelly got you a gift!"). The updated gift notification may include any other information without departing from the scope of embodiments described herein. As an example, the updated gift notification may include an image of virtual gift wrapping, and an interactive element that, when selected by the regift recipient, reveals (e.g., "unwraps") the gift. The interactive element may include a signal indicating to the recipient to select the interactive element to begin the gift redemption process (e.g., "SEE YOUR GIFT") As another example, the updated gift notification may include explanatory information that provides the regift recipient with various details related to the receipt of the gift (e.g., "You have received a gift. To redeem your gift, select the button above, and provide your address to have your gift shipped to you"). As another example, the updated gift notification may include information that provides the regift recipient with other details about the gift redemption process (e.g., that the regift recipient will have the option to exchange the gift for another gift, that the regift recipient will have the option to select certain customization options related to the gift, etc.).

In one or more embodiments, when the regift recipient selects to reveal the gift using the interactive element of the updated gift notification, the recipient may be navigated to a page that displays the gift. The display of the gift may include an image of the gift, the name of the gift, details related to the gift, etc. The page may also include an interactive element that, when selected, continues the gift redemption process. The interactive element may include a signal to the regift recipient indicating that the recipient should select the interactive element (e.g., a button) to continue the gift redemption process. For example, the interactive element may include text, such as "REDEEM YOUR GIFT". In one or more embodiments, the page is generated by the gift presentation sub-system 120.

In one or more embodiments, when the regift recipient, via the interactive element on the page, selects to continue the gift redemption process, the regift recipient may be navigated to another page generated by the gift presentation sub-system 120 of the gifting service system 104 that provides various options to the regift recipient. Such options may include, but are not limited to, the option to accept the gift (e.g., the gift initially included in the gift order from the gifting entity), or to exchange the gift for another gift. The page may include one or more alternate gifts that the regift recipient could choose to exchange for the gift. The alternate gifts may be presented using an image, a name, and/or details of the one or more alternate gifts. The page may also include an image, name, and or details related to the gift that was initially ordered by the gifting entity (e.g., for the sake of comparison by the regift recipient with the one or more alternate gift options).

The page may also include an interactive element that, when selected, allows the regift recipient to continue the gift redemption process. The interactive element may change, depending on other selections made by the regift recipient. For example, the interactive element may be a button that, when selected by the recipient, navigates the regift recipient to another page to continue the gift redemption process. The interactive element may include a signal indicating to the regift recipient to select the interactive element to continue the process. The signal may, for example, be text, which may change based on other selections of the regift recipient. As an example, the text may state "Continue" if the regift recipient checks a check element on the page indicating that they would prefer to continue with the gift ordered by the gifting entity, but change to "Exchange this gift" if the regift recipient checks a check element indicating that they would prefer to exchange the gift for an alternate gift. In one or more embodiments, if the regift recipient makes a selection on the page indicating that the regift recipient wants to exchange the gift, then the elements on the page presenting the one or more alternate gift options may be selectable to allow the regift recipient to indicate which alternate gift the recipient prefers. In such a scenario, the page may also include an indication to the regift recipient that the regift recipient should select from among the alternate gift options.

In one or more embodiments, the alternate gift options presented to the regift recipient are the same as the other gift options that were presented to the gifting entity and/or to the initial intended recipient. In other embodiments, the alternate gift options presented to the regift recipient are different from the other gift options that were previously presented to the sender. In one or more embodiments, when more than one gift option is presented to the regift recipient (i.e., the gift and one or more alternate gifts), the alternate gifts may be determined by the gift options algorithm 118 of the gifting service system 104. As an example, the gift options algorithm 118 may include a predictive machine learning model that takes as input consumer information 114, product information 114, and/or information associated with the intended regift recipient to predict one or more alternate gifts that increase the likelihood that the regift recipient will select to redeem a gift.

In one or more embodiments, the one or more gift options presented to the regift recipient may depend on when the regift recipient selects to redeem a gift (i.e., the timing of the selection to redeem the gift). As an example, the gifting service system 104 may transmit the updated gift notification in the form of an email. In such a scenario, the regift recipient may not immediately open the email, or may open the email but not immediately select to redeem the gift. Thus, the one or more gift options that would be presented to the regift recipient may have changed since the time of the initial gift order, or of the decision by the recipient to regift the gift. For example, some or all of the gift options that would have been presented if the updated gift notification had been sent near the time of the gift order by the gifting entity may no longer be available (e.g., there were previously 1000 of a particular alternate gift option, but no longer exist in a retailer's inventory). Therefore, the gift options algorithm 118 may be invoked at the time the regift recipient selects to redeem a gift in order to present gift options that are available at the time of the selection.

In one or more embodiments, once the regift recipient has selected to continue with the gift, or selected an alternate gift, the recipient may be presented with various customization options (e.g., size, color, etc.) and requests for information (e.g., address to send the gift to, preferred delivery options, etc.). The customization options and request for information may be presented to the regift recipient on a subsequent page generated by the gift presentation sub-system 120 of the gifting service system 104. In one or more embodiments, the regift recipient is also optionally presented with an option to send a thank you to the sender (i.e., the initial intended gift recipient) for the gift. Although the above description contemplates various presentations and pages provided to the regift recipient to complete the gift redemption process, all or any portion of the presentations and pages may be combined into a single page, or divided differently into separate pages, without departing from the scope of embodiments described herein.

In one or more embodiments, once the regift recipient has made all necessary selections and provided the requested information (which may be referred to collectively as gift selections), the gift selections are transmitted from the regift recipient device 124 to the gifting service system 104. In one or more embodiments, based at least in part on the gift selections, the gift presentation sub-system 120 of the gifting service system 104 initiates delivery of the selected gift to the regift recipient. The method of delivery may be based on a selection made by the regift recipient during the gift redemption process by which the recipient indicated a preferred method of delivery. As an example, the gift may be a gift card, and the regift recipient may have selected to receive the gift card as a virtual gift card delivered via email. As another example, the gift may be a physical object, and the regift recipient may have provided a physical address to which the gift is shipped. The gifting service system 104 may perform the delivery of the gift. Additionally or alternatively, the gifting service system 104 may provide information related to the planned delivery to a third party entity, which may perform the delivery of the gift to the regift recipient.

In one or more embodiments, all or any portion of any information obtained related to the gifting entity, the initial intended gift recipient, and/or the regift recipient is used by the gifting service system 104 to dynamically update historical data maintained by the gifting service system 104, which may be used to dynamically update the machine learning models of the redemption options algorithm 128 and/or the gift options algorithm 118 by adding the obtained information in real-time to the training data sets for the machine learning models.

In one or more embodiments, the updated gift notification, or any subsequent page presented to the regift recipient, may include an option to regift the gift to another regift recipient (not shown). Whether such an option is presented to the regift recipient may be determined by the redemption options algorithm 128. Such a determination may include determining, using the regift counter 122, whether the regifting of the gift to the regift recipient caused the state of the regift counter 122 to indicate that the maximum number of allowed regifts has been reached. In one or more embodiments, an entity implementing or otherwise providing the above-described regift process for customers, such as a retailer using the services provided by the gifting service associated with the gifting service system 104, gains the opportunity to engage with (e.g., send marketing information to) the gifting entity that purchased the gift, the initial intended recipient, the first regift recipient, and/or any subsequent regift recipient, thereby potentially acquiring any number of new customers.

Figure 2:
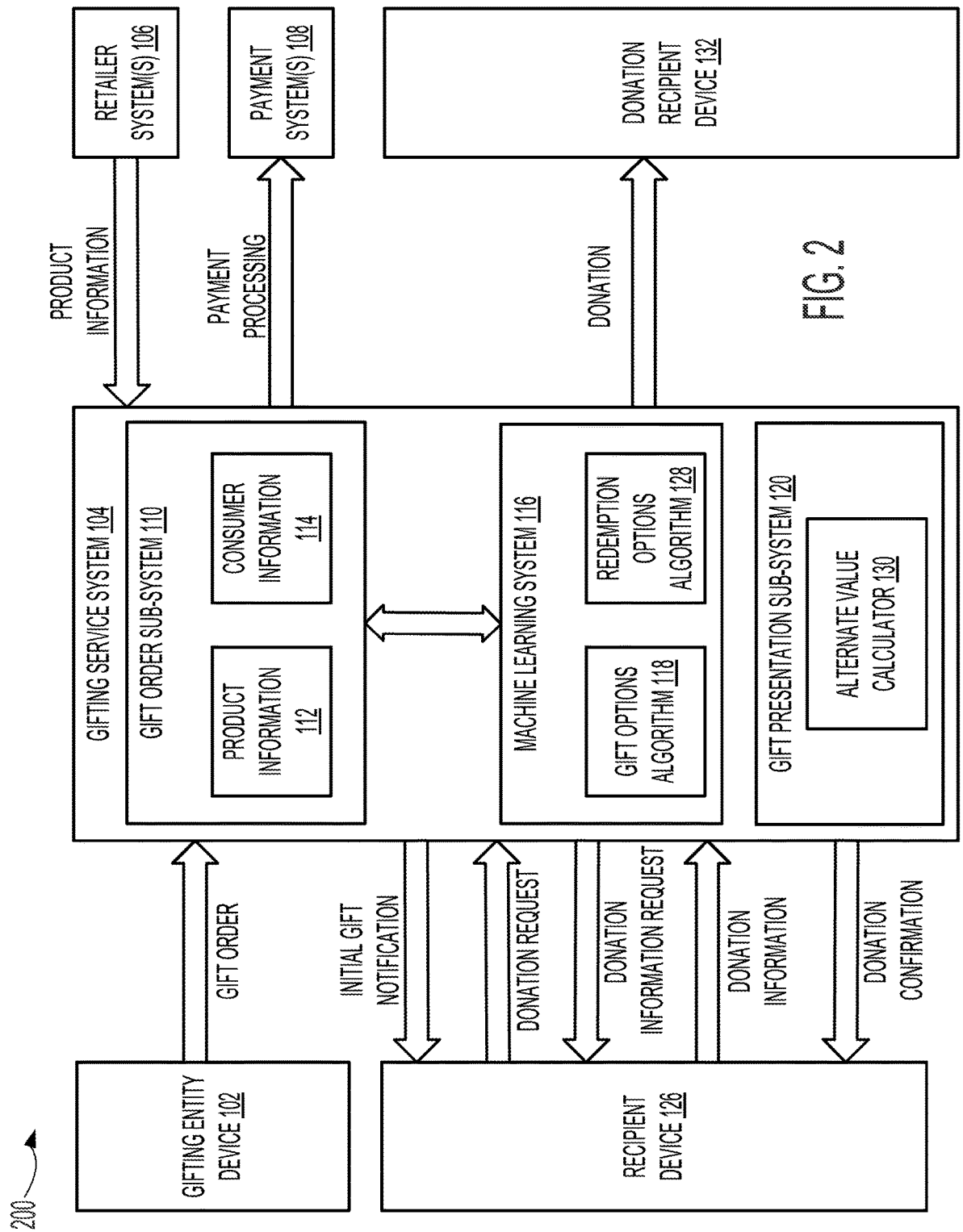
FIG. 2 shows an illustrative example of an environment in which a gifting entity interacts with a gifting service system via a gifting entity device in order to provide a product or other item as a gift to a recipient, and in which the intended recipient is provided an alternate gift redemption option to donate the value of the gift.

FIG. 2 shows an illustrative example of an environment 200 in which a gifting entity (e.g., a consumer, a corporate entity, etc.) interacts with a gifting service system 104 via a gifting entity device 102 in order to provide a product (e.g., goods, services) or other item (e.g., gift card, coupon, etc.) as a gift to a recipient (not shown), and in which the intended recipient is provided an alternate gift redemption option to donate the value of the gift (e.g., to a charity). A gift may be any item, such as a product, service, gift card, coupon, etc. Other items may be gifts without departing from the scope of embodiments described herein.

The gifting entity device 102 may be a computing device such as the computing device 1102 described herein at least in connection with FIG. 11. The computing device may be, for example, a laptop computer, a desktop computer, a smartphone, a tablet, a smart watch, or any other type of computing device such as those described herein. As another example, an entity, such as a business, non-profit organization, charity, etc. may offer gifts to consumers online or in a physical establishment setting (e.g., a retail establishment, trade show, etc.). In such a scenario, the entity may use a gifting entity device 102 to interact with the gifting service prior to an offer of a gift being made in order to provide details about at least one gift option that may be offered to one or more potential recipients. As an example, a company may use the gifting entity device 102 to provide information about a customizable item (e.g., team jersey, bottled beverage, etc.) that the company would like to offer to potential recipients at a tradeshow, in a retail establishment, or online, which may be facilitated by the gifting service system 104.

The gifting service system 104 may be one or more computing devices such as the computing device 1102 described herein at least in connection with FIG. 11. As an example, the gifting service system 104 may be one or more server computing devices controlled or otherwise used by a gifting service (not shown). In one or more embodiments, a gifting service is any entity that provides a framework through which gifting entities can order gifts to be provided to recipients.

As discussed above in the description of FIG. 1, a gifting entity, via the gifting entity device 102, may select a gift and transmit a gift order to the gifting service system 104. The gift order may be transmitted in response to a gifting entity viewing an advertisement from the gifting service system 104. The gift order may be transmitted after the gifting entity accesses one or more webpages provided by the gifting service system 104. The gift order may be transmitted during an interaction between the gifting entity and the gifting service system 104 prior to the gifting entity offering one or more gifts to potential recipients, such as at a trade show, at a physical retail establishment, or online.

In one or more embodiments, a gift order is transmitted from the gifting entity device 102 to the gifting service system 104 over a network (not shown), such as the network 1122 described herein at least in connection with FIG. 11. In one or more embodiments, a gift order includes any information related to a gift selected by a gifting entity to give to a recipient, such as an identification of the gift selected by the gifting entity (e.g., from among various gift options presented), any customization options related to the gift, and/or information associated with the intended recipient of the gift (e.g., name, contact information such as email address, etc.). In certain scenarios, information associated with the intended recipient may not be included with the gift order. As an example, a gifting entity may be a business that sets up a booth in a trade show from which the business intends to provide gifts to consumers (i.e., gift recipients). In such a scenario, the business may generate a gift order when a consumer approaches the booth and is interested in receiving the gift. The consumer (i.e., the gift recipient) may then use a device provided by the business and/or their own device to provide gift recipient information.

As another example, a gifting entity may be a consumer using a browser application (not shown) of the gifting entity device 102, who is provided an advertisement from the gifting service system 104 while viewing the content of a webpage and interacts with an interactive element (e.g., a button) of the advertisement to initiate a gift selection process, select a particular gift, and provide relevant additional information (e.g., name and contact information for the intended gift recipient), in order to place a gift order with the gifting service system 104. As another example, a gifting entity may be a corporation that interacts with the gifting service system 104 via the gifting entity device 102 to have the gifting service system 104 prepare to facilitate providing the gift to potential recipients that interact with the corporation (e.g., online, at a trade show, at a retail establishment, etc.).

In one or more embodiments, the gift order is received at the gift order sub-system of 110 of the gifting service system 104. The gift order sub-system 110 may interact further with the gifting entity device 102 in order to obtain any additional information to complete the gift order. For example, if intended recipient information was not included in the gift selection, the gift order sub-system 110 may request such information from the gifting entity device 102. As another example, the gift order sub-system may request any additional information related to the gift being ordered (e.g., color, size, etc.). As another example, the gift order sub-system 110 may request payment information from the gifting entity so that the gift may be paid for. In one or more embodiments, the gifting order sub-system may further transmit transaction information for purchase of the gift to one or more payment systems 108 for payment authorization and processing.

As an example, a gift order process may include presenting a page including the one or more gift options to the gifting entity associated with the gifting entity device 102 that includes an interactive element (e.g., a button) that, when selected (after selecting a gift if more than one is offered), navigates the gifting entity to another page where additional information is requested from the gifting entity. The page may include any number of different requests for information. As an example, the page may request that the gifting entity select a communication channel (e.g., email, text, messenger service, printed mail delivery, etc.) through which the gifting entity wants the intended recipient to receive notification of the gift. As another example, the page may include a request for a recipient identifier. The recipient identifier may include the name of the intended recipient of the gift, as well as information that facilitates the receipt, by the recipient, of a notification of the gift. The portion of the recipient identifier information facilitating the notification may be based on the communication channel selected (e.g., email address if email is selected, phone number if text message is selected, messenger service name or handle if messenger service is selected, address if mail delivery is selected, etc.). As another example, the page may include a request for the gifting entity to provide the gifting entity's name and, optionally, a message to be delivered to the recipient as part of the notification of the gift. As another example, the page may include a request for the gifting entity to select from among various options for virtual gift wrapping that will appear in the notification. Although the above description contemplates various presentations and pages provided to the consumer to complete the gift order process, all or any portion of the presentations and pages may be combined into a single page, or divided differently into separate pages without departing from the scope of embodiments described herein.

In one or more embodiments, once the gifting entity makes all requested selections and provides all requested information (which may be referred to collectively as a gift order), the gifting entity device 102 transmits the gift order to the gifting service system 104. The gift order may be transmitted over a network (e.g., network 1122 of FIG. 11), and the various items of information included as part of the gift order may be sent as part of the same transmission, or broken into any number of separate transmissions to the gifting service system 104. In response to receipt of the gift order from the gifting entity device 102, the gifting service system 104 may generate an initial gift notification, and transmit the initial gift notification to a recipient device 126 associated with the intended recipient of the gift. The recipient device 126 may be a computing device such as the computing device 1102 described herein at least in connection with FIG. 11. The computing device may be, for example, a laptop computer, a desktop computer, a smartphone, a tablet, a smart watch, or any other type of computing device such as those described herein. The initial gift notification may be generated by a gift order sub-system 110 of the gifting service system 104.

In one or more embodiments, the initial gift notification is transmitted to the recipient device 126 using a communication channel selected by the gifting entity, which may include using at least a portion of the recipient identifier provided by the gifting entity (or the intended recipient, depending on the scenario). For example, if email was selected as the communication channel, the initial gift notification may be transmitted using an email address of the recipient provided by the gifting entity. As another example, if text message was selected as the communication channel, then a phone number of the recipient associated with the recipient device 126 may be used to send the initial gift notification. As another example, the gifting entity may be a business or other entity that is offering a gift to a recipient that is physically present (e.g., at a retail establishment, a trade show, etc.). In such a scenario, the initial gift notification may be provided to the recipient on a device provided by the gifting entity to the recipient, or via a QR code (or any similar mechanism) that the recipient scans on their own recipient device 126.

In one or more embodiments, the initial gift notification includes an indication that the recipient has been sent a gift. The indication may or may not identify the sender of the gift (e.g., "Kelly got you a gift!"). The initial gift notification may include any other information without departing from the scope of embodiments described herein. As an example, the initial gift notification may include an image of virtual gift wrapping, and an interactive element that, when selected by the recipient, reveals (e.g., "unwraps") the gift. The interactive element may include a signal indicating to the recipient to select the interactive element to begin the gift redemption process (e.g., "SEE YOUR GIFT") As another example, the initial gift notification may include explanatory information that provides the recipient with various details related to the receipt of the gift (e.g., "You have received a gift. To redeem your gift, select the button above, and provide your address to have your gift shipped to you"). As another example, the initial gift notification may include information that provides the recipient with other details about the gift redemption process (e.g., that the recipient will have the option to exchange the gift for another gift, that the recipient will have the option to select certain customization options related to the gift, etc.).

In one or more embodiments, when the recipient selects to reveal the gift using the interactive element of the gift notification, or otherwise views the gift, the recipient may be navigated to a page that displays the gift that was selected by the gifting entity in the gift order. The display of the gift may include an image of the gift, the name of the gift, details related to the gift, etc. The page may also include an interactive element that, when selected, continues the gift redemption process. The interactive element may include a signal to the recipient indicating that the recipient should select the interactive element (e.g., a button) to continue the gift redemption process. For example, the interactive element may include text, such as "REDEEM YOUR GIFT". In one or more embodiments, the page is generated by the gift order sub-system 110.

In one or more embodiments, a page that allows a recipient to redeem a gift (e.g., via an interactive element) may also include one or more alternate redemption options. A recipient may not want or need a gift provided from the gifting entity. In such scenarios, the page provided may include one or more additional interactive elements that provide alternate redemption options. Such alternate redemption options may include, for example, an option to donate the value of the gift (e.g., to a charity). In one or more embodiments, donation is a process by which a gift recipient can select to begin a process for providing the value of the gift to a donation recipient. The gifting entity that provided (and paid for) the gift may or may not be notified that the recipient has decided to regift the gift, or be provided any information about an intended regift recipient. In one or more embodiments, the act of the recipient donating the value of a gift counts as a redemption of the gift.

In one or more embodiments, whether a recipient of a gift is presented with an option to donate the value of the gift is determined, at least in part, using a redemption options algorithm 128 of the machine learning system 116 of the gifting service system 104. The redemption options algorithm 128 may be configured to analyze consumer information 114 (e.g., gifting entity information, recipient information, etc.), product information 112, or any combination thereof, to determine whether to present a donation option to the recipient device 126.

The redemption options algorithm 128 may be implemented on one or more computing devices of the gifting service system 104, such as the computing device 1102 described herein at least in connection with FIG. 11, or any portion of such computing devices. Additionally or alternatively, the redemption options algorithm 128 may be implemented as an application or other executable process on one or more computing devices of the gifting service system 104.

In one or more embodiments, the redemption options algorithm 128 is invoked by the gifting service system 104 in response to receiving or otherwise obtaining a gift order from the gifting entity device 102. The redemption options algorithm 128 may include any number of rules to be evaluated in order to determine whether a donation option should be provided to the recipient device 126. As an example, the redemption options algorithm 128 may include a rule that evaluates whether the gift order included an indication from the gifting entity that donating the value of the gift should or should not be allowed. Based on an evaluation of such a rule, the redemption options algorithm 128 may only provide the donation option to the recipient when the gift order includes an indication that donation is to be allowed for the gift value paid by the gifting entity, or, alternatively, that the gift order does not include an indication that donation is not to be allowed for the gift value paid by the gifting entity.

As another example, the redemption options algorithm 128 may include a rule to evaluate various aspects of the gift selected by the gifting entity to determine whether the initial gift notification should include a donation option. The redemption options algorithm 128 may include evaluation of rules related to the price of the gift (e.g., donation option to be presented only when gift is over a certain price, under a certain price, within a certain price range, etc.). For example, the redemption options algorithm 128 may include a rule that a purchase of more than $50 qualifies the gift to have a donation option presented to the recipient.

As another example, the redemption options algorithm 128 may include evaluating a rule that indicates that gifts of a certain type, brand, etc. may or may not qualify to have a donation option presented to a recipient. For example, the rule, when evaluated, may indicate, at least in part, that a donation option may be presented for a gift of a product from Brand X, but not from Brand Y.

The redemption options algorithm 128 may include rules that indicate that gift orders made within a certain data range qualify to allow a donation option to be presented to a recipient. For example, the redemption options algorithm 128 may include a rule that any gift order made in the month of February qualifies to allow a donation option to be presented to a recipient.

The redemption options algorithm 128 may include rules that a recipient having certain demographic characteristics qualifies to receive an option to donate the value of a gift. For example, the redemption options algorithm 128 may include a rule that any recipient in a certain geographic region, that is of a certain age, that is married, etc. qualifies to allow a donation option to be presented to a recipient.

The redemption options algorithm 128 may include logic that indicates a relationship between the quantity of a selected gift in a gift order that exists in the inventory (e.g., of a retailer, of a gifting entity, etc.) and whether a donation option may be presented. As an example, a retailer may desire to reduce inventory levels of certain products. In such a scenario, the product information 112 may include an indication that one or more products, when purchased as a gift by a gifting entity, are to be presented to an intended recipient for redemption without a donation option, thereby increasing the likelihood that the gift redemption will reduce the retailer's inventory of the product.

In one or more embodiments, the above-described rules, and/or any other such rules, may be evaluated by the redemption options algorithm 128 in any combination to determine whether a donation option should be presented to a recipient. As an example, a combination of rules may be evaluated by the redemption options algorithm 128 that indicate that a donation option may be presented when a gift order explicitly includes an indication that the gifting entity wants to allow donation, the intended recipient is within a certain geographic region, and the price of the gift is over $75.

In one or more embodiments, the redemption options algorithm 128 may be or include a machine learning model that is trained to determine whether to present a donation option to a recipient of a gift. As an example, historical product information 112 and/or consumer information 114 may be combined with previous outcomes (e.g., a donation option was presented and selected, a donation option was not presented and the gift was not redeemed, a donation option was presented and not selected, etc.) to create a training data set for the machine learning model. The training of the machine learning model may be intended to train the model to predict the likelihood of a desired outcome with an associated confidence level for the prediction. As an example, the gifting service associated with the gifting service system 104 may desire to see increased charitable donations in a particular geographic region, and, thus, the machine learning model may be trained to predict the likelihood that presenting a donation option to a particular recipient will result in a donation associated with the particular geographic region.

In one or more embodiments, when an initial gift notification is transmitted from the gifting service system 104 to the recipient device 126, consumer information 114 and/or product information 112, historical and/or obtained in real-time, may be used as input to the trained machine learning model to predict whether presenting a recipient with an option to donate the value of a gift results in a positive or desired outcome, such as the recipient being more likely to engage the services of the gifting service associated with the gifting service system 104 in the future. In one or more embodiments, if the prediction of the machine learning model has a confidence level above a defined threshold, then the redemption options algorithm 128 may make a determination that a donation option should be presented to the recipient.

Other machine learning techniques may be used as part of the redemption options algorithm 128 without departing from the scope of embodiments described herein. As an example, a clustering machine learning algorithm (e.g., k-means clustering algorithms, fuzzy c-means (FCM) algorithms, expectation-maximization (EM) algorithms, hierarchical clustering algorithms, density-based spatial clustering of applications with noise (DBSCAN) algorithms, etc.) may be used to identify whether the product information 112 and/or consumer information 114 associated with the gift order and intended gift recipient include characteristics similar to other scenarios for which a donation option resulted in a positive outcome.

In one or more embodiments, when the redemption options algorithm 128 determines that a donation option should be presented to a recipient of a gift, the donation option is included in an initial gift notification. In one or more embodiments, the initial gift notification is generated by the gift order sub-system 110, and transmitted from the gifting service system 104 to the recipient device 126. In one or more embodiments, the donation option is included in the initial gift notification as an interactive element, such as a button, text hyperlink, QR code, etc. The interactive element may include and/or be accompanied by a signal to the recipient that the option to regift the gift presented in the initial gift notification is available (e.g., a button that includes the text "Donate this gift").

The donation option interactive element may accompany any number of other items in the initial gift notification, such as information related to the gift that was selected by the gifting entity to gift to the recipient, an option to decline the gift, an option to regift the gift (see, e.g., the description of FIG. 1, above) and/or options to exchange the gift, such as for a gift card or for one or more alternate gift options. Alternatively, the initial gift notification may include information related to the gift (e.g., an image, gift details, etc.) and a request for the recipient to indicate whether they want to begin a redemption process. In such a scenario, the donation option, decline option, regift option, and/or alternate gift options may be presented on a subsequent page to which the recipient is navigated upon using an interactive element in the initial gif notification to redeem the gift.

Any alternate gift options presented to the recipient may be determined by the gift options algorithm 118. For example, the a machine learning model of the gift options algorithm may use as input all or any portion of the consumer information 114 and/or the product information 112, which may be historical and/or obtained in real-time, in order to predict any number of alternate gift options that a recipient may be more likely to accept.

In one or more embodiments, when a recipient uses an interactive element to indicate a desire to donate the value of a gift to a donation recipient, either from the initial gift notification or from a subsequent page in the redemption process, the indication, which may be referred to as a donation request, is transmitted from the recipient device 126 to the gifting service system 104. In one or more embodiments, the transmission of the donation request initiates a donation process. In one or more embodiments, the donation process includes the gifting service system 104 requesting various items of information from the recipient, which may be presented as one or more pages transmitted to the recipient device 126. Each page may request all or any portion of the information necessary to donate the value of the gift.

In one or more embodiments, the donation information request includes a request from the gifting service system 104 for the recipient associated with the recipient device 126 to identify a donation recipient, such as a charity, that will receive the value of the gift as a donation. In one or more embodiments, the recipient may identify any donation recipient to which the value of the gift will be donated. In one or more embodiments, the donation recipient is presented with a set of one or more donation recipient options from among which the recipient may select a particular donation recipient. The set of one or more donation recipients presented to the recipient in the donation information request may be specified by the gifting entity (e.g., during the gift order process). In one or more embodiments, the set of one or more donation recipients is determined dynamically in real-time by the redemption options algorithm 128 of the gifting service system 104. As an example, the redemption options algorithm 128 may include a machine learning model trained to predict potential donation recipients to which a recipient having a particular set of characteristics is likely to donate. The machine learning model may use as input information related to the recipient, the gifting entity, product information, etc. and output potential donation recipients with a predicted likelihood that, if presented as donation recipient options, would be selected by the recipient for donating the value of the gift. The machine learning model may be dynamically updated when donation options are presented to recipients by associating information related to the recipient, the gifting entity, the gift, etc. with the outcome of presenting the donation option, and adding the associated information set to the training data set for the machine learning model. As another example, a machine learning model may be trained to determine a set of one or more donation recipients dynamically in real-time based at least in part on predicting possible donation recipients that maximize the value of the donation (e.g., determining donation recipients for which an offer exists to have all or any portion of the donation matched by a separate entity). In one or more embodiments, rather than selecting a single donation recipient, the recipient may choose to divide the value of the gift among any number of separate donation recipients, with each such donation recipient receiving any portion of the value of the gift.

In one or more embodiments, the set of information provided by the recipient during the donation process, which may collectively be referred to as donation information, is transmitted from the recipient device 126 to the gifting service system 104. In one or more embodiments, the gifting service system 104 includes a gift presentation sub-system. The gift presentation sub-system 120 may be implemented on one or more computing devices, such as the computing device 1102 described herein at least in connection with FIG. 11. Additionally or alternatively, the gift presentation sub-system 120 may be implemented as an application or other executable process on one or more computing devices of the gifting service system 104. In one or more embodiments, the gift presentation sub-system is configured to perform various actions related to the redemption of the gift, alternate redemption selections, presenting and/or delivering the gift to recipients, etc. In one or more embodiments, the gift presentation sub-system 120 includes an alternate value calculator 130. The alternate value calculator 130 may be implemented on one or more computing devices, such as the computing device 1102 described herein at least in connection with FIG. 11. Additionally or alternatively, the alternate value calculator 130 may be implemented as an application or other executable process on one or more computing devices of the gifting service system 104.

In one or more embodiments, in response to receiving the donation information, the alternate value calculator 130 determines the value of the gift associated with the gift order placed by the gifting entity, which may be the purchase price paid for the gift by the gifting entity. In one or more embodiments, based on the value of the gift, and the donation recipient, the alternate value calculator 130 may determine an alternate value representation. As an example, when the selected donation recipient is a charity that provides meals to socioeconomically disadvantaged children, and the value of the gift is $127, the alternate value calculator may determine that the value of the gift is equivalent to fifty meals to be provided by the charity. Thus the alternate value representation for the gift is 50 meals from the charity. In one or more embodiments, the alternate value representation is transmitted from the gifting service system 104 to the recipient device 126. The alternate value representation may be presented to the recipient, and may be accompanied by any amount of additional information, such as the name of the selected donation recipient, an image related to the alternate value, etc. As an example, a page may be presented to the recipient that indicates that the donation will provide fifty meals from the donation recipient to socioeconomically disadvantaged children, displays the name of the donation recipient, and includes an image of a child enjoying such a meal. The alternate value representation may be provided to the recipient along with an interactive element (e.g., a button on a webpage) that the recipient, via the recipient device 126, may interact with to finalize the donation. The interactive element may include or be accompanied by a signal to the recipient to indicate that the recipient should interact with the element to complete the donation process (e.g., text stating "Donate"). Alternatively, alternate value representation may be provided to the recipient after the donation is complete.

In one or more embodiments, the value of the gift is donated to one or more donation recipients. In one or more embodiments, the gifting service system 104 provides the donation to the donation recipient. The donation may be provided to the recipient via a donation recipient device 132. The donation recipient device 132 may be implemented on one or more computing devices, such as the computing device 1102 described herein at least in connection with FIG. 11. In one or more embodiments, the gifting service system 104 provides the donation information, including the one or more selected donation recipients, to the gifting entity via the gifting entity device 102 so that the gifting entity may perform the donation, and gain any benefits that may be associated with the donation. In one or more embodiments, the gifting service system 104 provides the value of the gift to the recipient to allow the recipient to perform the donation, and gain any benefits that may be associated with the donation.

In one or more embodiments, all or any portion of any information obtained related to the gifting entity, the initial intended gift recipient, and/or the one or more donation recipients is used by the gifting service system 104 to dynamically update historical data maintained by the gifting service system 104, which may be used to dynamically update the machine learning models of the redemption options algorithm 128 and/or the gift options algorithm 118 by adding the obtained information in real-time to the training data sets for the machine learning models.

Figure 3:
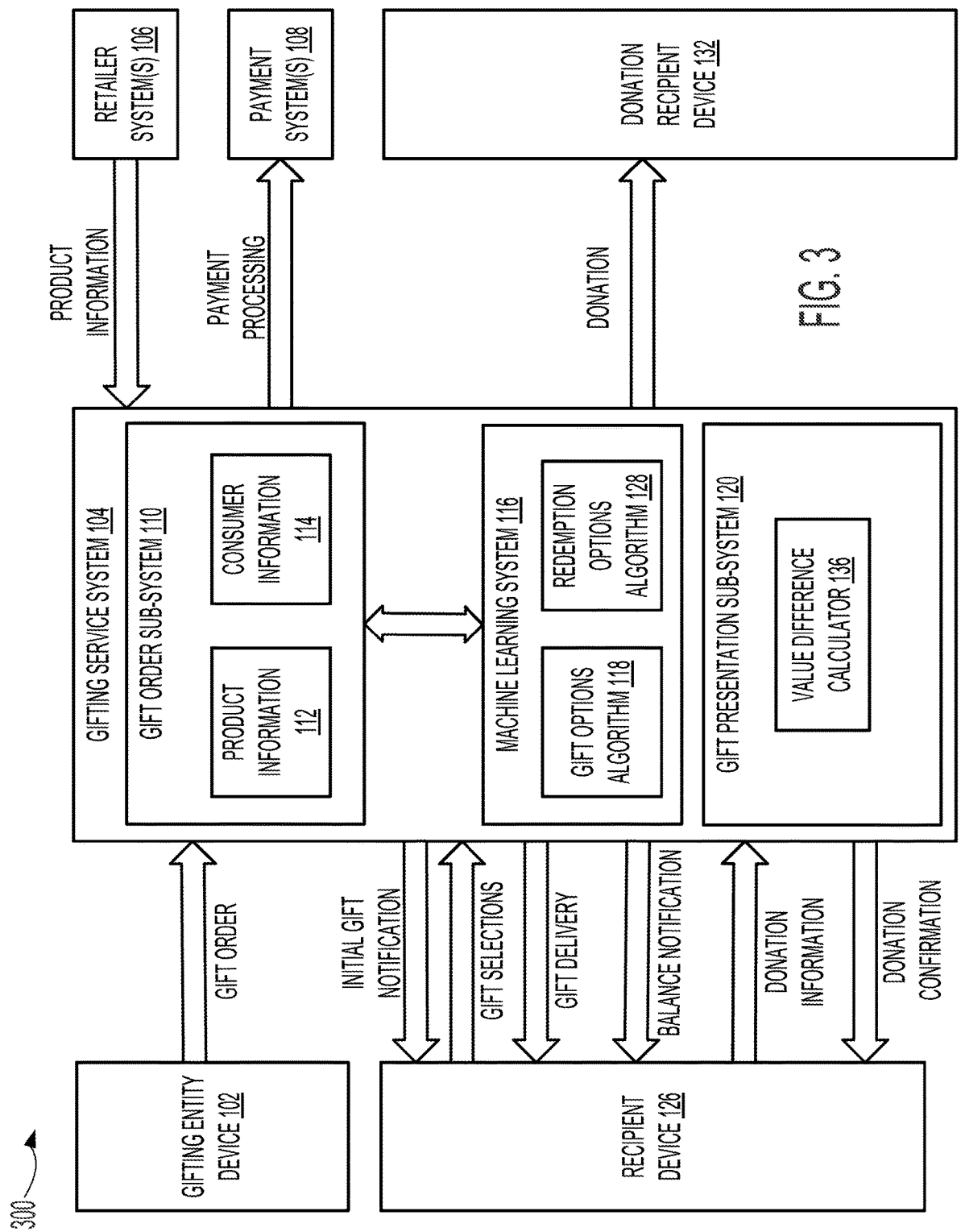
FIG. 3 shows an illustrative example of an environment in which a gifting entity interacts with a gifting service system via a gifting entity device in order to provide a or other item as a gift to a recipient, and in which the intended recipient is provided an alternate gift redemption option to donate a positive balance that remains after the gift has been redeemed.

FIG. 3 shows an illustrative example of an environment 300 in which a gifting entity (e.g., a consumer, a corporate entity, etc.) interacts with a gifting service system 104 via a gifting entity device 102 in order to provide a product (e.g., goods, services) or other item (e.g., gift card, coupon, etc.) as a gift to a recipient (not shown), and in which the intended recipient is provided an alternate gift redemption option to donate a positive balance that remains after the gift has been redeemed (e.g., to a charity). A gift may be any item, such as a product, service, gift card, coupon, etc. Other items may be gifts without departing from the scope of embodiments described herein. As an example, the gifting entity may have paid a certain price for a gift, but at the time the recipient chooses to redeem the gift, the price has reduced, leaving a remaining positive balance of the difference between the price paid by the gifting entity and the price of the gift at the time of redemption. As another example, the gifting entity may have paid a certain price for a gift, but the recipient chooses to redeem an alternate gift option, leaving a remaining positive balance of the difference between the price paid by the gifting entity and the price of the alternate gift at the time of redemption. In either case, the recipient may be provided an alternate redemption option of donating the remaining positive balance.

The gifting entity device 102 may be a computing device such as the computing device 1102 described herein at least in connection with FIG. 11. The computing device may be, for example, a laptop computer, a desktop computer, a smartphone, a tablet, a smart watch, or any other type of computing device such as those described herein. As an example, an entity, such as a business, non-profit organization, charity, etc. may offer gifts to consumers online or in a physical establishment setting (e.g., a retail establishment, trade show, etc.). In such a scenario, the entity may use a gifting entity device 102 to interact with the gifting service prior to an offer of a gift being made in order to provide details about at least one gift option that may be offered to one or more potential recipients. As an example, a company may use the gifting entity device 102 to provide information about a customizable item (e.g., team jersey, bottled beverage, etc.) that the company would like to offer to potential recipients at a tradeshow, in a retail establishment, or online, which may be facilitated by the gifting service system 104.

The gifting service system 104 may be one or more computing devices such as the computing device 1102 described herein at least in connection with FIG. 11. As an example, the gifting service system 104 may be one or more server computing devices controlled or otherwise used by a gifting service (not shown). In one or more embodiments, a gifting service is any entity that provides a framework through which gifting entities can order gifts to be provided to recipients.

As discussed above in the description of FIG. 1, a gifting entity, via the gifting entity device 102, may select a gift and transmit a gift order to the gifting service system 104. The gift order may be transmitted in response to a gifting entity viewing an advertisement from the gifting service system 104. The gift order may be transmitted after the gifting entity accesses one or more webpages provided by the gifting service system 104. The gift order may be transmitted during an interaction between the gifting entity and the gifting service system 104 prior to the gifting entity offering one or more gifts to potential recipients, such as at a trade show, at a physical retail establishment, or online.

In one or more embodiments, a gift order is transmitted from the gifting entity device 102 to the gifting service system 104 over a network (not shown), such as the network 1122 described herein at least in connection with FIG. 11. In one or more embodiments, a gift order includes any information related to a gift selected by a gifting entity to give to a recipient, such as an identification of the gift selected by the gifting entity (e.g., from among various gift options presented), any customization options related to the gift, and/or information associated with the intended recipient of the gift (e.g., name, contact information such as email address, etc.). In certain scenarios, information associated with the intended recipient may not be included with the gift order. As an example, a gifting entity may be a business that sets up a booth in a trade show from which the business intends to provide gifts to consumers (i.e., gift recipients). In such a scenario, the business may generate a gift order when a consumer approaches the booth and is interested in receiving the gift. The consumer (i.e., the gift recipient) may then use a device provided by the business and/or their own device to provide gift recipient information.

As another example, a gifting entity may be a consumer using a browser application (not shown) of the gifting entity device 102, who is provided an advertisement from the gifting service system 104 while viewing the content of a webpage and interacts with an interactive element (e.g., a button) of the advertisement to initiate a gift selection process, select a particular gift, and provide relevant additional information (e.g., name and contact information for the intended gift recipient), in order to place a gift order with the gifting service system 104. As another example, a gifting entity may be a corporation that interacts with the gifting service system 104 via the gifting entity device 102 to have the gifting service system 104 prepare to facilitate providing the gift to potential recipients that interact with the corporation (e.g., online, at a trade show, at a retail establishment, etc.).

In one or more embodiments, the gift order is received at the gift order sub-system of 110 of the gifting service system 104. The gift order sub-system 110 may interact further with the gifting entity device 102 in order to obtain any additional information to complete the gift order. For example, if intended recipient information was not included in the gift selection, the gift order sub-system 110 may request such information from the gifting entity device 102. As another example, the gift order sub-system may request any additional information related to the gift being ordered (e.g., color, size, etc.). As another example, the gift order sub-system 110 may request payment information from the gifting entity so that the gift may be paid for. In one or more embodiments, the gifting order sub-system may further transmit transaction information for purchase of the gift to one or more payment systems 108 for payment authorization and processing.

As an example, a gift order process may include presenting a page including the one or more gift options to the gifting entity associated with the gifting entity device 102 that includes an interactive element (e.g., a button) that, when selected (after selecting a gift if more than one is offered), navigates the gifting entity to another page where additional information is requested from the gifting entity. The page may include any number of different requests for information. As an example, the page may request that the gifting entity select a communication channel (e.g., email, text, messenger service, printed mail delivery, etc.) through which the gifting entity wants the intended recipient to receive notification of the gift. As another example, the page may include a request for a recipient identifier. The recipient identifier may include the name of the intended recipient of the gift, as well as information that facilitates the receipt, by the recipient, of a notification of the gift. The portion of the recipient identifier information facilitating the notification may be based on the communication channel selected (e.g., email address if email is selected, phone number if text message is selected, messenger service name or handle if messenger service is selected, address if mail delivery is selected, etc.). As another example, the page may include a request for the gifting entity to provide the gifting entity's name and, optionally, a message to be delivered to the recipient as part of the notification of the gift. As another example, the page may include a request for the gifting entity to select from among various options for virtual gift wrapping that will appear in the notification. Although the above description contemplates various presentations and pages provided to the consumer to complete the gift order process, all or any portion of the presentations and pages may be combined into a single page, or divided differently into separate pages without departing from the scope of embodiments described herein.

In one or more embodiments, once the gifting entity makes all requested selections and provides all requested information (which may be referred to collectively as a gift order), the gifting entity device 102 transmits the gift order to the gifting service system 104. The gift order may be transmitted over a network (e.g., network 1122 of FIG. 11), and the various items of information included as part of the gift order may be sent as part of the same transmission, or broken into any number of separate transmissions to the gifting service system 104. In response to receipt of the gift order from the gifting entity device 102, the gifting service system 104 may generate an initial gift notification, and transmit the initial gift notification to a recipient device 126 associated with the intended recipient of the gift. The recipient device 126 may be a computing device such as the computing device 1102 described herein at least in connection with FIG. 11. The computing device may be, for example, a laptop computer, a desktop computer, a smartphone, a tablet, a smart watch, or any other type of computing device such as those described herein. The initial gift notification may be generated by a gift order sub-system 110 of the gifting service system 104.

In one or more embodiments, the initial gift notification is transmitted to the recipient device 126 using a communication channel selected by the gifting entity, which may include using at least a portion of the recipient identifier provided by the gifting entity (or the intended recipient, depending on the scenario). For example, if email was selected as the communication channel, the initial gift notification may be transmitted using an email address of the recipient provided by the gifting entity. As another example, if text message was selected as the communication channel, then a phone number of the recipient associated with the recipient device 126 may be used to send the initial gift notification. As another example, the gifting entity may be a business or other entity that is offering a gift to a recipient that is physically present (e.g., at a retail establishment, a trade show, etc.). In such a scenario, the initial gift notification may be provided to the recipient on a device provided by the gifting entity to the recipient, or via a QR code (or any similar mechanism) that the recipient scans on their own recipient device 126.

In one or more embodiments, the initial gift notification includes an indication that the recipient has been sent a gift. The indication may or may not identify the sender of the gift (e.g., "Kelly got you a gift!"). The initial gift notification may include any other information without departing from the scope of embodiments described herein. As an example, the initial gift notification may include an image of virtual gift wrapping, and an interactive element that, when selected by the recipient, reveals (e.g., "unwraps") the gift. The interactive element may include a signal indicating to the recipient to select the interactive element to begin the gift redemption process (e.g., "SEE YOUR GIFT") As another example, the initial gift notification may include explanatory information that provides the recipient with various details related to the receipt of the gift (e.g., "You have received a gift. To redeem your gift, select the button above, and provide your address to have your gift shipped to you"). As another example, the initial gift notification may include information that provides the recipient with other details about the gift redemption process (e.g., that the recipient will have the option to exchange the gift for another gift, that the recipient will have the option to select certain customization options related to the gift, etc.).

In one or more embodiments, when the recipient selects to reveal the gift using the interactive element of the gift notification, or otherwise views the gift, the recipient may be navigated to a page that displays the gift that was selected by the gifting entity in the gift order. The display of the gift may include an image of the gift, the name of the gift, details related to the gift, etc. The page may also include an interactive element that, when selected, continues the gift redemption process. The interactive element may include a signal to the recipient indicating that the recipient should select the interactive element (e.g., a button) to continue the gift redemption process. For example, the interactive element may include text, such as "REDEEM YOUR GIFT". In one or more embodiments, the page is generated by the gift order sub-system 110.

In one or more embodiments, when the recipient, via the interactive element on the page, selects to continue the gift redemption process, the recipient may be navigated to another page generated by the gift presentation sub-system 120 of the gifting service system 104 that provides various options to the recipient. Such options may include, but are not limited to, the option to accept the gift selected by the gifting entity, or to exchange the gift for an alternate gift option. The page may include one or more alternate gifts that the recipient could choose to exchange for the gift selected by the gifting entity. The alternate gifts may be presented using an image, a name, and/or details of the one or more alternate gifts. The page may also include an image, name, and or details related to the gift selected by the gifting entity (e.g., for the sake of comparison by the recipient with the one or more alternate gift options).

The page may also include an interactive element that, when selected, allows the recipient to continue the gift redemption process. The interactive element may change, depending on other selections made by the recipient. For example, the interactive element may be a button that, when selected by the recipient, navigates the recipient to another page to continue the gift redemption process. The interactive element may include a signal indicating to the recipient to select the interactive element to continue the process. The signal may, for example, be text, which may change based on other selections of the recipient. As an example, the text may state "Continue" if the recipient checks a check element on the page indicating that they would prefer to continue with the gift selected by the sender, but change to "Exchange this gift" if the recipient checks a check element indicating that they would prefer to exchange the gift for an alternate gift. In one or more embodiments, if the recipient makes a selection on the page indicating that the recipient wants to exchange the gift, then the elements on the page presenting the one or more alternate gift options may be selectable to allow the recipient to indicate which alternate gift the recipient prefers. In such a scenario, the page may also include an indication to the recipient that the recipient should select from among the alternate gift options.

In one or more embodiments, the alternate gift options presented to the recipient are the same as the other gift options that were presented to the gifting entity. In other embodiments, the alternate gift options presented to the recipient are different from the other gift options that were previously presented to the gifting entity. In one or more embodiments, when more than one gift option is presented to the recipient (i.e., the gift and one or more alternate gifts), the alternate gifts may be determined by the gift options algorithm 118 of the gifting service system 104. As an example, the gift options algorithm 118 may include a predictive machine learning model that takes as input product information 112, consumer information 114, and/or information associated with the intended recipient to predict one or more alternate gifts that increase the likelihood that the recipient will select to redeem a gift.

In one or more embodiments, the one or more gift options presented to the recipient may depend on when the recipient selects to redeem a gift (i.e., the timing of the selection to redeem the gift). As an example, the gifting service system 104 may transmit the gift notification in the form of an email. In such a scenario, the recipient may not immediately open the email, or may open the email but not immediately select to redeem the gift. Thus, the one or more gift options that would be presented to the recipient may have changed since the time of the purchase. Therefore, the gift options algorithm 128 may be invoked at the time the recipient selects to redeem the gift in order to present gift options that are available at the time of the selection.

In one or more embodiments, once the recipient has selected to continue with the gift selected by the gifting entity, or selected an alternate gift, the recipient may be presented with various customization options (e.g., size, color, etc.) and requests for information (e.g., address to send the gift to, preferred delivery options, etc.). The customization options and request for information may be presented to the recipient on a subsequent page generated by the gift presentation sub-system 120 of the gifting service system 104. In one or more embodiments, the recipient is also optionally presented with an option to send a thank you to the gifting entity for the gift. Although the above description contemplates various presentations and pages provided to the recipient to complete the gift redemption process, all or any portion of the presentations and pages may be combined into a single page, or divided differently into separate pages, without departing from the scope of embodiments described herein.

In one or more embodiments, once the recipient has made all necessary selections and provided the requested information (which may be referred to collectively as gift selections), the gift selections are transmitted from the recipient device 126 to the gifting service system 104. In one or more embodiments, based at least in part on the gift selections, the gift presentation sub-system 120 of the gifting service system 104 initiates delivery of the selected gift to the recipient. The method of delivery may be based on a selection made by the recipient during the gift redemption process by which the recipient indicated a preferred method of delivery. As an example, the gift may be a gift card, and the recipient may have selected to receive the gift card as a virtual gift card delivered via email. As another example, the gift may be a physical object, and the recipient may have provided a physical address to which the gift is shipped. The gifting service system 104 may perform the delivery of the gift. Additionally or alternatively, the gifting service system 104 may provide information related to the planned delivery to a third-party to perform the delivery of the gift to the recipient. In one or more embodiments, all or any portion of any information obtained related to the sender and/or the recipient is used by the gifting service system 104 to dynamically update historical data maintained by the gifting service system 104, which may be used to dynamically update the machine learning model of the gift options algorithm 118 by adding the obtained information in real-time to the training data sets for the machine learning models.

In one or more embodiments, the gift presentation sub-system 120 of the gifting service system 104 includes a value difference calculator 136. The value difference calculator 136 may be implemented on one or more computing devices of the gifting service system 104, such as the computing device 1102 described herein at least in connection with FIG. 11, or any portion of such computing devices. Additionally or alternatively, the value difference calculator 136 may be implemented as an application or other executable process on one or more computing devices of the gifting service system 104. In one or more embodiments, the value difference calculator 136 is configured to use the price paid for the gift by the gifting entity and either the price of the gift at the time the gift is redeemed by the recipient, or the price of the alternate gift option selected by the recipient, to determine a value difference, if any. As an example, the price of the gift paid by the gifting entity may be $200, and, at the time of redemption, the gift is on sale for $150. In such a scenario, the value difference calculator determines a value difference of $50. As another example, the gifting entity may have paid $127 for the gift, and the recipient may have selected an alternate gift option with a price of $100. In such a scenario, the value difference calculator determines a value difference of $27.

In one or more embodiments, any time after the recipient provides a selection of the gift or an alternate gift option, the value difference calculator 136 determines the value difference, if any, as described above. In one or more embodiments, when the value difference calculator 136 determines that the value difference is any value greater than zero, the gifting service system 104 transmits a balance notification to the recipient device 126. In such scenarios, the balance notification provided may include one or more additional interactive elements that provide alternate redemption options. Such alternate redemption options may include, for example, an option to donate the value of the positive balance determined by the value difference calculator 136 (e.g., to a charity). In one or more embodiments, donation is a process by which a gift recipient can select to begin a process for providing the value of the positive balance to a donation recipient.

In one or more embodiments, whether a recipient of a gift is presented with an option to donate the value of the positive balance is determined, at least in part, using a redemption options algorithm 128 of the machine learning system 116 of the gifting service system 104. The redemption options algorithm 128 may be configured to analyze consumer information 114 (e.g., gifting entity information, recipient information, etc.), product information 112, or any combination thereof, to determine whether to present a donation option to the recipient device 126.

The redemption options algorithm 128 may be implemented on one or more computing devices of the gifting service system 104, such as the computing device 1102 described herein at least in connection with FIG. 11, or any portion of such computing devices. Additionally or alternatively, the redemption options algorithm 128 may be implemented as an application or other executable process on one or more computing devices of the gifting service system 104.

In one or more embodiments, the redemption options algorithm 128 is invoked by the gifting service system 104 in response to receiving or otherwise obtaining a gift order from the gifting entity device 102. The redemption options algorithm 128 may include any number of rules to be evaluated in order to determine whether a donation option should be provided to the recipient device 126. As an example, the redemption options algorithm 128 may include a rule that evaluates whether the gift order included an indication from the gifting entity that donating the value of any positive balance should or should not be allowed. Based on an evaluation of such a rule, the redemption options algorithm 128 may only provide the donation option to the recipient when the gift order includes an indication that donation is to be allowed for the positive balance, or, alternatively, that the gift order does not include an indication that donation is not to be allowed for the positive balance.

As another example, the redemption options algorithm 128 may include a rule that the positive balance must be greater than a certain amount for the donation option to be provided to the recipient. As an example, the rule may indicate that the donation option should only be provided when the positive balance is greater than $10.

The redemption options algorithm 128 may include rules that a recipient having certain demographic characteristics qualifies to receive an option to donate the value of a positive balance. For example, the redemption options algorithm 128 may include a rule that a recipient in a certain geographic region, that is of a certain age, that is married, etc. qualifies to allow a donation option to be provided to a recipient.

In one or more embodiments, the above-described rules, and/or any other such rules, may be evaluated by the redemption options algorithm 128 in any combination to determine whether a donation option should be presented to a recipient. As an example, a combination of rules may be evaluated by the redemption options algorithm 128 that indicate that a donation option may be presented when a gift order explicitly includes an indication that the gifting entity wants to allow donation of the positive balance, the recipient is within a certain geographic region, and the positive balance is over $5.

In one or more embodiments, the redemption options algorithm 128 may be or include a machine learning model that is trained to determine whether to present a donation option to a recipient. As an example, historical product information 112 and/or consumer information 114 may be combined with previous outcomes (e.g., a donation option was presented and selected, a donation option was presented and not selected, etc.) to create a training data set for the machine learning model. The training of the machine learning model may be intended to train the model to predict the likelihood of a desired outcome with an associated confidence level for the prediction. As an example, the gifting service associated with the gifting service system 104 may desire to see increased charitable donations in a particular geographic region, and, thus, the machine learning model may be trained to predict the likelihood that presenting a donation option to a particular recipient will result in a donation associated with the particular geographic region.

In one or more embodiments, when a balance notification is transmitted from the gifting service system 104 to the recipient device 126, consumer information 114 and/or product information 112, historical and/or obtained in real-time, may be used as input to the trained machine learning model to predict whether presenting a recipient with an option to donate the value of a positive balance results in a positive or desired outcome, such as the recipient being more likely to engage the services of the gifting service associated with the gifting service system 104 in the future. In one or more embodiments, if the prediction of the machine learning model has a confidence level above a defined threshold, then the redemption options algorithm 128 may make a determination that a donation option should be presented to the recipient.

Other machine learning techniques may be used as part of the redemption options algorithm 128 without departing from the scope of embodiments described herein. As an example, a clustering machine learning algorithm (e.g., k-means clustering algorithms, fuzzy c-means (FCM) algorithms, expectation-maximization (EM) algorithms, hierarchical clustering algorithms, density-based spatial clustering of applications with noise (DBSCAN) algorithms, etc.) may be used to identify whether the product information 112 and/or consumer information 114 associated with the gift order and intended gift recipient include characteristics similar to other scenarios for which a donation option resulted in a positive outcome.

In one or more embodiments, when the redemption options algorithm 128 determines that a donation option for the positive balance should be presented to a recipient, the donation option is included in a balance notification. In one or more embodiments, the balance notification is generated by the gift order sub-system 110, and transmitted from the gifting service system 104 to the recipient device 126. In one or more embodiments, the donation option is included in the balance notification as an interactive element, such as a button, text hyperlink, QR code, etc. The interactive element may include and/or be accompanied by a signal to the recipient that the option to donate the value of the positive balance is available (e.g., a button accompanied by the text "You have a positive gift balance. Click here to donate the balance").

In one or more embodiments, when a recipient uses an interactive element to indicate a desire to donate the value of the positive balance to a donation recipient, either from the balance notification or from a subsequent page in the redemption process, the indication, which may be referred to as a donation request, is transmitted from the recipient device 126 to the gifting service system 104. In one or more embodiments, the transmission of the donation request initiates a donation process. In one or more embodiments, the donation process includes the gifting service system 104 requesting various items of information from the recipient, which may be presented as one or more pages transmitted to the recipient device 126. Each page may request all or any portion of the information necessary to donate the value of the positive balance.

In one or more embodiments, the donation information request includes a request from the gifting service system 104 for the recipient associated with the recipient device 126 to identify a donation recipient, such as a charity, that will receive the value of the positive balance as a donation. In one or more embodiments, the recipient may identify any donation recipient to which the value of the positive balance will be donated. In one or more embodiments, the recipient is presented with a set of one or more donation recipient options from among which the recipient may select a particular donation recipient. The set of one or more donation recipients presented to the recipient in the donation information request may be specified by the gifting entity (e.g., during the gift order process). In one or more embodiments, the set of one or more donation recipients is determined dynamically in real-time by the redemption options algorithm 128 of the gifting service system 104. As an example, the redemption options algorithm 128 may include a machine learning model trained to predict potential donation recipients to which a recipient having a particular set of characteristics is likely to donate. The machine learning model may use as input information related to the recipient, the gifting entity, product information, etc. and output potential donation recipients with a predicted likelihood that, if presented as donation recipient options, would be selected by the recipient for donating the value of the positive balance. The machine learning model may be dynamically updated when donation options are presented to recipient by associating information related to the recipient, the gifting entity, the gift, etc. with the outcome of presenting the donation option, and adding the associated information set to the training data set for the machine learning model. In one or more embodiments, rather than selecting a single donation recipient, the recipient may choose to divide the value of the positive balance among any number of separate donation recipients, with each such donation recipient receiving any portion of the value of the positive balance.

In one or more embodiments, the set of information provided by the recipient during the donation process, which may collectively be referred to as donation information, is transmitted from the recipient device 126 to the gifting service system 104. In one or more embodiments, the gifting service system 104 includes a gift presentation sub-system 120. The gift presentation sub-system 120 may be implemented on one or more computing devices, such as the computing device 1102 described herein at least in connection with FIG. 11. Additionally or alternatively, the gift presentation sub-system 120 may be implemented as an application or other executable process on one or more computing devices of the gifting service system 104. In one or more embodiments, the gift presentation sub-system is configured to perform various actions related to the redemption of the gift, alternate redemption selections, presenting and/or delivering the gift to recipients, etc.

In one or more embodiments, the value of the positive balance is donated to one or more donation recipients. In one or more embodiments, the gifting service system 104 provides the donation to the donation recipient. The donation may be provided to the recipient via a donation recipient device 132. The donation recipient device 132 may be implemented on one or more computing devices, such as the computing device 1102 described herein at least in connection with FIG. 11. In one or more embodiments, the gifting service system 104 provides the value of the positive balance to the recipient to allow the recipient to perform the donation, and gain any benefits that may be associated with the donation. In one or more embodiments, once the donation is complete, a donation confirmation is transmitted from the gifting service system 104 to the recipient device 126.

In one or more embodiments, all or any portion of any information obtained related to the gifting entity, the initial intended gift recipient, and/or the one or more donation recipients is used by the gifting service system 104 to dynamically update historical data maintained by the gifting service system 104, which may be used to dynamically update the machine learning models of the redemption options algorithm 128 and/or the gift options algorithm 118 by adding the obtained information in real-time to the training data sets for the machine learning models.

Figure 4:
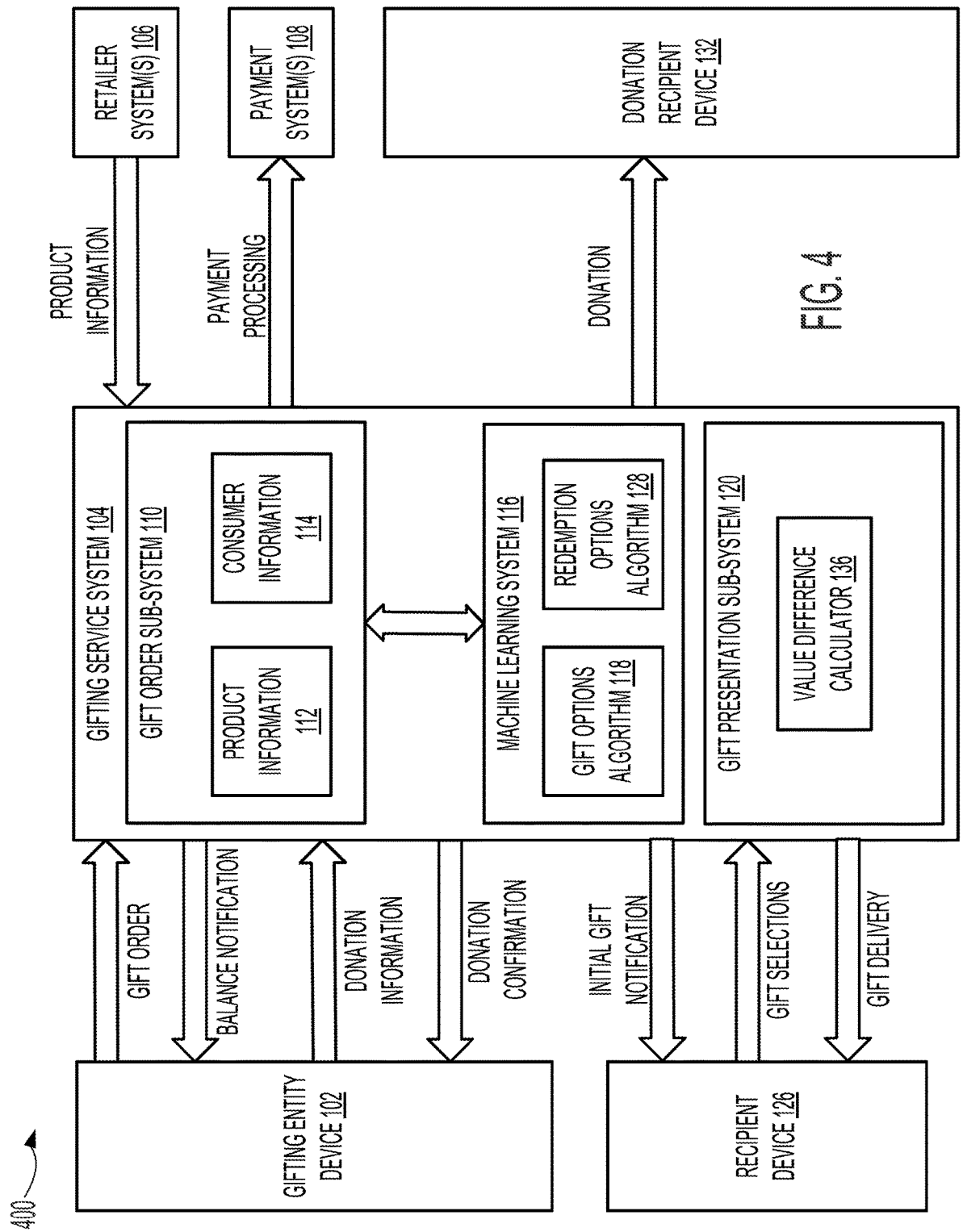
FIG. 4 shows an illustrative example of an environment in which a gifting entity interacts with a gifting service system via a gifting entity device in order to provide a productor other item as a gift to a recipient, and in which the gifting entity is provided an alternate gift redemption option to donate a positive balance that remains after the gift has been redeemed.

FIG. 4 shows an illustrative example of an environment 400 in which a gifting entity (e.g., a consumer, a corporate entity, etc.) interacts with a gifting service system 104 via a gifting entity device 102 in order to provide a product (e.g., goods, services) or other item (e.g., gift card, coupon, etc.) as a gift to a recipient (not shown), and in which the gifting entity is provided an alternate gift redemption option to donate all or any portion of a positive balance that remains after the gift has been redeemed (e.g., to a charity). A gift may be any item, such as a product, service, gift card, coupon, etc. Other items may be gifts without departing from the scope of embodiments described herein. As an example, the gifting entity may have paid a certain price for a gift, but at the time the recipient chooses to redeem the gift, the price has reduced, leaving a remaining positive balance of the difference between the price paid by the gifting entity and the price of the gift at the time of redemption. As another example, the gifting entity may have paid a certain price for a gift, but the recipient chooses to redeem an alternate gift option, leaving a remaining positive balance of the difference between the price paid by the gifting entity and the price of the alternate gift at the time of redemption. In either case, the gifting entity may be provided an alternate redemption option of donating the remaining positive balance.

The gifting entity device 102 may be a computing device such as the computing device 1102 described herein at least in connection with FIG. 11. The computing device may be, for example, a laptop computer, a desktop computer, a smartphone, a tablet, a smart watch, or any other type of computing device such as those described herein. As an example, an entity, such as a business, non-profit organization, charity, etc. may offer gifts to consumers online or in a physical establishment setting (e.g., a retail establishment, trade show, etc.). In such a scenario, the entity may use a gifting entity device 102 to interact with the gifting service prior to an offer of a gift being made in order to provide details about at least one gift option that may be offered to one or more potential recipients. As an example, a company may use the gifting entity device 102 to provide information about a customizable item (e.g., team jersey, bottled beverage, etc.) that the company would like to offer to potential recipients at a tradeshow, in a retail establishment, or online, which may be facilitated by the gifting service system 104.

The gifting service system 104 may be one or more computing devices such as the computing device 1102 described herein at least in connection with FIG. 11. As an example, the gifting service system 104 may be one or more server computing devices controlled or otherwise used by a gifting service (not shown). In one or more embodiments, a gifting service is any entity that provides a framework through which gifting entities can order gifts to be provided to recipients.

As discussed above in the description of FIG. 1, a gifting entity, via the gifting entity device 102, may select a gift and transmit a gift order to the gifting service system 104. The gift order may be transmitted in response to a gifting entity viewing an advertisement from the gifting service system 104. The gift order may be transmitted after the gifting entity accesses one or more webpages provided by the gifting service system 104. The gift order may be transmitted during an interaction between the gifting entity and the gifting service system 104 prior to the gifting entity offering one or more gifts to potential recipients, such as at a trade show, at a physical retail establishment, or online.

In one or more embodiments, a gift order is transmitted from the gifting entity device 102 to the gifting service system 104 over a network (not shown), such as the network 1122 described herein at least in connection with FIG. 11. In one or more embodiments, a gift order includes any information related to a gift selected by a gifting entity to give to a recipient, such as an identification of the gift selected by the gifting entity (e.g., from among various gift options presented), any customization options related to the gift, and/or information associated with the intended recipient of the gift (e.g., name, contact information such as email address, etc.). In certain scenarios, information associated with the intended recipient may not be included with the gift order. As an example, a gifting entity may be a business that sets up a booth in a trade show from which the business intends to provide gifts to consumers (i.e., gift recipients). In such a scenario, the business may generate a gift order when a consumer approaches the booth and is interested in receiving the gift. The consumer (i.e., the gift recipient) may then use a device provided by the business and/or their own device to provide gift recipient information.

As another example, a gifting entity may be a consumer using a browser application (not shown) of the gifting entity device 102, who is provided an advertisement from the gifting service system 104 while viewing the content of a webpage and interacts with an interactive element (e.g., a button) of the advertisement to initiate a gift selection process, select a particular gift, and provide relevant additional information (e.g., name and contact information for the intended gift recipient), in order to place a gift order with the gifting service system 104. As another example, a gifting entity may be a corporation that interacts with the gifting service system 104 via the gifting entity device 102 to have the gifting service system 104 prepare to facilitate providing the gift to potential recipients that interact with the corporation (e.g., online, at a trade show, at a retail establishment, etc.).

In one or more embodiments, the gift order is received at the gift order sub-system of 110 of the gifting service system 104. The gift order sub-system 110 may interact further with the gifting entity device 102 in order to obtain any additional information to complete the gift order. For example, if intended recipient information was not included in the gift selection, the gift order sub-system 110 may request such information from the gifting entity device 102. As another example, the gift order sub-system may request any additional information related to the gift being ordered (e.g., color, size, etc.). As another example, the gift order sub-system 110 may request payment information from the gifting entity so that the gift may be paid for. In one or more embodiments, the gifting order sub-system may further transmit transaction information for purchase of the gift to one or more payment systems 108 for payment authorization and processing.

As an example, a gift order process may include presenting a page including the one or more gift options to the gifting entity associated with the gifting entity device 102 that includes an interactive element (e.g., a button) that, when selected (after selecting a gift if more than one is offered), navigates the gifting entity to another page where additional information is requested from the gifting entity. The page may include any number of different requests for information. As an example, the page may request that the gifting entity select a communication channel (e.g., email, text, messenger service, printed mail delivery, etc.) through which the gifting entity wants the intended recipient to receive notification of the gift. As another example, the page may include a request for a recipient identifier. The recipient identifier may include the name of the intended recipient of the gift, as well as information that facilitates the receipt, by the recipient, of a notification of the gift. The portion of the recipient identifier information facilitating the notification may be based on the communication channel selected (e.g., email address if email is selected, phone number if text message is selected, messenger service name or handle if messenger service is selected, address if mail delivery is selected, etc.). As another example, the page may include a request for the gifting entity to provide the gifting entity's name and, optionally, a message to be delivered to the recipient as part of the notification of the gift. As another example, the page may include a request for the gifting entity to select from among various options for virtual gift wrapping that will appear in the notification. Although the above description contemplates various presentations and pages provided to the consumer to complete the gift order process, all or any portion of the presentations and pages may be combined into a single page, or divided differently into separate pages without departing from the scope of embodiments described herein.

In one or more embodiments, once the gifting entity makes all requested selections and provides all requested information (which may be referred to collectively as a gift order), the gifting entity device 102 transmits the gift order to the gifting service system 104. The gift order may be transmitted over a network (e.g., network 1122 of FIG. 11), and the various items of information included as part of the gift order may be sent as part of the same transmission, or broken into any number of separate transmissions to the gifting service system 104. In response to receipt of the gift order from the gifting entity device 102, the gifting service system 104 may generate an initial gift notification, and transmit the initial gift notification to a recipient device 126 associated with the intended recipient of the gift. The recipient device 126 may be a computing device such as the computing device 1102 described herein at least in connection with FIG. 11. The computing device may be, for example, a laptop computer, a desktop computer, a smartphone, a tablet, a smart watch, or any other type of computing device such as those described herein. The initial gift notification may be generated by a gift order sub-system 110 of the gifting service system 104.

In one or more embodiments, the initial gift notification is transmitted to the recipient device 126 using a communication channel selected by the gifting entity, which may include using at least a portion of the recipient identifier provided by the gifting entity (or the intended recipient, depending on the scenario). For example, if email was selected as the communication channel, the initial gift notification may be transmitted using an email address of the recipient provided by the gifting entity. As another example, if text message was selected as the communication channel, then a phone number of the recipient associated with the recipient device 126 may be used to send the initial gift notification. As another example, the gifting entity may be a business or other entity that is offering a gift to a recipient that is physically present (e.g., at a retail establishment, a trade show, etc.). In such a scenario, the initial gift notification may be provided to the recipient on a device provided by the gifting entity to the recipient, or via a QR code (or any similar mechanism) that the recipient scans on their own recipient device 126.

In one or more embodiments, the initial gift notification includes an indication that the recipient has been sent a gift. The indication may or may not identify the sender of the gift (e.g., "Kelly got you a gift!"). The initial gift notification may include any other information without departing from the scope of embodiments described herein. As an example, the initial gift notification may include an image of virtual gift wrapping, and an interactive element that, when selected by the recipient, reveals (e.g., "unwraps") the gift. The interactive element may include a signal indicating to the recipient to select the interactive element to begin the gift redemption process (e.g., "SEE YOUR GIFT") As another example, the initial gift notification may include explanatory information that provides the recipient with various details related to the receipt of the gift (e.g., "You have received a gift. To redeem your gift, select the button above, and provide your address to have your gift shipped to you"). As another example, the initial gift notification may include information that provides the recipient with other details about the gift redemption process (e.g., that the recipient will have the option to exchange the gift for another gift, that the recipient will have the option to select certain customization options related to the gift, etc.).

In one or more embodiments, when the recipient selects to reveal the gift using the interactive element of the gift notification, or otherwise views the gift, the recipient may be navigated to a page that displays the gift that was selected by the gifting entity in the gift order. The display of the gift may include an image of the gift, the name of the gift, details related to the gift, etc. The page may also include an interactive element that, when selected, continues the gift redemption process. The interactive element may include a signal to the recipient indicating that the recipient should select the interactive element (e.g., a button) to continue the gift redemption process. For example, the interactive element may include text, such as "REDEEM YOUR GIFT". In one or more embodiments, the page is generated by the gift order sub-system 110.

In one or more embodiments, when the recipient, via the interactive element on the page, selects to continue the gift redemption process, the recipient may be navigated to another page generated by the gift presentation sub-system 120 of the gifting service system 104 that provides various options to the recipient. Such options may include, but are not limited to, the option to accept the gift selected by the gifting entity, or to exchange the gift for an alternate gift option. The page may include one or more alternate gifts that the recipient could choose to exchange for the gift selected by the gifting entity. The alternate gifts may be presented using an image, a name, and/or details of the one or more alternate gifts. The page may also include an image, name, and or details related to the gift selected by the gifting entity (e.g., for the sake of comparison by the recipient with the one or more alternate gift options).

The page may also include an interactive element that, when selected, allows the recipient to continue the gift redemption process. The interactive element may change, depending on other selections made by the recipient. For example, the interactive element may be a button that, when selected by the recipient, navigates the recipient to another page to continue the gift redemption process. The interactive element may include a signal indicating to the recipient to select the interactive element to continue the process. The signal may, for example, be text, which may change based on other selections of the recipient. As an example, the text may state "Continue" if the recipient checks a check element on the page indicating that they would prefer to continue with the gift selected by the sender, but change to "Exchange this gift" if the recipient checks a check element indicating that they would prefer to exchange the gift for an alternate gift. In one or more embodiments, if the recipient makes a selection on the page indicating that the recipient wants to exchange the gift, then the elements on the page presenting the one or more alternate gift options may be selectable to allow the recipient to indicate which alternate gift the recipient prefers. In such a scenario, the page may also include an indication to the recipient that the recipient should select from among the alternate gift options.

In one or more embodiments, the alternate gift options presented to the recipient are the same as the other gift options that were presented to the gifting entity. In other embodiments, the alternate gift options presented to the recipient are different from the other gift options that were previously presented to the gifting entity. In one or more embodiments, when more than one gift option is presented to the recipient (i.e., the gift and one or more alternate gifts), the alternate gifts may be determined by the gift options algorithm 118 of the gifting service system 104. As an example, the gift options algorithm 118 may include a predictive machine learning model that takes as input product information 112, consumer information 114, and/or information associated with the intended recipient to predict one or more alternate gifts that increase the likelihood that the recipient will select to redeem a gift.

In one or more embodiments, the one or more gift options presented to the recipient may depend on when the recipient selects to redeem a gift (i.e., the timing of the selection to redeem the gift). As an example, the gifting service system 104 may transmit the gift notification in the form of an email. In such a scenario, the recipient may not immediately open the email, or may open the email but not immediately select to redeem the gift. Thus, the one or more gift options that would be presented to the recipient may have changed since the time of the purchase. Therefore, the gift options algorithm 128 may be invoked at the time the recipient selects to redeem the gift in order to present gift options that are available at the time of the selection.

In one or more embodiments, once the recipient has selected to continue with the gift selected by the gifting entity, or selected an alternate gift, the recipient may be presented with various customization options (e.g., size, color, etc.) and requests for information (e.g., address to send the gift to, preferred delivery options, etc.). The customization options and request for information may be presented to the recipient on a subsequent page generated by the gift presentation sub-system 120 of the gifting service system 104. In one or more embodiments, the recipient is also optionally presented with an option to send a thank you to the gifting entity for the gift. Although the above description contemplates various presentations and pages provided to the recipient to complete the gift redemption process, all or any portion of the presentations and pages may be combined into a single page, or divided differently into separate pages, without departing from the scope of embodiments described herein.

In one or more embodiments, once the recipient has made all necessary selections and provided the requested information (which may be referred to collectively as gift selections), the gift selections are transmitted from the recipient device 126 to the gifting service system 104. In one or more embodiments, based at least in part on the gift selections, the gift presentation sub-system 120 of the gifting service system 104 initiates delivery of the selected gift to the recipient. The method of delivery may be based on a selection made by the recipient during the gift redemption process by which the recipient indicated a preferred method of delivery. As an example, the gift may be a gift card, and the recipient may have selected to receive the gift card as a virtual gift card delivered via email. As another example, the gift may be a physical object, and the recipient may have provided a physical address to which the gift is shipped. The gifting service system 104 may perform the delivery of the gift. Additionally or alternatively, the gifting service system 104 may provide information related to the planned delivery to a third-party to perform the delivery of the gift to the recipient. In one or more embodiments, all or any portion of any information obtained related to the sender and/or the recipient is used by the gifting service system 104 to dynamically update historical data maintained by the gifting service system 104, which may be used to dynamically update the machine learning model of the gift options algorithm 118 by adding the obtained information in real-time to the training data sets for the machine learning models.

In one or more embodiments, the gift presentation sub-system 120 of the gifting service system 104 includes a value difference calculator 136. The value difference calculator 136 may be implemented on one or more computing devices of the gifting service system 104, such as the computing device 1102 described herein at least in connection with FIG. 11, or any portion of such computing devices. Additionally or alternatively, the value difference calculator 136 may be implemented as an application or other executable process on one or more computing devices of the gifting service system 104. In one or more embodiments, the value difference calculator 136 is configured to use the price paid for the gift by the gifting entity and either the price of the gift at the time the gift is redeemed by the recipient, or the price of the alternate gift option selected by the recipient, to determine a value difference, if any. As an example, the price of the gift paid by the gifting entity may be $200, and, at the time of redemption, the gift is on sale for $150. In such a scenario, the value difference calculator determines a value difference of $50. As another example, the gifting entity may have paid $127 for the gift, and the recipient may have selected an alternate gift option with a price of $100. In such a scenario, the value difference calculator determines a value difference of $27.

In one or more embodiments, any time after the recipient provides a selection of the gift or an alternate gift option, the value difference calculator 136 determines the value difference, if any, as described above. In one or more embodiments, when the value difference calculator 136 determines that the value difference is any value greater than zero, the gifting service system 104 transmits a balance notification to the gifting entity device 102. In such scenarios, the balance notification provided may include one or more additional interactive elements that provide alternate redemption options. Such alternate redemption options may include, for example, an option to donate the value of the positive balance determined by the value difference calculator 136 (e.g., to a charity). In one or more embodiments, donation is a process by which the gifting entity can select to begin a process for providing the value of the positive balance to a donation recipient.

In one or more embodiments, whether a gifting entity is presented with an option to donate the value of the positive balance is determined, at least in part, using a redemption options algorithm 128 of the machine learning system 116 of the gifting service system 104. The redemption options algorithm 128 may be configured to analyze consumer information 114 (e.g., gifting entity information, recipient information, etc.), product information 112, or any combination thereof, to determine whether to present a donation option to the gifting entity device 102.

The redemption options algorithm 128 may be implemented on one or more computing devices of the gifting service system 104, such as the computing device 1102 described herein at least in connection with FIG. 11, or any portion of such computing devices. Additionally or alternatively, the redemption options algorithm 128 may be implemented as an application or other executable process on one or more computing devices of the gifting service system 104.

In one or more embodiments, the redemption options algorithm 128 is invoked by the gifting service system 104 in response to receiving or otherwise obtaining a gift order from the gifting entity device 102. The redemption options algorithm 128 may include any number of rules to be evaluated in order to determine whether a donation option should be provided to the recipient device 126. As an example, the redemption options algorithm 128 may include a rule that evaluates whether the gift order included an indication from the gifting entity that the gifting entity would like the option to donate any remaining positive balance after the gift, or an alternate gift, is redeemed.

As another example, the redemption options algorithm 128 may include a rule that the positive balance must be greater than a certain amount for the donation option to be provided to the gifting entity. As an example, the rule may indicate that the donation option should only be provided when the positive balance is greater than $10.

The redemption options algorithm 128 may include rules that indicate that a gift order made by a gifting entity having certain demographic characteristics qualifies to receive an option to donate the value of a positive balance. For example, the redemption options algorithm 128 may include a rule that any gift order made by a gifting entity in a certain geographic region, that is of a certain age, that is married, that is a business of a certain type, etc. qualifies to allow a donation option to be provided to a gifting entity.

In one or more embodiments, the above-described rules, and/or any other such rules, may be evaluated by the redemption options algorithm 128 in any combination to determine whether a donation option should be presented to a gifting entity. As an example, a combination of rules may be evaluated by the redemption options algorithm 128 that indicate that a donation option may be presented when a gift order explicitly includes an indication that the gifting entity wants an option to donate a positive balance, and the positive balance is over $5.

In one or more embodiments, the redemption options algorithm 128 may be or include a machine learning model that is trained to determine whether to present a donation option to a gifting entity. As an example, historical product information 112 and/or consumer information 114 may be combined with previous outcomes (e.g., a donation option was presented and selected, a donation option was presented and not selected, etc.) to create a training data set for the machine learning model. The training of the machine learning model may be intended to train the model to predict the likelihood of a desired outcome with an associated confidence level for the prediction. As an example, the gifting service associated with the gifting service system 104 may desire to see increased charitable donations in a particular geographic region, and, thus, the machine learning model may be trained to predict the likelihood that presenting a donation option to a particular gifting entity will result in a donation associated with the particular geographic region.

In one or more embodiments, when an balance notification is transmitted from the gifting service system 104 to the gifting entity device 102, consumer information 114 and/or product information 112, historical and/or obtained in real-time, may be used as input to the trained machine learning model to predict whether presenting a gifting entity with an option to donate the value of a positive balance results in a positive or desired outcome, such as the gifting entity being more likely to engage the services of the gifting service associated with the gifting service system 104 in the future. In one or more embodiments, if the prediction of the machine learning model has a confidence level above a defined threshold, then the redemption options algorithm 128 may make a determination that a donation option should be presented to the gifting entity.

Other machine learning techniques may be used as part of the redemption options algorithm 128 without departing from the scope of embodiments described herein. As an example, a clustering machine learning algorithm (e.g., k-means clustering algorithms, fuzzy c-means (FCM) algorithms, expectation-maximization (EM) algorithms, hierarchical clustering algorithms, density-based spatial clustering of applications with noise (DBSCAN) algorithms, etc.) may be used to identify whether the product information 112 and/or consumer information 114 associated with the gift order and intended gift recipient include characteristics similar to other scenarios for which a donation option resulted in a positive outcome.

In one or more embodiments, when the redemption options algorithm 128 determines that a donation option for the positive balance should be presented to a gifting entity, the donation option is included in a balance notification. In one or more embodiments, the balance notification is generated by the gift order sub-system 110, and transmitted from the gifting service system 104 to the gifting entity device 102. In one or more embodiments, the donation option is included in the balance notification as an interactive element, such as a button, text hyperlink, QR code, etc. The interactive element may include and/or be accompanied by a signal to the gifting entity that the option to donate the positive balance is available (e.g., a button accompanied by the text "You have a positive gift balance. Click here to donate the balance").

In one or more embodiments, when a gifting entity uses an interactive element to indicate a desire to donate the value of the positive balance to a donation recipient, either from the balance notification or from a subsequent page in the redemption process, the indication, which may be referred to as a donation request, is transmitted from the gifting entity device 102 to the gifting service system 104. In one or more embodiments, the transmission of the donation request initiates a donation process. In one or more embodiments, the donation process includes the gifting service system 104 requesting various items of information from the recipient, which may be presented as one or more pages transmitted to the gifting entity device 102. Each page may request all or any portion of the information necessary to donate the value of the positive balance.

In one or more embodiments, the donation information request includes a request from the gifting service system 104 for the gifting entity associated with the gifting entity device 102 to identify a donation recipient, such as a charity, that will receive the value of the positive balance as a donation. In one or more embodiments, the gifting entity may identify any donation recipient to which the value of the positive balance will be donated. In one or more embodiments, the gifting entity is presented with a set of one or more donation recipient options from among which the gifting entity may select a particular donation recipient. The set of one or more donation recipients presented to the recipient in the donation information request may be specified by the gifting entity (e.g., during the gift order process). In one or more embodiments, the set of one or more donation recipients is determined dynamically in real-time by the redemption options algorithm 128 of the gifting service system 104. As an example, the redemption options algorithm 128 may include a machine learning model trained to predict potential donation recipients to which a gifting entity having a particular set of characteristics is likely to donate. The machine learning model may use as input information related to the recipient, the gifting entity, product information, etc. and output potential donation recipients with a predicted likelihood that, if presented as donation recipient options, would be selected by the gifting entity for donating the value of the positive balance. The machine learning model may be dynamically updated when donation options are presented to gifting entities by associating information related to the recipient, the gifting entity, the gift, etc. with the outcome of presenting the donation option, and adding the associated information set to the training data set for the machine learning model. In one or more embodiments, rather than selecting a single donation recipient, the gifting entity may choose to divide the value of the positive balance among any number of separate donation recipients, with each such donation recipient receiving any portion of the value of the positive balance.

In one or more embodiments, the set of information provided by the gifting entity during the donation process, which may collectively be referred to as donation information, is transmitted from the gifting entity device 102 to the gifting service system 104. In one or more embodiments, the gifting service system 104 includes a gift presentation sub-system 120. The gift presentation sub-system 120 may be implemented on one or more computing devices, such as the computing device 1102 described herein at least in connection with FIG. 11. Additionally or alternatively, the gift presentation sub-system 120 may be implemented as an application or other executable process on one or more computing devices of the gifting service system 104. In one or more embodiments, the gift presentation sub-system is configured to perform various actions related to the redemption of the gift, alternate redemption selections, presenting and/or delivering the gift to recipients, etc.

In one or more embodiments, the value of the positive balance is donated to one or more donation recipients. In one or more embodiments, the gifting service system 104 provides the donation to the donation recipient. The donation may be provided to the recipient via a donation recipient device 132. The donation recipient device 132 may be implemented on one or more computing devices, such as the computing device 1102 described herein at least in connection with FIG. 11. In one or more embodiments, the gifting service system 104 provides the donation information, including the one or more selected donation recipients, to the gifting entity via the gifting entity device 102 so that the gifting entity may perform the donation, and gain any benefits that may be associated with the donation.

In one or more embodiments, all or any portion of any information obtained related to the gifting entity, the initial intended gift recipient, and/or the one or more donation recipients is used by the gifting service system 104 to dynamically update historical data maintained by the gifting service system 104, which may be used to dynamically update the machine learning models of the redemption options algorithm 128 and/or the gift options algorithm 118 by adding the obtained information in real-time to the training data sets for the machine learning models.

In one or more embodiments, all or any portion of the alternate redemption options discussed above in the description of FIG. 1, FIG. 2, FIG. 3, and/or FIG. 4 may be provided to relevant entities without departing from the scope of embodiments described herein. As an example, the intended recipient of the gift may be presented with a regift option, as well as a donation option as alternates to redeeming the gift, and, if the recipient decides instead to redeem the gift, an a positive balance exists, the recipient may also be provided with an option to donate the positive balance remaining after redemption of the gift.

Figure 5:
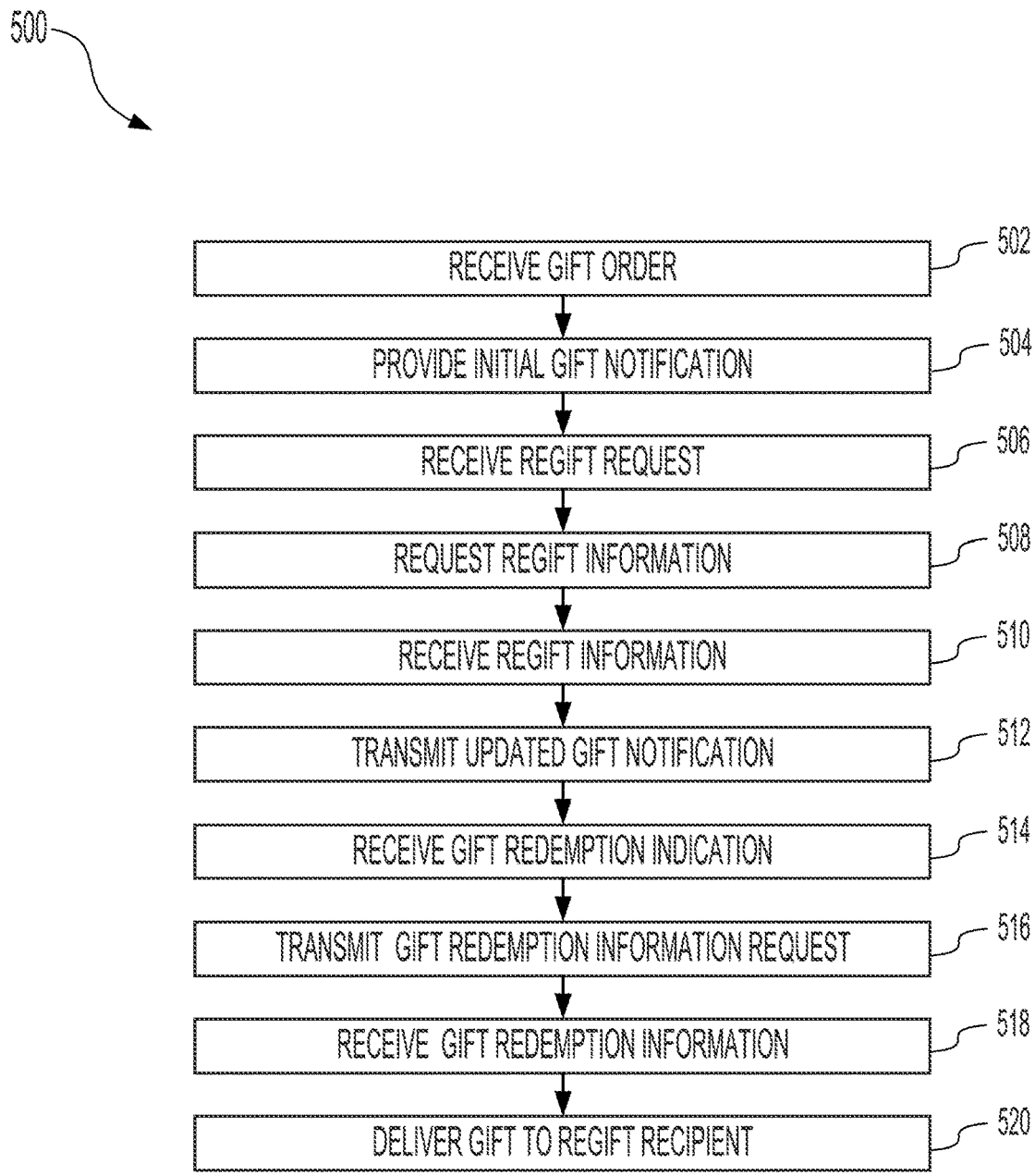
FIG. 5 shows an illustrative example of a process for providing an alternate redemption option to a recipient of a gift to regift the gift to a separate recipient.

FIG. 5 shows an illustrative example of a process 500 for providing an alternate redemption option to a recipient of a gift to regift the gift to a separate recipient. The process 500 may be performed, for example, by a gifting service system, such as gifting service system 104 described above at least in conjunction with FIG. 1.

At step 502, a gift order is received (e.g., by the gifting service system 104 of FIG. 1). In one or more embodiments, the gift order is received from a gifting entity via a gifting entity device (e.g., gifting entity device 102 of FIG. 1) over a network. The gifting entity may be, for example, a consumer or a business entity seeking to provide a gift to a recipient. The gift order may identify a gift that the gifting entity has selected to provide to a recipient. The gift order may include or lead to the obtaining (e.g., from the intended recipient) of information identifying the recipient. Information identifying the recipient may include, but is not limited to, the name of the recipient, a communication channel through which the recipient is to be notified of the gift, and contact information based on the communication channel (e.g., email address, phone number, etc.).

At step 504, the gifting service system provides an initial gift notification to the recipient. In one or more embodiments, the initial gift notification is transmitted via a network from a gifting service system (e.g., gifting service system 104 of FIG. 1) to a recipient device (e.g., recipient device 126 of FIG. 1) associated with the intended recipient. In one or more embodiments, the initial gift notification includes an indication that the recipient has been sent a gift. The indication may or may not identify the gifting entity of the gift (e.g., "Kelly got you a gift!"). The initial gift notification may include any other information without departing from the scope of embodiments described herein. As an example, the gift notification may include an image of virtual gift wrapping, and an interactive element that, when selected by the recipient, reveals (e.g., "unwraps") the gift. The interactive element may include a signal indicating to the recipient to select the interactive element to begin the gift redemption process (e.g., "SEE YOUR GIFT") As another example, the initial gift notification may include explanatory information that provides the recipient with details related to the receipt of the gift (e.g., "You have received a gift. To redeem your gift, select the button above, and provide your address to have your gift shipped to you"). As another example, the initial gift notification may include information that provides the recipient with other details about the gift redemption process (e.g., that the recipient will have the option to exchange the gift for another gift, that the recipient will have the option to select certain customization options related to the gift, etc.).

In one or more embodiments, the initial gift notification also includes a regift option. In one or more embodiments, a determination to include the regift option is made by a redemption options algorithm based on information associated with the gifting entity, the product being gifted, and/or the intended recipient (see, e.g., the description of FIG. 1, above). Such information may be historical information stored by the gifting service system and/or information obtained in real-time after receipt of the gift order in Step 502. In one or more embodiments, the regift option is presented to the recipient as an interactive element (e.g., a button, a text hyperlink, a QR code, etc.). Alternatively, rather than being part of the initial gift notification, the redemption option may be presented to the recipient during a gift redemption process (e.g., on a webpage provided to the recipient after the recipient selects to begin the redemption process).

In one or more embodiments, the initial gift notification is transmitted to the recipient device using a communication channel selected by the gifting entity, which may include using at least a portion of the recipient identifier provided by the gifting entity. For example, if email was selected as the communication channel, the initial gift notification may be transmitted using an email address of the recipient provided by the gifting entity. As another example, if text message was selected as the communication channel, then a phone number of the recipient provided by the gifting entity and associated with the recipient device may be used to send the gift notification.

At step 506, the gifting service system receives a regift request. In one or more embodiments, the regift request is transmitted from a recipient device to the gifting service system over a network after the recipient selects or otherwise interacts with the interactive element of the regift option provided in step 504.

At step 508, in response to receiving the regift request in step 506, the gifting service system transmits a request for regift information to the recipient device. In one or more embodiments, the regift information request includes a request for the recipient to identify a regift recipient, provide a communication channel through which the regift recipient is to be notified of the gift, and contact information (e.g., email address, phone number, messenger service name, etc.) based on the communication channel. The request for regift information may be presented as any one or more pages requesting various items of information. Such information may include, but is not limited, the aforementioned information related to the intended regift recipient (e.g., name, contact information, etc.), the name of the recipient regifting the gift, updated personalization options (e.g., updated virtual gift wrapping, message for the regift recipient, etc.), and/or details related to the gift (e.g., size, color, etc.).

At step 510, based on transmitting the request for regift information in step 508, the gifting service system receives the regift information from the recipient device. In one or more embodiments, the regift information is received by the gifting service system via a network. In one or more embodiments, the regift information, and any other information obtained after the receipt of the gift order (e.g., information about the recipient regifting the gift, information about the gift, etc.) is stored by the gifting service system and added to a historical data set. The updated historical data set may include an association between the obtained data and the outcome of providing the regift option (e.g., that the recipient selected to regift the gift), and the associated information set may be added to a training data set for the gift options algorithm and/or the redemption options algorithm.

At step 512, using the regift information received in step 510, the gifting service system transmits an updated gift notification to a regift recipient device (e.g., the regift recipient device 124 of FIG. 1) associated with a regift recipient. As an example, the regift notification may be transmitted via an email using an email address of the regift recipient provided by the initial intended recipient of the gift. An another example, the regift notification may be transmitted via text message using a phone number of the regift recipient provided by the initial intended recipient of the gift. In one or more embodiments, the regift notification includes an indication that the recipient has been sent a gift. The indication may or may not identify the sender (i.e., the initial recipient) of the gift (e.g., "Kelly got you a gift!"). The regift notification may include any other information without departing from the scope of embodiments described herein. As an example, the regift notification may include an image of virtual gift wrapping, and an interactive element that, when selected by the regift recipient, reveals (e.g., "unwraps") the gift. The interactive element may include a signal indicating to the recipient to select the interactive element to begin the gift redemption process (e.g., "SEE YOUR GIFT") As another example, the regift notification may include explanatory information that provides the regift recipient with details related to the receipt of the gift (e.g., "You have received a gift. To redeem your gift, select the button above, and provide your address to have your gift shipped to you"). As another example, the initial gift notification may include information that provides the recipient with other details about the gift redemption process (e.g., that the recipient will have the option to exchange the gift for another gift, that the recipient will have the option to select certain customization options related to the gift, etc.).

At step 514, the gifting service system receives a gift redemption indication from the regift recipient device. In one or more embodiments, the gift redemption indication is transmitted from the regift recipient device to the gifting service system when the regift recipient selects the interactive element included in the updated notification to begin the gift redemption process.

At step 516, in response to receiving the gift redemption indication in step 514, the gifting service system transmits a gift redemption information request to the regift recipient device. In one or more embodiments, the gift information redemption request includes requests for various selections to be made and information to be provided by the regift recipient. In one or more embodiments, the gift options are presented to the recipient in a series of one or more pages (e.g., webpages) that each request all or any portion of the selections and information needed to deliver a gift to the recipient. In one or more embodiments, the gift selected by the gifting entity for the initial recipient is the only gift offered to the regift recipient. In other embodiments, the request for gift information includes one or more alternate gift options that the regift recipient may select to exchange for the gift. In one or more embodiments, the gift options include a request for the regift recipient to select from among the gift and the alternate gift options. In one or more embodiments, once the regift recipient has selected the gift or to exchange the gift for an alternate gift option, the regift recipient may be presented with a request to select various customization options for the selected gift (e.g., size, color, etc.). In one or more embodiments, the alternate gift options presented to the regift recipient are generated by the gift options algorithm. The alternate gift options may or may not be the same as the alternate gift options that the gifting entity and/or the initial intended gift recipient were presented to select from among for sending a gift. As an example, the gift options algorithm may include a predictive machine learning model that takes as input information associated with the product being gifted, the gifting entity, the initial intended recipient, and/or the regift recipient to predict one or more alternate gifts that increase the likelihood that the regift recipient will select to redeem a gift.

In one or more embodiments, the one or more alternate gift options presented to the regift recipient may depend on when the regift recipient selects to redeem a gift (i.e., the timing of the selection to redeem the gift). As an example, the gifting service system may transmit the updated gift notification in the form of an email. In such a scenario, the regift recipient may not immediately open the email, or may open the email but not immediately select to redeem the gift. Thus, the one or more alternate gift options that would be presented to the regift recipient may have changed since the time of the selection by the initial recipient to regift the gift. Therefore, the gift options algorithm may be invoked at the time the regift recipient selects to redeem the gift in order to present gift options that are available at the time of the selection. In one or more embodiments, the gift options presented to the regift recipient also include additional requests for information (e.g., address to send the gift to, preferred delivery options, etc.).

At step 518, the gift redemption information requested in step 516 is received by the gifting service from the regift recipient device. In one or more embodiments, the gift information includes, but is not limited to, a selection from among the gift and any alternate gift options, a preferred delivery method, information to facilitate delivery of the gift via the preferred delivery method, and any customization options associated with the selected gift. In one or more embodiments, the information obtained during the gift redemption process, and any other information obtained after the receipt of the gift redemption indication (e.g., information about the recipient regifting the gift, information about the gift, information about the regift recipient etc.) is stored by the gifting service system and added to a historical data set. The updated historical data set may include an association between the obtained data and the outcome of providing the regift option (e.g., that the regift recipient selected to accept the gift or an alternate gift option), and the associated information set may be added to a training data set for the gift options algorithm and/or the redemption options algorithm.

At step 520, using the gift redemption information, the gifting service delivers the gift to the regift recipient. In one or more embodiments, based at least in part on the gift information received in step 518, the gifting service system initiates delivery of the selected gift to the regift recipient. The method of delivery may be based on a selection made by the regift recipient during the gift redemption process by which the recipient indicated a preferred method of delivery. As an example, the gift may be a gift card, and the recipient may have selected to receive the gift card as a virtual gift card delivered via email. As another example, the gift may be a physical object, and the recipient may have provided a physical address to which the gift is shipped. The gifting service system may perform the delivery of the gift (e.g., obtain the gift from the retailer and send the gift). Additionally or alternatively, the gifting service system may provide information related to the planned delivery to a third-party, and the third-party may perform the delivery of the gift to the regift recipient. In one or more embodiments, the redemption options algorithm and/or the gift options algorithm are dynamically updated with the results of providing the updated gift notification to the regift recipient. In one or more embodiments, the acceptance of the gift, and the gift option selected for delivery, are associated with information associated with the gifting entity, the gift, the initial gift recipient, and/or the regift recipient, and the associated information set is dynamically added to the training data for a machine learning model of the redemption options algorithm and/or the gift options algorithm, such that the machine learning model(s) are dynamically updated. In one or more embodiments, by adding such results to the training data for the machine learning models of the redemption options algorithm and/or the gift options algorithm, the machine learning models may be continuously and dynamically updated to improve their ability to predict the likelihood that the regift recipient redeems the gift.

In one or more embodiments, although not shown in FIG. 5, the regift recipient, similar to the initial gift recipient, may be provided with an offer to regift the gift. The number of times a gift has been regifted may be limited to a maximum allowed number of regifts, which may be tracked by a regift counter (e.g., regift counter 122 of FIG. 1), and the option for the regift recipient to regift the gift again may be presented only when the maximum has not yet been reached.

Figure 6:
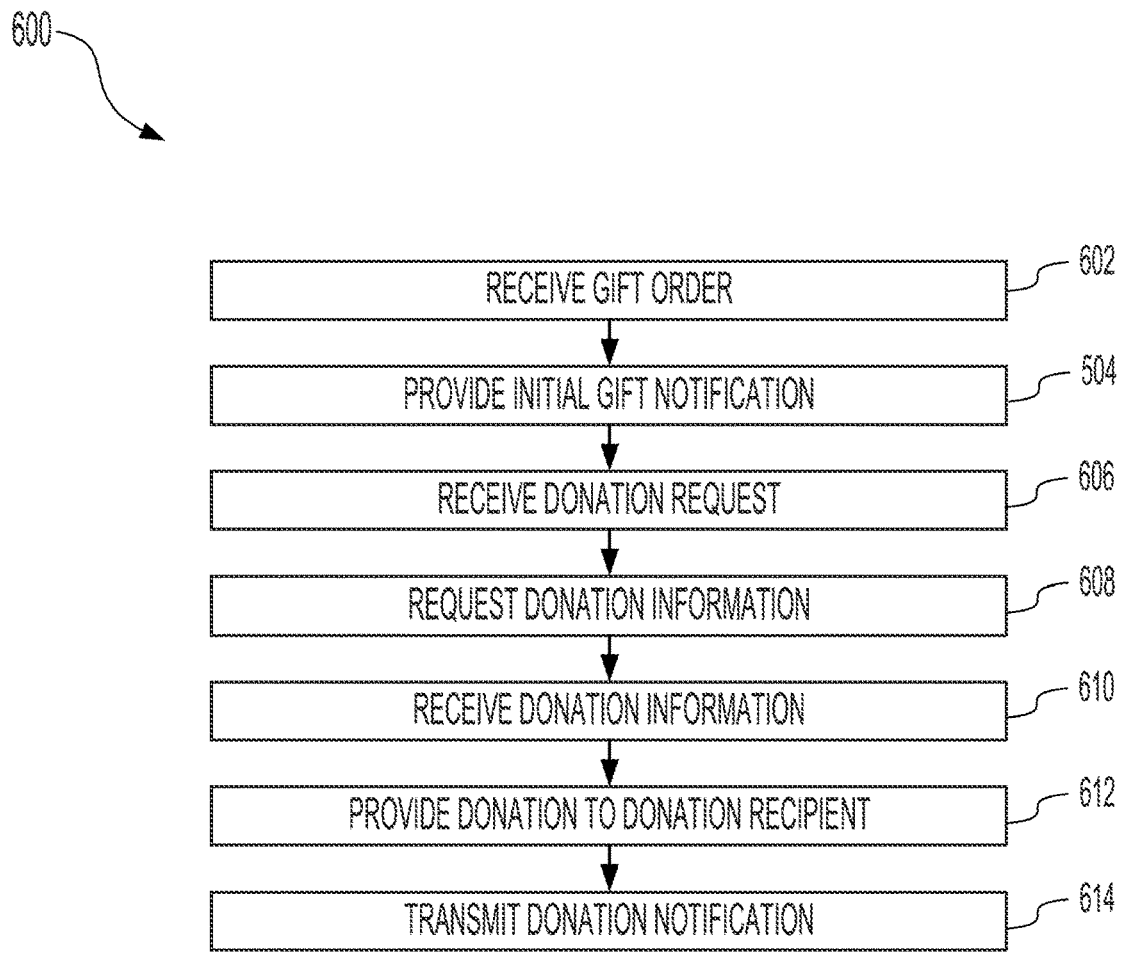
FIG. 6 shows an illustrative example of a process for providing an alternate redemption option to a recipient of a gift to donate the value of the gift to a donation recipient.

FIG. 6 shows an illustrative example of a process 600 for providing an alternate redemption option to a recipient of a gift to donate the value of the gift to a donation recipient. The process 500 may be performed, for example, by a gifting service system, such as gifting service system 104 described above at least in conjunction with FIG. 2.

At step 602, a gift order is received (e.g., by the gifting service system 104 of FIG. 2). In one or more embodiments, the gift order is received from a gifting entity via a gifting entity device (e.g., gifting entity device 102 of FIG. 2) over a network. The gifting entity may be, for example, a consumer or a business entity. The gift order may identify a gift that the gifting entity has selected to provide to a recipient. The gift order may include or lead to the obtaining (e.g., from the recipient) of information identifying the recipient. Information identifying the recipient may include, but is not limited to, the name of the recipient, a communication channel through which the recipient is to be notified of the gift, and contact information based on the communication channel (e.g., email address, phone number, etc.).

At step 604, the gifting service system provides an initial gift notification to the recipient. In one or more embodiments, the initial gift notification is transmitted via a network from a gifting service system (e.g., gifting service system 104 of FIG. 2) to a recipient device (e.g., recipient device 126 of FIG. 2) associated with the intended recipient. In one or more embodiments, the initial gift notification includes an indication that the recipient has been sent a gift. The indication may or may not identify the gifting entity of the gift (e.g., "Kelly got you a gift!"). The initial gift notification may include any other information without departing from the scope of embodiments described herein. As an example, the gift notification may include an image of virtual gift wrapping, and an interactive element that, when selected by the recipient, reveals (e.g., "unwraps") the gift. The interactive element may include a signal indicating to the recipient to select the interactive element to begin the gift redemption process (e.g., "SEE YOUR GIFT") As another example, the initial gift notification may include explanatory information that provides the recipient with details related to the receipt of the gift (e.g., "You have received a gift. To redeem your gift, select the button above, and provide your address to have your gift shipped to you"). As another example, the initial gift notification may include information that provides the recipient with other details about the gift redemption process (e.g., that the recipient will have the option to exchange the gift for another gift, that the recipient will have the option to select certain customization options related to the gift, etc.).

In one or more embodiments, the initial gift notification also includes a donation option. In one or more embodiments, a determination to include the donation option is made by a redemption options algorithm based on information associated with the gifting entity, the product being gifted, and/or the intended recipient. Such information may be historical information stored by the gifting service system and/or information obtained in real-time after receipt of the gift order in Step 602. In one or more embodiments, the donation option is presented to the recipient as an interactive element (e.g., a button, a text hyperlink, a QR code, etc.). Alternatively, rather than being part of the initial gift notification, the donation option may be presented to the recipient during a gift redemption process (e.g., on a webpage provided to the recipient after the recipient selects to begin the redemption process).

In one or more embodiments, the initial gift notification is transmitted to the recipient device using a communication channel selected by the gifting entity, which may include using at least a portion of the recipient identifier provided by the gifting entity. For example, if email was selected as the communication channel, the initial gift notification may be transmitted using an email address of the recipient provided by the gifting entity. As another example, if text message was selected as the communication channel, then a phone number of the recipient provided by the gifting entity and associated with the recipient device may be used to send the initial gift notification.

At step 606, the gifting service system receives a donation request. In one or more embodiments, the donation request is transmitted from a recipient device to the gifting service system over a network after the recipient selects or otherwise interacts with the interactive element of the donation option provided in step 604.

At step 608, in response to receiving the donation request in step 606, the gifting service system transmits a request for donation information to the recipient device. In one or more embodiments, the donation information request includes a request for the recipient to identify or select one or more donation recipients. In one or more embodiments, the recipient selects any one or more donation recipients they prefer. In one or more embodiments, the recipient is provided with a set of one or more potential donation recipients. In one or more embodiments, the set of one or more potential donation recipients is obtained from the gifting entity (e.g., during the gift order process). In one or more embodiments, the set of one or more potential donation recipients is generated or otherwise determined by the gifting service system. When the recipient selects more than one donation recipient, the request for donation information may also include a request for the recipient to provide the portion of the value of the gift that the recipient desires to provide to each selected donation recipient.

At step 610, the donation information is received at the gifting service system from the recipient device. In one or more embodiments, the donation information is received by the gifting service system via a network. In one or more embodiments, the donation information includes a selection of one or more donation recipients. The donation information may optionally include contact information for the one or more donation recipients. The donation information may also include, when more than one donation recipient is selected, the portion of the value of the gift that each selected donation recipient should receive.

In one or more embodiments, in response to receiving the donation information, an alternate value calculator (e.g., alternate value calculator 130 of FIG. 2) of the gifting service system determines the value of the gift associated with the gift order placed by the gifting entity, which may be the purchase price paid for the gift by the gifting entity. In one or more embodiments, based on the value of the gift, and the donation recipient, the alternate value calculator 130 may determine an alternate value representation. As an example, when the selected donation recipient is a charity that provides meals to socioeconomically disadvantaged children, and the value of the gift is $127, the alternate value calculator may determine that the value of the gift is equivalent to fifty meals to be provided by the charity. Thus the alternate value representation for the gift is 50 meals from the charity. In one or more embodiments, the alternate value representation is transmitted from the gifting service system to the recipient device. The alternate value representation may be presented to the recipient, and may be accompanied by any amount of additional information, such as the name of the selected donation recipient, an image related to the alternate value, etc. As an example, a page may be presented to the recipient that indicates that the donation will provide fifty meals from the donation recipient to socioeconomically disadvantaged children, displays the name of the donation recipient, and includes an image of a child enjoying such a meal. The alternate value representation may be provided to the recipient along with an interactive element (e.g., a button on a webpage) that the recipient, via the recipient device, may interact with to finalize the donation. The interactive element may include or be accompanied by a signal to the recipient to indicate that the recipient should interact with the element to complete the donation process (e.g., text stating "Donate"). Alternatively, alternate value representation may be provided to the recipient after the donation is complete.

At step 612, the donation (i.e., the value of the gift) is provided to the one or more donation recipients selected by the recipient. In one or more embodiments, the donation is provided to the one or more donation recipients via the donation recipient device. In one or more embodiments, the donation is provided to the one or more donation recipients from the gifting service system. In one or more embodiments, the gifting service system provides the donation information and the value of the gift to the gifting entity, and the donation is provided to the one or more donation recipients by the gifting entity. In one or more embodiments, the value of the gift is provided to the recipient, and the donation is provided to the one or more donation recipients by the recipient. In one or more embodiments, if more than one donation recipient was selected, the designated portion of the value of the gift is provided to the one or more donation recipients.

At step 614, a donation notification is transmitted from the gifting service system to the recipient device. In one or more embodiments, the donation notification notifies the recipient, via the recipient device, that the donation has been provided to the one or more selected donation recipients. A donation notification may also be sent to the gifting entity.

Figure 7:
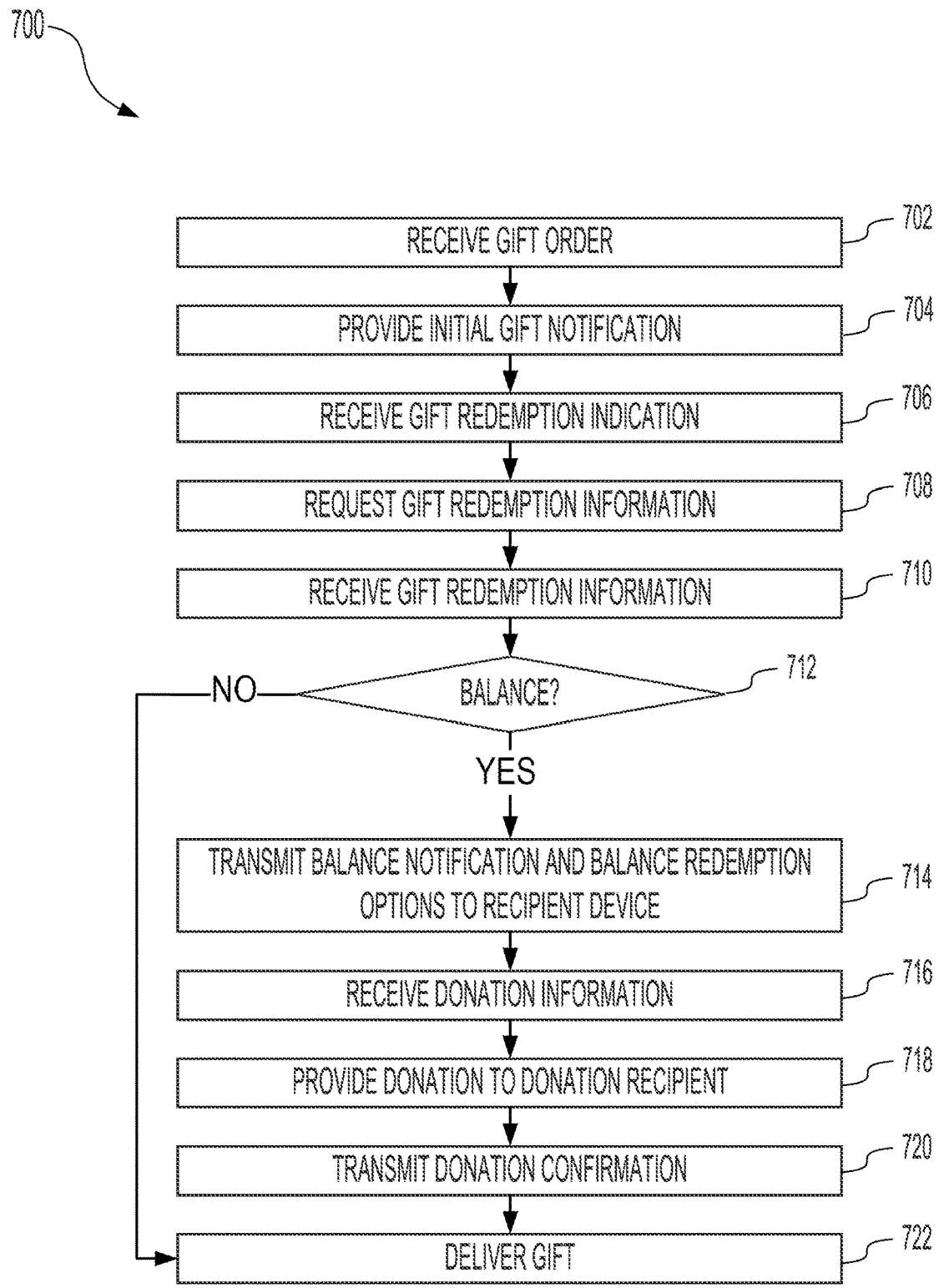
FIG. 7 shows an illustrative example of a process for providing an alternate redemption option to a recipient of a gift to donate a positive balance remaining after redemption of the gift or an alternate gift option to one or more donation recipients.

FIG. 7 shows an illustrative example of a process 700 for providing an alternate redemption option to a recipient of a gift to donate a positive balance remaining after redemption of the gift or an alternate gift option to one or more donation recipients. The process 700 may be performed, for example, by a gifting service system, such as gifting service system 104 described above at least in conjunction with FIG. 3.

At step 702, a gift order is received (e.g., by the gifting service system 104 of FIG. 3). In one or more embodiments, the gift order is received from a gifting entity via a gifting entity device (e.g., gifting entity device 102 of FIG. 3) over a network. The gifting entity may be, for example, a consumer or a business entity seeking to provide a gift to a recipient. The gift order may identify a gift that the gifting entity has selected to provide to a recipient. The gift order may include or lead to the obtaining (e.g., from the intended recipient) of information identifying the recipient. Information identifying the recipient may include, but is not limited to, the name of the recipient, a communication channel through which the recipient is to be notified of the gift, and contact information based on the communication channel (e.g., email address, phone number, etc.).

At step 704, the gifting service system provides an initial gift notification to the recipient. In one or more embodiments, the initial gift notification is transmitted via a network from a gifting service system (e.g., gifting service system 104 of FIG. 3) to a recipient device (e.g., recipient device 126 of FIG. 3) associated with the intended recipient. In one or more embodiments, the initial gift notification includes an indication that the recipient has been sent a gift. The indication may or may not identify the gifting entity of the gift (e.g., "Kelly got you a gift!"). The initial gift notification may include any other information without departing from the scope of embodiments described herein. As an example, the gift notification may include an image of virtual gift wrapping, and an interactive element that, when selected by the recipient, reveals (e.g., "unwraps") the gift. The interactive element may include a signal indicating to the recipient to select the interactive element to begin the gift redemption process (e.g., "SEE YOUR GIFT") As another example, the initial gift notification may include explanatory information that provides the recipient with details related to the receipt of the gift (e.g., "You have received a gift. To redeem your gift, select the button above, and provide your address to have your gift shipped to you"). As another example, the initial gift notification may include information that provides the recipient with other details about the gift redemption process (e.g., that the recipient will have the option to exchange the gift for another gift, that the recipient will have the option to select certain customization options related to the gift, etc.).

In one or more embodiments, the initial gift notification is transmitted to the recipient device using a communication channel selected by the gifting entity, which may include using at least a portion of the recipient identifier provided by the gifting entity. For example, if email was selected as the communication channel, the initial gift notification may be transmitted using an email address of the recipient provided by the gifting entity. As another example, if text message was selected as the communication channel, then a phone number of the recipient provided by the gifting entity and associated with the recipient device may be used to send the gift notification.

At step 706, the gifting service system receives a gift redemption indication from the recipient device. In one or more embodiments, the gift redemption indication is transmitted from the recipient device to the gifting service system when the regift recipient selects the interactive element included in the updated notification to begin the gift redemption process.

At step 708, in response to receiving the gift redemption indication in step 706, the gifting service system transmits a gift redemption information request to the recipient device. In one or more embodiments, the gift information redemption request includes requests for various selections to be made and information to be provided by the recipient. In one or more embodiments, the gift options are presented to the recipient in a series of one or more pages (e.g., webpages) that each request all or any portion of the selections and information needed to deliver a gift to the recipient. In one or more embodiments, the gift selected by the gifting entity is the only gift offered to the recipient. In other embodiments, the request for gift information includes one or more alternate gift options that the recipient may select to exchange for the gift. In one or more embodiments, the gift options include a request for the recipient to select from among the gift and the alternate gift options. In one or more embodiments, once the recipient has selected the gift or to exchange the gift for an alternate gift option, the recipient may be presented with a request to select various customization options for the selected gift (e.g., size, color, etc.). In one or more embodiments, the alternate gift options presented to the recipient are generated by the gift options algorithm. The alternate gift options may or may not be the same as the alternate gift options that the gifting entity was presented to select from among for sending a gift. As an example, the gift options algorithm may include a predictive machine learning model that takes as input information associated with the product being gifted, the gifting entity, the initial intended recipient, and/or the recipient to predict one or more alternate gifts that increase the likelihood that the recipient will select to redeem a gift.

In one or more embodiments, the one or more alternate gift options presented to the recipient may depend on when the recipient selects to redeem a gift (i.e., the timing of the selection to redeem the gift). As an example, the gifting service system may transmit the updated gift notification in the form of an email. In such a scenario, the recipient may not immediately open the email, or may open the email but not immediately select to redeem the gift. Thus, the one or more alternate gift options that would be presented to the recipient may have changed since the time of the selection by the gifting entity to provide the gift. Therefore, the gift options algorithm may be invoked at the time the recipient selects to redeem the gift in order to present gift options that are available at the time of the selection. In one or more embodiments, the gift options presented to the recipient also include additional requests for information (e.g., address to send the gift to, preferred delivery options, etc.).

At step 710, the gift redemption information requested in step 708 is received by the gifting service from the recipient device. In one or more embodiments, the gift information includes, but is not limited to, a selection from among the gift and any alternate gift options, a preferred delivery method, information to facilitate delivery of the gift via the preferred delivery method, and any customization options associated with the selected gift. In one or more embodiments, the information obtained during the gift redemption process, and any other information obtained after the receipt of the gift redemption indication (e.g., information about the recipient regifting the gift, information about the gift, information about the gifting entity, etc.) is stored by the gifting service system and added to a historical data set. The updated historical data set may include an association between the obtained data and the outcome of providing the gift notification (e.g., that the recipient selected to accept the gift or an alternate gift option), and the associated information set may be added to a training data set for the gift options algorithm and/or the redemption options algorithm, thereby dynamically updating the machine learning models of the algorithms.

At step 712, a determination is made as to whether a positive balance remains after the gift or an alternate gift option is selected. In one or more embodiments, a value difference calculator (e.g., the value difference calculator 136 of FIG. 3) is configured to use the price paid for the gift by the gifting entity and either the price of the gift at the time the gift is redeemed by the recipient, or the price of the alternate gift option selected by the recipient, to determine a value difference, if any. As an example, the price of the gift paid by the gifting entity may be $200, and, at the time of redemption, the gift is on sale for $150. In such a scenario, the value difference calculator determines a value difference of $50. As another example, the gifting entity may have paid $127 for the gift, and the recipient may have selected an alternate gift option with a price of $100. In such a scenario, the value difference calculator determines a value difference of $27. In one or more embodiments, if a positive balance does not remain, the method proceeds to step 722. In one or more embodiments, if a positive balance remains, the method proceeds to step 714.

At step 714, a balance notification and balance donation option are transmitted from the gifting service system to the recipient device. The balance notification and balance donation options may be transmitted, for example, over a network. In one or more embodiments, whether a recipient of a gift is presented with an option to donate the value of the positive balance is determined, at least in part, using a redemption options algorithm of the gifting service system. The redemption options algorithm may be configured to analyze consumer information (e.g., gifting entity information, recipient information, etc.), product information, or any combination thereof, to determine whether to present a donation option to the recipient device. Such information may be historical information and/or information obtained in real-time. In one or more embodiments, the donation option is included in the balance notification as an interactive element, such as a button, text hyperlink, QR code, etc. The interactive element may include and/or be accompanied by a signal to the recipient that the option to donate the value of the positive balance is available (e.g., a button accompanied by the text "You have a positive gift balance. Click here to donate the balance").

At step 716, donation information is received. In one or more embodiments, when the recipient selects the interactive element associated with the donation option, a donation request is transmitted from the recipient device to the gifting service system. In one or more embodiments, in response to receiving the donation request, the gifting service system transmits a request for donation information to the recipient device. In one or more embodiments, the donation information request includes a request for the recipient to identify or select one or more donation recipients. In one or more embodiments, the recipient selects any one or more donation recipients they prefer. In one or more embodiments, the recipient is provided with a set of one or more potential donation recipients. In one or more embodiments, the set of one or more potential donation recipients is obtained from the gifting entity (e.g., during the gift order process). In one or more embodiments, the set of one or more potential donation recipients is generated or otherwise determined by the gifting service system. When the recipient selects more than one donation recipient, the request for donation information may also include a request for the recipient to provide the portion of the value of the gift that the recipient desires to provide to each selected donation recipient. In one or more embodiments, the donation information is received at the gifting service system from the recipient device. In one or more embodiments, the donation information is received by the gifting service system via a network. In one or more embodiments, the donation information includes a selection of one or more donation recipients. The donation information may optionally include contact information for the one or more donation recipients. The donation information may also include, when more than one donation recipient is selected, the portion of the value of the gift that each selected donation recipient should receive.

At step 718, the donation (i.e., the value of the gift) is provided to the one or more donation recipients selected by the recipient. In one or more embodiments, the donation is provided to the one or more donation recipients via the donation recipient device. In one or more embodiments, the donation is provided to the one or more donation recipients from the gifting service system. In one or more embodiments, the value of the gift is provided to the recipient, and the donation is provided to the one or more donation recipients by the recipient. In one or more embodiments, if more than one donation recipient was selected, the designated portion of the value of the gift is provided to the one or more donation recipients.

At step 720, a donation notification is transmitted from the gifting service system to the recipient device. In one or more embodiments, the donation notification notifies the recipient, via the recipient device, that the donation has been provided to the one or more selected donation recipients. A donation notification may also be sent to the gifting entity.

At step 722, using the gift redemption information, the gifting service delivers the gift to the recipient. In one or more embodiments, based at least in part on the gift redemption information received in step 708, the gifting service system initiates delivery of the selected gift to the recipient. The method of delivery may be based on a selection made by the recipient during the gift redemption process by which the recipient indicated a preferred method of delivery. As an example, the gift may be a gift card, and the recipient may have selected to receive the gift card as a virtual gift card delivered via email. As another example, the gift may be a physical object, and the recipient may have provided a physical address to which the gift is shipped. The gifting service system may perform the delivery of the gift (e.g., obtain the gift from the retailer and send the gift). Additionally or alternatively, the gifting service system may provide information related to the planned delivery to a third-party, and the third-party may perform the delivery of the gift to the recipient. In one or more embodiments, the redemption options algorithm and/or the gift options algorithm are dynamically updated with the results of providing the updated gift notification to the recipient. In one or more embodiments, the acceptance of the gift, and the gift option selected for delivery, are associated with information associated with the gifting entity, the gift, and the gift recipient, and the associated information set is dynamically added to the training data for a machine learning model of the redemption options algorithm and/or the gift options algorithm, such that the machine learning model(s) are dynamically updated. In one or more embodiments, by adding such results to the training data for the machine learning models of the redemption options algorithm and/or the gift options algorithm, the machine learning models may be continuously and dynamically updated to improve their ability to predict the likelihood that the recipient redeems the gift.

Figure 8:
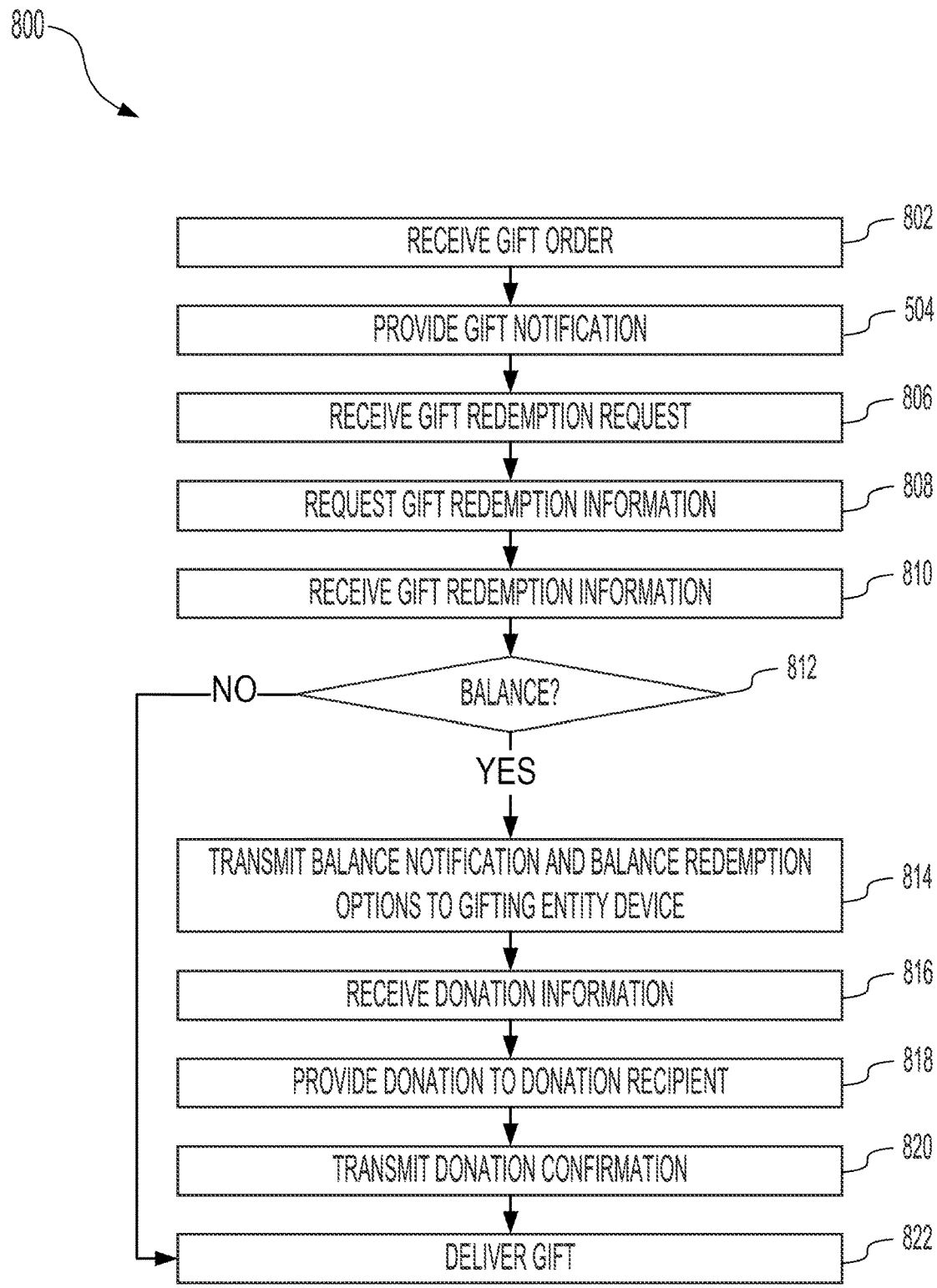
FIG. 8 shows an illustrative example of a process for providing an alternate redemption option to a recipient of a gift to donate a positive balance remaining after redemption of the gift or an alternate gift option to one or more donation recipients.

FIG. 8 shows an illustrative example of a process 800 for providing an alternate redemption option to a gifting entity to donate a positive balance remaining after redemption of the gift or an alternate gift option to one or more donation recipients. The process 800 may be performed, for example, by a gifting service system, such as gifting service system 104 described above at least in conjunction with FIG. 4.

At step 802, a gift order is received (e.g., by the gifting service system 104 of FIG. 4). In one or more embodiments, the gift order is received from a gifting entity via a gifting entity device (e.g., gifting entity device 102 of FIG. 4) over a network. The gifting entity may be, for example, a consumer or a business entity seeking to provide a gift to a recipient. The gift order may identify a gift that the gifting entity has selected to provide to a recipient. The gift order may include or lead to the obtaining (e.g., from the intended recipient) of information identifying the recipient. Information identifying the recipient may include, but is not limited to, the name of the recipient, a communication channel through which the recipient is to be notified of the gift, and contact information based on the communication channel (e.g., email address, phone number, etc.).

At step 804, the gifting service system provides an initial gift notification to the recipient. In one or more embodiments, the initial gift notification is transmitted via a network from a gifting service system (e.g., gifting service system 104 of FIG. 4) to a recipient device (e.g., recipient device 126 of FIG. 4) associated with the intended recipient. In one or more embodiments, the initial gift notification includes an indication that the recipient has been sent a gift. The indication may or may not identify the gifting entity of the gift (e.g., "Kelly got you a gift!"). The initial gift notification may include any other information without departing from the scope of embodiments described herein. As an example, the gift notification may include an image of virtual gift wrapping, and an interactive element that, when selected by the recipient, reveals (e.g., "unwraps") the gift. The interactive element may include a signal indicating to the recipient to select the interactive element to begin the gift redemption process (e.g., "SEE YOUR GIFT") As another example, the initial gift notification may include explanatory information that provides the recipient with details related to the receipt of the gift (e.g., "You have received a gift. To redeem your gift, select the button above, and provide your address to have your gift shipped to you"). As another example, the initial gift notification may include information that provides the recipient with other details about the gift redemption process (e.g., that the recipient will have the option to exchange the gift for another gift, that the recipient will have the option to select certain customization options related to the gift, etc.).

In one or more embodiments, the initial gift notification is transmitted to the recipient device using a communication channel selected by the gifting entity, which may include using at least a portion of the recipient identifier provided by the gifting entity. For example, if email was selected as the communication channel, the initial gift notification may be transmitted using an email address of the recipient provided by the gifting entity. As another example, if text message was selected as the communication channel, then a phone number of the recipient provided by the gifting entity and associated with the recipient device may be used to send the gift notification.

At step 806, the gifting service system receives a gift redemption indication from the recipient device. In one or more embodiments, the gift redemption indication is transmitted from the recipient device to the gifting service system when the regift recipient selects the interactive element included in the updated notification to begin the gift redemption process.

At step 808, in response to receiving the gift redemption indication in step 806, the gifting service system transmits a gift redemption information request to the recipient device. In one or more embodiments, the gift information redemption request includes requests for various selections to be made and information to be provided by the recipient. In one or more embodiments, the gift options are presented to the recipient in a series of one or more pages (e.g., webpages) that each request all or any portion of the selections and information needed to deliver a gift to the recipient. In one or more embodiments, the gift selected by the gifting entity is the only gift offered to the recipient. In other embodiments, the request for gift information includes one or more alternate gift options that the recipient may select to exchange for the gift. In one or more embodiments, the gift options include a request for the recipient to select from among the gift and the alternate gift options. In one or more embodiments, once the recipient has selected the gift or to exchange the gift for an alternate gift option, the recipient may be presented with a request to select various customization options for the selected gift (e.g., size, color, etc.). In one or more embodiments, the alternate gift options presented to the recipient are generated by the gift options algorithm. The alternate gift options may or may not be the same as the alternate gift options that the gifting entity was presented to select from among for sending a gift. As an example, the gift options algorithm may include a predictive machine learning model that takes as input information associated with the product being gifted, the gifting entity, the initial intended recipient, and/or the recipient to predict one or more alternate gifts that increase the likelihood that the recipient will select to redeem a gift.

In one or more embodiments, the one or more alternate gift options presented to the recipient may depend on when the recipient selects to redeem a gift (i.e., the timing of the selection to redeem the gift). As an example, the gifting service system may transmit the updated gift notification in the form of an email. In such a scenario, the recipient may not immediately open the email, or may open the email but not immediately select to redeem the gift. Thus, the one or more alternate gift options that would be presented to the recipient may have changed since the time of the selection by the gifting entity to provide the gift. Therefore, the gift options algorithm may be invoked at the time the recipient selects to redeem the gift in order to present gift options that are available at the time of the selection. In one or more embodiments, the gift options presented to the recipient also include additional requests for information (e.g., address to send the gift to, preferred delivery options, etc.).

At step 810, the gift redemption information requested in step 808 is received by the gifting service from the recipient device. In one or more embodiments, the gift information includes, but is not limited to, a selection from among the gift and any alternate gift options, a preferred delivery method, information to facilitate delivery of the gift via the preferred delivery method, and any customization options associated with the selected gift. In one or more embodiments, the information obtained during the gift redemption process, and any other information obtained after the receipt of the gift redemption indication (e.g., information about the recipient regifting the gift, information about the gift, information about the gifting entity, etc.) is stored by the gifting service system and added to a historical data set. The updated historical data set may include an association between the obtained data and the outcome of providing the gift notification (e.g., that the recipient selected to accept the gift or an alternate gift option), and the associated information set may be added to a training data set for the gift options algorithm and/or the redemption options algorithm, thereby dynamically updating the machine learning models of the algorithms.

At step 812, a determination is made as to whether a positive balance remains after the gift or an alternate gift option is selected. In one or more embodiments, a value difference calculator (e.g., the value difference calculator 136 of FIG. 3) is configured to use the price paid for the gift by the gifting entity and either the price of the gift at the time the gift is redeemed by the recipient, or the price of the alternate gift option selected by the recipient, to determine a value difference, if any. As an example, the price of the gift paid by the gifting entity may be $200, and, at the time of redemption, the gift is on sale for $150. In such a scenario, the value difference calculator determines a value difference of $50. As another example, the gifting entity may have paid $127 for the gift, and the recipient may have selected an alternate gift option with a price of $100. In such a scenario, the value difference calculator determines a value difference of $27. In one or more embodiments, if a positive balance does not remain, the method proceeds to step 822. In one or more embodiments, if a positive balance remains, the method proceeds to step 814.

At step 814, a balance notification and balance donation option are transmitted from the gifting service system to the gifting entity device. The balance notification and balance donation options may be transmitted, for example, over a network. Balance donation options provided to the gifting entity may include an option to donate all or any portion of a positive balance remaining after a gift redemption. In one or more embodiments, whether a gifting entity is presented with an option to donate the value of the positive balance is determined, at least in part, using a redemption options algorithm of the gifting service system. The redemption options algorithm may be configured to analyze consumer information (e.g., gifting entity information, recipient information, etc.), product information, or any combination thereof, to determine whether to present a donation option to the gifting entity device. Such information may be historical information and/or information obtained in real-time. Additionally or alternatively, the redemption options algorithm may determine whether the gifting entity, in the gift order, provided an indication that if a positive balance remained, the gifting entity would like the option to donate the balance. In one or more embodiments, the donation option is included in the balance notification as an interactive element, such as a button, text hyperlink, QR code, etc. The interactive element may include and/or be accompanied by a signal to the recipient that the option to donate the value of the positive balance is available (e.g., a button accompanied by the text "You have a positive gift balance. Click here to donate the balance").

At step 816, donation information is received. In one or more embodiments, when the gifting entity selects the interactive element associated with the donation option, a donation request is transmitted from the gifting entity device to the gifting service system. In one or more embodiments, in response to receiving the donation request, the gifting service system transmits a request for donation information to the gifting entity device. In one or more embodiments, the donation information request includes a request for the gifting entity to identify or select one or more donation recipients. In one or more embodiments, the gifting entity selects any one or more donation recipients they prefer. In one or more embodiments, the gifting entity is provided with a set of one or more potential donation recipients. In one or more embodiments, the set of one or more potential donation recipients is obtained from the gifting entity (e.g., during the gift order process). In one or more embodiments, the set of one or more potential donation recipients is generated or otherwise determined by the gifting service system. When the gifting entity selects more than one donation recipient, the request for donation information may also include a request for the gifting entity to provide the portion of the value of the gift that the recipient desires to provide to each selected donation recipient. In one or more embodiments, the donation information is received at the gifting service system from the recipient device. In one or more embodiments, the donation information is received by the gifting service system via a network. In one or more embodiments, the donation information includes a selection of one or more donation recipients. The donation information may optionally include contact information for the one or more donation recipients. The donation information may also include, when more than one donation recipient is selected, the portion of the value of the gift that each selected donation recipient should receive.

At step 818, the donation (i.e., the value of the gift) is provided to the one or more donation recipients selected by the recipient. In one or more embodiments, the donation is provided to the one or more donation recipients via the donation recipient device. In one or more embodiments, the donation is provided to the one or more donation recipients from the gifting service system. In one or more embodiments, the value of the gift is provided to the gifting entity, and the donation is provided to the one or more donation recipients by the gifting entity. In one or more embodiments, if more than one donation recipient was selected, the designated portion of the value of the gift is provided to the one or more donation recipients.

At step 820, a donation notification is transmitted from the gifting service system to the gifting entity device. In one or more embodiments, the donation notification notifies the gifting entity, via the gifting entity device, that the donation has been provided to the one or more selected donation recipients.

At step 822, using the gift redemption information, the gifting service delivers the gift to the recipient. In one or more embodiments, based at least in part on the gift redemption information received in step 708, the gifting service system initiates delivery of the selected gift to the recipient. The method of delivery may be based on a selection made by the recipient during the gift redemption process by which the recipient indicated a preferred method of delivery. As an example, the gift may be a gift card, and the recipient may have selected to receive the gift card as a virtual gift card delivered via email. As another example, the gift may be a physical object, and the recipient may have provided a physical address to which the gift is shipped. The gifting service system may perform the delivery of the gift (e.g., obtain the gift from the retailer and send the gift). Additionally or alternatively, the gifting service system may provide information related to the planned delivery to a third-party, and the third-party may perform the delivery of the gift to the recipient. In one or more embodiments, the redemption options algorithm and/or the gift options algorithm are dynamically updated with the results of providing the updated gift notification to the recipient. In one or more embodiments, the acceptance of the gift, and the gift option selected for delivery, are associated with information associated with the gifting entity, the gift and the initial gift recipient, and the associated information set is dynamically added to the training data for a machine learning model of the redemption options algorithm and/or the gift options algorithm, such that the machine learning model(s) are dynamically updated. In one or more embodiments, by adding such results to the training data for the machine learning models of the redemption options algorithm and/or the gift options algorithm, the machine learning models may be continuously and dynamically updated to improve their ability to predict the likelihood that the recipient redeems the gift.

Figure 9:
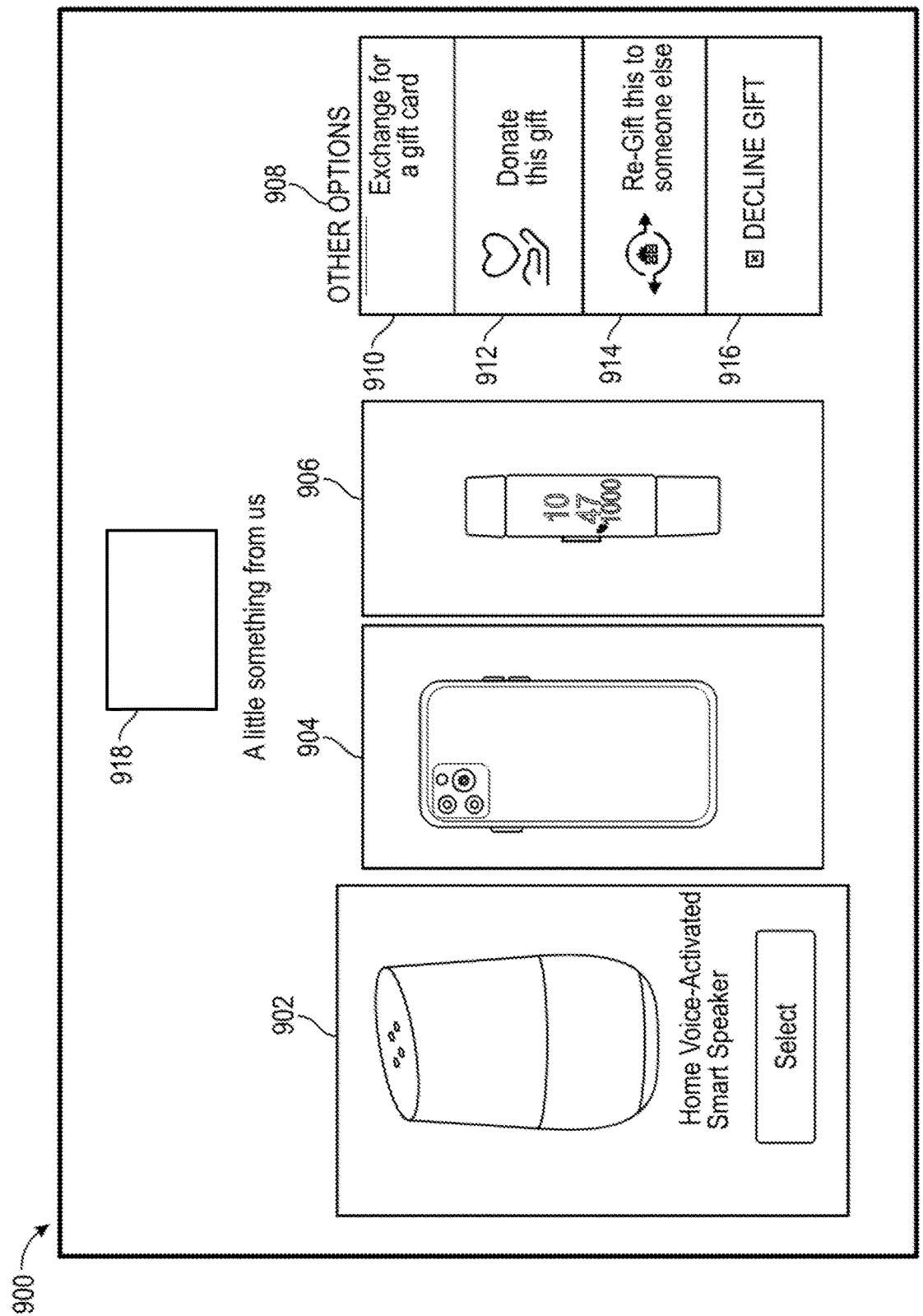
FIG. 9 shows an illustrative example of a page that may be presented to an intended recipient of a gift that includes alternate redemption options.

FIG. 9 shows an illustrative example of a page 900 that may be presented to an intended recipient of a gift. The following example is for explanatory purposes only and not intended to limit the scope of embodiments described herein. Additionally, while the example shows certain aspects of embodiments described herein, all possible aspects of such embodiments may not be illustrated in this particular example. This example is intended to be a simple example to illustrate, at least in part, concepts described herein.

Referring to FIG. 9, consider a scenario in which a gifting entity has transmitted a gift order to a gifting service system. In this scenario, the gift is a gift from a retailer 918, which is the gifting entity that transmitted the gift order. The gifting service system, in response to the gift order, generated the page 900 as an initial gift notification, and transmitted the page 900 to a recipient device to be viewed by the intended recipient of the gift from the retailer 918. The page 900 includes the gift 902, as well as alternate gift options 904 and 906, which were determined by a gift options algorithm of the gifting service system.

The page 900 also includes other options 908. The other options 908 include an option 910 to exchange the gift for a gift card and an option 916 to decline the gift. Additionally, the redemption options algorithm of the gifting service system determined, based on historical and real-time obtained consumer information and product information that the recipient should be presented with an alternate redemption option 912 to donate the value of the gift, and an alternate redemption option 914 to regift the gift to someone else.

In one or more embodiments, if the recipient selects the alternate redemption option 914 to regift the gift, then a regift process occurs, as discussed above in the description of FIG. 1 and FIG. 5. In one or more embodiments, if the recipient selects the alternate redemption option 912 to donate the value of the gift, then a donation process occurs, as discussed above in the description of FIG. 2 and FIG. 6.

If the recipient selects to redeem the gift 902 or either of the alternate gift options 904 and 906, then the gifting service system determines whether a positive value remains after redemption based on the value of the gift paid by the gifting entity and the const of the gift at the time of redemption, or the value difference between the gift and the alternate gift if an alternate gift is selected. If a positive balance remains, an option to donate the positive balance may be provided as part of a balance notification to the recipient, as discussed in the descriptions of FIG. 3 and FIG. 7, above, or provided as part of a balance notification to the gifting entity, as discussed in the descriptions of FIG. 4 and FIG. 8, above.

Figure 10:
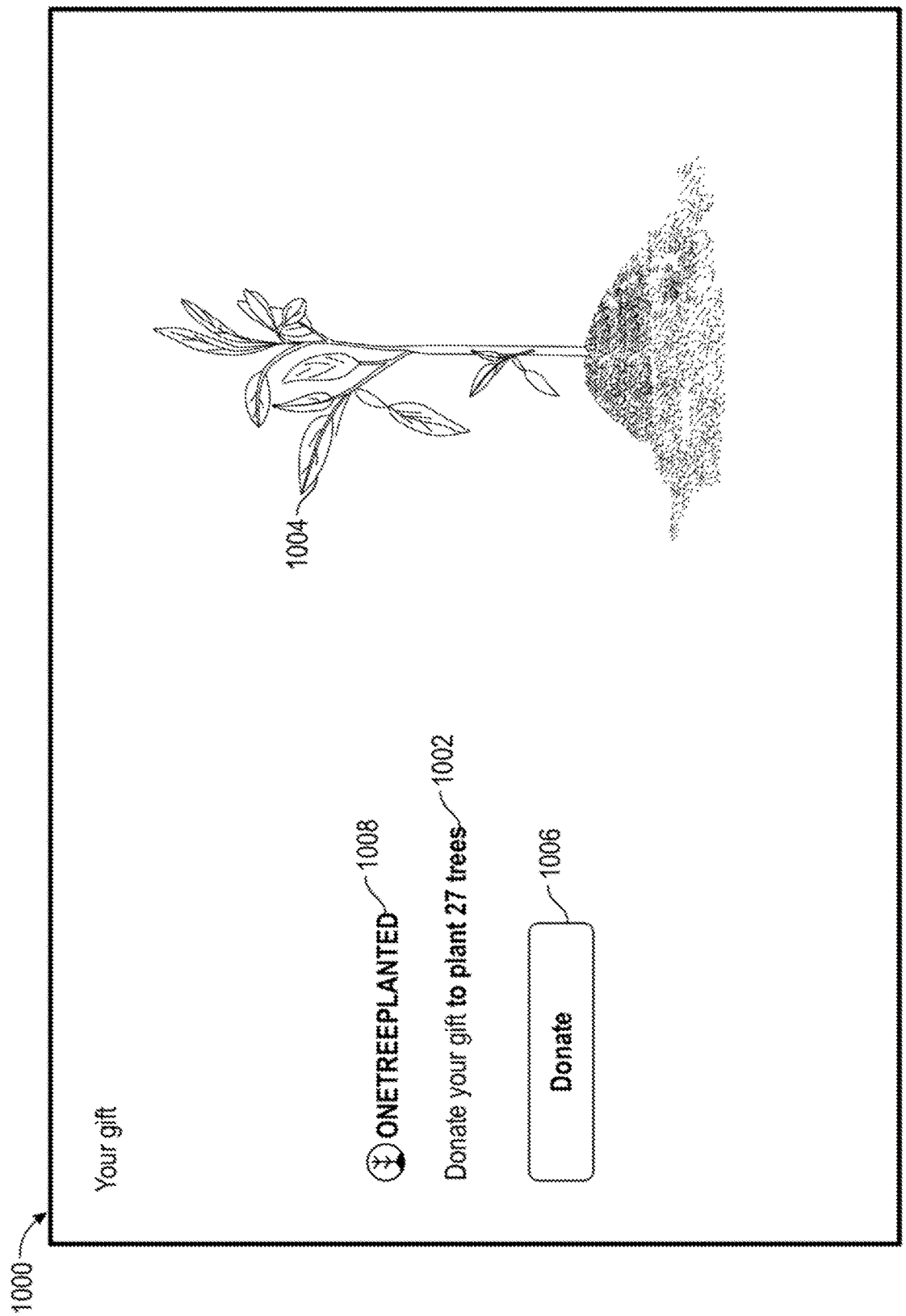
FIG. 10 shows an illustrative example of an alternate value representation presented on a page during a donation process.

FIG. 10 shows an illustrative example of a page 1000 that may be presented to an intended recipient of a gift that includes an alternate value representation of a donation. The following example is for explanatory purposes only and not intended to limit the scope of embodiments described herein. Additionally, while the example shows certain aspects of embodiments described herein, all possible aspects of such embodiments may not be illustrated in this particular example. This example is intended to be a simple example to illustrate, at least in part, concepts described herein.

Referring to FIG. 10, consider a scenario in which a gifting entity has transmitted a gift order to a gifting service system. The gifting service system, in response to the gift order, generated an initial gift notification, and transmitted the initial gift notification to a recipient device to be viewed by the intended recipient. The initial gift notification included a donation option, by which the recipient could select to donate the value of the gift. The recipient selected the donation option to initiate a donation process. As part of the donation process, the recipient selected a donation recipient 1008. Based on the selected donation recipient and the value of the gift, an alternate value calculator of the gifting service system determined an alternate value representation 1002. In this scenario, the value of the gift is equal to twenty-seven trees. The page 900 also includes an image 1004 related to the alternate value representation. The page 900 is presented to the recipient as part of the donation process. The page 900 also includes an interactive element 1006. When the recipient selects the interactive element 1006, the donation process continues, and the value of the gift is donated to the donation recipient 1008 by the gifting service system.

FIG. 11 illustrates a computing system architecture 1100, including various components in electrical communication with each other, in accordance with some embodiments. The example computing system architecture 1100 illustrated in FIG. 11 includes a computing device 1102, which has various components in electrical communication with each other using a connection 1106, such as a bus, in accordance with some implementations. The example computing system architecture 1100 includes a processing unit 1104 that is in electrical communication with various system components, using the connection 1106, and including the system memory 1114. In some embodiments, the system memory 1114 includes read-only memory (ROM), random-access memory (RAM), and other such memory technologies including, but not limited to, those described herein. In some embodiments, the example computing system architecture 1100 includes a cache 1108 of high-speed memory connected directly with, in close proximity to, or integrated as part of the processor 1104. The system architecture 1100 can copy data from the memory 1114 and/or the storage device 1110 to the cache 1108 for quick access by the processor 1104. In this way, the cache 1108 can provide a performance boost that decreases or eliminates processor delays in the processor 1104 due to waiting for data. Using modules, methods and services such as those described herein, the processor 1104 can be configured to perform various actions. In some embodiments, the cache 1108 may include multiple types of cache including, for example, level one (L1) and level two (L2) cache. The memory 1114 may be referred to herein as system memory or computer system memory. The memory 1114 may include, at various times, elements of an operating system, one or more applications, data associated with the operating system or the one or more applications, or other such data associated with the computing device 1102.

Other system memory 1114 can be available for use as well. The memory 1114 can include multiple different types of memory with different performance characteristics. The processor 1104 can include any general purpose processor and one or more hardware or software services, such as service 1112 stored in storage device 1110, configured to control the processor 1104 as well as a special-purpose processor where software instructions are incorporated into the actual processor design. The processor 1104 can be a completely self-contained computing system, containing multiple cores or processors, connectors (e.g., buses), memory, memory controllers, caches, etc. In some embodiments, such a self-contained computing system with multiple cores is symmetric. In some embodiments, such a self-contained computing system with multiple cores is asymmetric. In some embodiments, the processor 1104 can be a microprocessor, a microcontroller, a digital signal processor ("DSP"), or a combination of these and/or other types of processors. In some embodiments, the processor 1104 can include multiple elements such as a core, one or more registers, and one or more processing units such as an arithmetic logic unit (ALU), a floating point unit (FPU), a graphics processing unit (GPU), a physics processing unit (PPU), a digital system processing (DSP) unit, or combinations of these and/or other such processing units.

To enable user interaction with the computing system architecture 1100, an input device 1116 can represent any number of input mechanisms, such as a microphone for speech, a touch-sensitive screen for gesture or graphical input, keyboard, mouse, motion input, pen, and other such input devices. An output device 1118 can also be one or more of a number of output mechanisms known to those of skill in the art including, but not limited to, monitors, speakers, printers, haptic devices, and other such output devices. In some instances, multimodal systems can enable a user to provide multiple types of input to communicate with the computing system architecture 1100. In some embodiments, the input device 1116 and/or the output device 1118 can be coupled to the computing device 1102 using a remote connection device such as, for example, a communication interface such as the network interface 1120 described herein. In such embodiments, the communication interface can govern and manage the input and output received from the attached input device 1116 and/or output device 1118. As may be contemplated, there is no restriction on operating on any particular hardware arrangement and accordingly the basic features here may be substituted for other hardware, software, or firmware arrangements as they are developed.

In some embodiments, the storage device 1110 can be described as non-volatile storage or non-volatile memory. Such non-volatile memory or non-volatile storage can be a hard disk or other types of computer readable media which can store data that are accessible by a computer, such as magnetic cassettes, flash memory cards, solid state memory devices, digital versatile disks, cartridges, RAM, ROM, and hybrids thereof.

As described herein, the storage device 1110 can include hardware and/or software services such as service 1112 that can control or configure the processor 1104 to perform one or more functions including, but not limited to, the methods, processes, functions, systems, and services described herein in various embodiments. In some embodiments, the hardware or software services can be implemented as modules. As illustrated in example computing system architecture 1100, the storage device 1110 can be connected to other parts of the computing device 1102 using the system connection 1106. In an embodiment, a hardware service or hardware module such as service 1112, that performs a function can include a software component stored in a non-transitory computer-readable medium that, in connection with the necessary hardware components, such as the processor 1104, connection 1106, cache 1108, storage device 1110, memory 1114, input device 1116, output device 1118, and so forth, can carry out the functions such as those described herein.

The disclosed gifting service system and the associated systems and methods for providing a consumer with an option to send a gift received as the result of a purchase from a retailer to a separate recipient may be performed using a computing system such as the example computing system illustrated in FIG. 11, using one or more components of the example computing system architecture 1100. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device.

In some embodiments, the processor can be configured to carry out some or all of methods and systems described herein by, for example, executing code using a processor such as processor 1104 wherein the code is stored in memory such as memory 1114 as described herein. One or more of a user device, a provider server or system, a database system, or other such devices, services, or systems may include some or all of the components of the computing system such as the example computing system illustrated in FIG. 11, using one or more components of the example computing system architecture 1100 illustrated herein. As may be contemplated, variations on such systems can be considered as within the scope of the present disclosure.

This disclosure contemplates the computer system taking any suitable physical form. As example and not by way of limitation, the computer system can be an embedded computer system, a system-on-chip (SOC), a single-board computer system (SBC) (such as, for example, a computer-on-module (COM) or system-on-module (SOM)), a desktop computer system, a laptop or notebook computer system, a tablet computer system, a wearable computer system or interface, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud computing system which may include one or more cloud components in one or more networks as described herein in association with the computing resources provider 1128. Where appropriate, one or more computer systems may perform without substantial spatial or temporal limitation one or more steps of one or more methods described or illustrated herein. As an example and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor 1104 can be a conventional microprocessor such as an Intel® microprocessor, an AMD® microprocessor, a Motorola® microprocessor, or other such microprocessors. One of skill in the relevant art will recognize that the terms "machine-readable (storage) medium" or "computer-readable (storage) medium" include any type of device that is accessible by the processor.

The memory 1114 can be coupled to the processor 1104 by, for example, a connector such as connector 1106, or a bus. As used herein, a connector or bus such as connector 1106 is a communications system that transfers data between components within the computing device 1102 and may, in some embodiments, be used to transfer data between computing devices. The connector 1106 can be a data bus, a memory bus, a system bus, or other such data transfer mechanism. Examples of such connectors include, but are not limited to, an industry standard architecture (ISA" bus, an extended ISA (EISA) bus, a parallel AT attachment (PATA" bus (e.g., an integrated drive electronics (IDE) or an extended IDE (EIDE) bus), or the various types of parallel component interconnect (PCI) buses (e.g., PCI, PCIe, PCI-104, etc.).

The memory 1114 can include RAM including, but not limited to, dynamic RAM (DRAM), static RAM (SRAM), synchronous dynamic RAM (SDRAM), non-volatile random access memory (NVRAM), and other types of RAM. The DRAM may include error-correcting code (EEC). The memory can also include ROM including, but not limited to, programmable ROM (PROM), erasable and programmable ROM (EPROM), electronically erasable and programmable ROM (EEPROM), Flash Memory, masked ROM (MROM), and other types or ROM. The memory 1114 can also include magnetic or optical data storage media including read-only (e.g., CD ROM and DVD ROM) or otherwise (e.g., CD or DVD). The memory can be local, remote, or distributed.

As described herein, the connector 1106 (or bus) can also couple the processor 1104 to the storage device 1110, which may include non-volatile memory or storage and which may also include a drive unit. In some embodiments, the non-volatile memory or storage is a magnetic floppy or hard disk, a magnetic-optical disk, an optical disk, a ROM (e.g., a CD-ROM, DVD-ROM, EPROM, or EEPROM), a magnetic or optical card, or another form of storage for data. Some of this data is may be written, by a direct memory access process, into memory during execution of software in a computer system. The non-volatile memory or storage can be local, remote, or distributed. In some embodiments, the non-volatile memory or storage is optional. As may be contemplated, a computing system can be created with all applicable data available in memory. A typical computer system will usually include at least one processor, memory, and a device (e.g., a bus) coupling the memory to the processor.

Software and/or data associated with software can be stored in the non-volatile memory and/or the drive unit. In some embodiments (e.g., for large programs) it may not be possible to store the entire program and/or data in the memory at any one time. In such embodiments, the program and/or data can be moved in and out of memory from, for example, an additional storage device such as storage device 1110. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The connection 1106 can also couple the processor 1104 to a network interface device such as the network interface 1120. The interface can include one or more of a modem, network interface card (NIC), or other such network interfaces including, but not limited to those described herein. It will be appreciated that the network interface 1120 may be considered to be part of the computing device 1102 or may be separate from the computing device 1102. The network interface 1120 can include one or more of an analog modem, Integrated Services Digital Network (ISDN) modem, cable modem, token ring interface, satellite transmission interface, or other interfaces for coupling a computer system to other computer systems. In some embodiments, the network interface 1120 can include one or more input and/or output (I/O) devices. The I/O devices can include, by way of example but not limitation, input devices such as input device 1116 and/or output devices such as output device 1118. For example, the network interface 1120 may include a keyboard, a mouse, a printer, a scanner, a display device, and other such components. Other examples of input devices and output devices are described herein. In some embodiments, a communication interface device can be implemented as a complete and separate computing device.

In operation, the computer system can be controlled by operating system software that includes a file management system, such as a disk operating system. One example of operating system software with associated file management system software is the family of Windows® operating systems and their associated file management systems. Another example of operating system software with its associated file management system software is the Linux™ operating system and its associated file management system including, but not limited to, the various types and implementations of the Linux® operating system and their associated file management systems. The file management system can be stored in the non-volatile memory and/or drive unit and can cause the processor to execute the various acts required by the operating system to input and output data and to store data in the memory, including storing files on the non-volatile memory and/or drive unit. As may be contemplated, other types of operating systems such as, for example, MacOS®, other types of UNIX® operating systems (e.g., BSD™ and descendants, Xenix™ SunOS™, HP-UX®, etc.), mobile operating systems (e.g., iOS® and variants, Chrome®, Ubuntu Touch®, watchOS®, Windows 10 Mobile®, the Blackberry® OS, etc.), and real-time operating systems (e.g., VxWorks®, QNX®, eCos®, RTLinux®, etc.) may be considered as within the scope of the present disclosure. As may be contemplated, the names of operating systems, mobile operating systems, real-time operating systems, languages, and devices, listed herein may be registered trademarks, service marks, or designs of various associated entities.

In some embodiments, the computing device 1102 can be connected to one or more additional computing devices such as computing device 1124 via a network 1122 using a connection such as the network interface 1120. In such embodiments, the computing device 1124 may execute one or more services 1126 to perform one or more functions under the control of, or on behalf of, programs and/or services operating on computing device 1102. In some embodiments, a computing device such as computing device 1124 may include one or more of the types of components as described in connection with computing device 1102 including, but not limited to, a processor such as processor 1104, a connection such as connection 1106, a cache such as cache 1108, a storage device such as storage device 1110, memory such as memory 1114, an input device such as input device 1116, and an output device such as output device 1118. In such embodiments, the computing device 1124 can carry out the functions such as those described herein in connection with computing device 1102. In some embodiments, the computing device 1102 can be connected to a plurality of computing devices such as computing device 1124, each of which may also be connected to a plurality of computing devices such as computing device 1124. Such an embodiment may be referred to herein as a distributed computing environment.

The network 1122 can be any network including an internet, an intranet, an extranet, a cellular network, a Wi-Fi network, a local area network (LAN), a wide area network (WAN), a satellite network, a Bluetooth® network, a virtual private network (VPN), a public switched telephone network, an infrared (IR) network, an internet of things (IoT network) or any other such network or combination of networks. Communications via the network 1122 can be wired connections, wireless connections, or combinations thereof. Communications via the network 1122 can be made via a variety of communications protocols including, but not limited to, Transmission Control Protocol/Internet Protocol (TCP/IP), User Datagram Protocol (UDP), protocols in various layers of the Open System Interconnection (OSI) model, File Transfer Protocol (FTP), Universal Plug and Play (UPnP), Network File System (NFS), Server Message Block (SMB), Common Internet File System (CIFS), and other such communications protocols.

Communications over the network 1122, within the computing device 1102, within the computing device 1124, or within the computing resources provider 1128 can include information, which also may be referred to herein as content. The information may include text, graphics, audio, video, haptics, and/or any other information that can be provided to a user of the computing device such as the computing device 1102. In an embodiment, the information can be delivered using a transfer protocol such as Hypertext Markup Language (HTML), Extensible Markup Language (XML), JavaScript®, Cascading Style Sheets (CSS), JavaScript® Object Notation (JSON), and other such protocols and/or structured languages. The information may first be processed by the computing device 1102 and presented to a user of the computing device 1102 using forms that are perceptible via sight, sound, smell, taste, touch, or other such mechanisms. In some embodiments, communications over the network 1122 can be received and/or processed by a computing device configured as a server. Such communications can be sent and received using PHP: Hypertext Preprocessor ("PHP"), Python™, Ruby, Perl® and variants, Java®, HTML, XML, or another such server-side processing language.

In some embodiments, the computing device 1102 and/or the computing device 1124 can be connected to a computing resources provider 1128 via the network 1122 using a network interface such as those described herein (e.g. network interface 1120). In such embodiments, one or more systems (e.g., service 1130 and service 1132) hosted within the computing resources provider 1128 (also referred to herein as within "a computing resources provider environment") may execute one or more services to perform one or more functions under the control of, or on behalf of, programs and/or services operating on computing device 1102 and/or computing device 1124. Systems such as service 1130 and service 1132 may include one or more computing devices such as those described herein to execute computer code to perform the one or more functions under the control of, or on behalf of, programs and/or services operating on computing device 1102 and/or computing device 1124.

For example, the computing resources provider 1128 may provide a service, operating on service 1130 to store data for the computing device 1102 when, for example, the amount of data that the computing device 1102 attempts to store exceeds the capacity of storage device 1110. In another example, the computing resources provider 1128 may provide a service to first instantiate a virtual machine (VM) on service 1132, use that VM to access the data stored on service 1132, perform one or more operations on that data, and provide a result of those one or more operations to the computing device 1102. Such operations (e.g., data storage and VM instantiation) may be referred to herein as operating "in the cloud," "within a cloud computing environment," or "within a hosted virtual machine environment," and the computing resources provider 1128 may also be referred to herein as "the cloud." Examples of such computing resources providers include, but are not limited to Amazon® Web Services (AWS®), Microsoft's Azure®, IBM Cloud®, Google Cloud®, Oracle Cloud® etc.

Services provided by a computing resources provider 1128 include, but are not limited to, data analytics, data storage, archival storage, big data storage, virtual computing (including various scalable VM architectures), blockchain services, containers (e.g., application encapsulation), database services, development environments (including sandbox development environments), e-commerce solutions, game services, media and content management services, security services, serverless hosting, virtual reality (VR) systems, and augmented reality (AR) systems. Various techniques to facilitate such services include, but are not be limited to, virtual machines, virtual storage, database services, system schedulers (e.g., hypervisors), resource management systems, various types of short-term, mid-term, long-term, and archival storage devices, etc.

As may be contemplated, the systems such as service 1130 and service 1132 may implement versions of various services (e.g., the service 1112 or the service 1126) on behalf of, or under the control of, computing device 1102 and/or computing device 1124. Such implemented versions of various services may involve one or more virtualization techniques so that, for example, it may appear to a user of computing device 1102 that the service 1112 is executing on the computing device 1802 when the service is executing on, for example, service 1130. As may also be contemplated, the various services operating within the computing resources provider 1128 environment may be distributed among various systems within the environment as well as partially distributed onto computing device 1124 and/or computing device 1102.

In an embodiment, the computing device 1102 can be connected to one or more additional computing devices and/or services such as merchant computing device 1136 and/or a point-of-sale service 1134 via the network 1122 and using a connection such as the network interface 1120. In an embodiment, the point-of-sale service 1134 is separate from the merchant computing device 1136. In an embodiment, the point-of-sale service 1134 is executing on the merchant computing device 1136. In an embodiment, the point-of-sale service 1134 is executing as one or more services (e.g., the service 1130 and/or the service 1132) operating within the environment of the computing resources provider. As used herein, a point-of-sale service 1134 is a service used by one or more merchants to manage sales transactions for customers, to process payment transactions for customers (e.g., credit card transactions), to manage inventory for merchants, to identify customers based on, for example, customer loyalty programs, and other such tasks.

In an embodiment, a customer and/or a merchant uses the merchant computing device 1136 to interact with the point-of-sale service 1134. In an embodiment, the merchant computing device 1136 is a dedicated point-of-service (POS) terminal. In an embodiment, the merchant computing device 1136 is a cash register system. In an embodiment, the merchant computing device 1136 is an application or web service operating on a computing device such as the computing device 1102 described herein. In such an embodiment, the application or web service may be provided by a financial services system (e.g., a bank, a transaction processing system, an inventory management system, or some other such financial services system). In an embodiment, the merchant computing device 1136 includes an auxiliary device or system to execute tasks associated with the point-of-sale service 1134 (e.g., a credit card processing device attached to a smart phone or tablet). In an embodiment, the merchant computing device 1136 is a kiosk that is located at a merchant location (e.g., in a merchant's "brick and mortar" store), in a high traffic area (e.g., in a mall or in an airport concourse), or at some other such location. In such an embodiment, the kiosk may include additional branding elements to allow associating the kiosk with a vendor or retailer. In an embodiment, the merchant computing device 1136 is a virtual device (e.g., a virtual kiosk) such as the virtual devices described herein. Although not illustrated here, in an embodiment, the merchant computing device 1136 may be one of a plurality of devices that may be interconnected using a network such as the network 1122.

Client devices, user devices, computer resources provider devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things such as those described herein. The input devices can include, for example, a keyboard, a mouse, a keypad, a touch interface, a microphone, a camera, and/or other types of input devices including, but not limited to, those described herein. The output devices can include, for example, a display screen, a speaker, a haptic feedback system, a printer, and/or other types of output devices including, but not limited to, those described herein. A data storage device, such as a hard drive or flash memory, can enable the computing device to store data temporarily or permanently.

A network interface, such as a wireless or wired interface, can enable the computing device to communicate with a network. Examples of computing devices (e.g., the computing device 1102) include, but are not limited to, desktop computers, laptop computers, server computers, hand-held computers, tablets, smart phones, personal digital assistants, digital home assistants, wearable devices, smart devices, and combinations of these and/or other such computing devices as well as machines and apparatuses in which a computing device has been incorporated and/or virtually implemented.

The techniques described herein may also be implemented in electronic hardware, computer software, firmware, or any combination thereof. Such techniques may be implemented in any of a variety of devices such as general purpose computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described herein. The computer-readable data storage medium may form part of a computer program product, which may include packaging materials. The computer-readable medium may comprise memory or data storage media, such as that described herein. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices (e.g., a combination of a DSP and a microprocessor), a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update system.

As used herein, the term "machine-readable media" and equivalent terms "machine-readable storage media," "computer-readable media," and "computer-readable storage media" refer to media that includes, but is not limited to, portable or non-portable storage devices, optical storage devices, removable or non-removable storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), solid state drives (SSD), flash memory, memory or memory devices.

A machine-readable medium or machine-readable storage medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like. Further examples of machine-readable storage media, machine-readable media, or computer-readable (storage) media include but are not limited to recordable type media such as volatile and non-volatile memory devices, floppy and other removable disks, hard disk drives, optical disks (e.g., CDs, DVDs, etc.), among others, and transmission type media such as digital and analog communication links.

As may be contemplated, while examples herein may illustrate or refer to a machine-readable medium or machine-readable storage medium as a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the system and that cause the system to perform any one or more of the methodologies modules of disclosed herein.

Some portions of the detailed description herein may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

It is also noted that individual implementations may be described as a process which is depicted as a flowchart, a flow diagram, a data flow diagram, a structure diagram, or a block diagram. Although a flowchart, a flow diagram, a data flow diagram, a structure diagram, or a block diagram may describe the operations as a sequential process, many of the operations can be performed in parallel or concurrently. In addition, the order of the operations may be re-arranged. A process illustrated in a figure is terminated when its operations are completed, but could have additional steps not included in the figure. A process may correspond to a method, a function, a procedure, a subroutine, a subprogram, etc. When a process corresponds to a function, its termination can correspond to a return of the function to the calling function or the main function.

In some embodiments, one or more implementations of an algorithm such as those described herein may be implemented using a machine learning or artificial intelligence algorithm. Such a machine learning or artificial intelligence algorithm may be trained using supervised, unsupervised, reinforcement, or other such training techniques. For example, a set of data may be analyzed using one of a variety of machine learning algorithms to identify correlations between different elements of the set of data without supervision and feedback (e.g., an unsupervised training technique). A machine learning data analysis algorithm may also be trained using sample or live data to identify potential correlations. Such algorithms may include k-means clustering algorithms, fuzzy c-means (FCM) algorithms, expectation-maximization (EM) algorithms, hierarchical clustering algorithms, density-based spatial clustering of applications with noise (DBSCAN) algorithms, and the like. Other examples of machine learning or artificial intelligence algorithms include, but are not limited to, genetic algorithms, backpropagation, reinforcement learning, decision trees, liner classification, artificial neural networks, anomaly detection, and such. More generally, machine learning or artificial intelligence methods may include regression analysis, dimensionality reduction, metalearning, reinforcement learning, deep learning, and other such algorithms and/or methods. As may be contemplated, the terms "machine learning" and "artificial intelligence" are frequently used interchangeably due to the degree of overlap between these fields and many of the disclosed techniques and algorithms have similar approaches.

As an example of a supervised training technique, a set of data can be selected for training of the machine learning model to facilitate identification of correlations between members of the set of data. The machine learning model may be evaluated to determine, based on the sample inputs supplied to the machine learning model, whether the machine learning model is producing accurate correlations between members of the set of data. Based on this evaluation, the machine learning model may be modified to increase the likelihood of the machine learning model identifying the desired correlations. The machine learning model may further be dynamically trained by soliciting feedback from users of a system as to the efficacy of correlations provided by the machine learning algorithm or artificial intelligence algorithm (i.e., the supervision). The machine learning algorithm or artificial intelligence may use this feedback to improve the algorithm for generating correlations (e.g., the feedback may be used to further train the machine learning algorithm or artificial intelligence to provide more accurate correlations).

The various examples of flowcharts, flow diagrams, data flow diagrams, structure diagrams, or block diagrams discussed herein may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments) such as those described herein. A processor(s), implemented in an integrated circuit, may perform the necessary tasks.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

It should be noted, however, that the algorithms and displays presented herein are not inherently related to any particular computer or other apparatus. Various general purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC (e.g., an iPad®, a Microsoft Surface®, a Chromebook®, etc.), a laptop computer, a set-top box (STB), a personal digital assistant (PDA), a mobile device (e.g., a cellular telephone, an iPhone®, and Android® device, a Blackberry®, etc.), a wearable device, an embedded computer system, an electronic book reader, a processor, a telephone, a web appliance, a network router, switch or bridge, or any system capable of executing a set of instructions (sequential or otherwise) that specify actions to be taken by that system. The system may also be a virtual system such as a virtual version of one of the aforementioned devices that may be hosted on another computer device such as the computer device 1802.

In general, the routines executed to implement the implementations of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually effect the distribution.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting or restricting the subject matter to the precise forms disclosed. Persons skilled in the relevant art can appreciate that many modifications and variations are possible in light of the above disclosure and may be made thereto without departing from the broader scope of the embodiments as set forth herein. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

As used herein, the terms "a" and "an" and "the" and other such singular referents are to be construed to include both the singular and the plural, unless otherwise indicated herein or clearly contradicted by context.

As used herein, the terms "comprising," "having," "including," and "containing" are to be construed as open-ended (e.g., "including" is to be construed as "including, but not limited to"), unless otherwise indicated or clearly contradicted by context.

As used herein, the recitation of ranges of values is intended to serve as a shorthand method of referring individually to each separate value falling within the range, unless otherwise indicated or clearly contradicted by context. Accordingly, each separate value of the range is incorporated into the specification as if it were individually recited herein.

As used herein, use of the terms "set" (e.g., "a set of items") and "subset" (e.g., "a subset of the set of items") is to be construed as a nonempty collection including one or more members unless otherwise indicated or clearly contradicted by context. Furthermore, unless otherwise indicated or clearly contradicted by context, the term "subset" of a corresponding set does not necessarily denote a proper subset of the corresponding set but that the subset and the set may include the same elements (i.e., the set and the subset may be the same).

As used herein, use of conjunctive language such as "at least one of A, B, and C" is to be construed as indicating one or more of A, B, and C (e.g., any one of the following nonempty subsets of the set {A, B, C}, namely: {A}, {B}, {C}, {A, B}, {A, C}, {B, C}, or {A, B, C}) unless otherwise indicated or clearly contradicted by context. Accordingly, conjunctive language such as "as least one of A, B, and C" does not imply a requirement for at least one of A, at least one of B, and at least one of C.

As used herein, the use of examples or exemplary language (e.g., "such as" or "as an example") is intended to illustrate embodiments more clearly and does not impose a limitation on the scope unless otherwise claimed. Such language in the specification should not be construed as indicating any non-claimed element is required for the practice of the embodiments described and claimed in the present disclosure.

As used herein, where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described herein. The elements and acts of the various examples described herein can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described herein to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described herein may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use.

What is claimed is:

1. A computer-implemented method, comprising:
   receiving a gift order;
   analyzing consumer information using a redemption options algorithm to generate redemption options including an alternate redemption option, wherein the redemption options are generated as the consumer information is being received in real-time, wherein the redemption options algorithm is a clustering machine-learning algorithm, wherein analyzing the consumer information includes using the redemption options algorithm to identify the redemption options specified by a cluster of a set of clusters, and wherein the cluster includes characteristics that are associated with the consumer information;
   providing an initial gift notification based on the gift order, wherein the initial gift notification includes the redemption options and the alternate redemption option, and wherein when the initial gift notification is received, a recipient device generates an alternate redemption request;
   receiving the alternate redemption request;
   transmitting an alternate redemption information request;
   receiving alternate redemption information;
   adding the alternate redemption information to the consumer information to obtain updated consumer information;
   generating in real-time a training dataset based on the updated consumer information, wherein generating the training dataset includes associating the alternate redemption information of the updated consumer information with a corresponding outcome label, and wherein the corresponding outcome label is determined based on one or more operations performed by the recipient device;
   training the redemption options algorithm using the training dataset to obtain an updated redemption options algorithm, wherein the redemption options algorithm is trained using an unsupervised training technique as the alternate redemption information is being added to the consumer information in real-time, and wherein the redemption options algorithm is trained to increase a likelihood of future alternate redemption options being selected by the recipient device; and performing an alternate redemption action set using the alternate redemption information.

2. The computer-implemented method of claim 1, wherein the alternate redemption information includes a regift recipient identifier, and wherein performing the alternate redemption action set includes transmitting an updated gift notification using the regift recipient identifier.

3. The computer-implemented method of claim 1, wherein the alternate redemption information includes a regift recipient identifier, and wherein performing the alternate redemption action set includes delivering a gift to a regift recipient associated with the regift recipient identifier based on the alternate redemption information.

4. The computer-implemented method of claim 1, wherein performing the alternate redemption action set includes transmitting a gift redemption information request including a plurality of gift customization options.

5. The computer-implemented method of claim 1, wherein performing the alternate redemption action set includes transmitting a gift redemption information request including an alternate gift option.

6. The computer-implemented method of claim 1, further comprising:
decrementing, in response to receiving the alternate redemption request, a regift counter,
wherein the regift counter is initially set to a maximum allowed regifts quantity, and
wherein, when the regift counter reaches zero, no additional regift offers are presented in association with a gift corresponding to the gift order.

7. The computer-implemented method of claim 1, wherein the alternate redemption request includes a donation request.

8. The computer-implemented method of claim 1, wherein the alternate redemption information request includes a plurality of donation recipient options, and the plurality of donation recipient options are determined by a gifting entity associated with the gift order.

9. The computer-implemented method of claim 1, wherein performing the alternate redemption action set includes transmitting a donation information set associated with the gift order, wherein the donation information set comprises a donation recipient selection, and wherein, when the donation information set is received at a gifting entity device, a gifting entity associated with the gifting entity device initiates a donation using the donation recipient selection.

10. The computer-implemented method of claim 1, wherein the alternate redemption information includes a donation recipient selection, and performing the alternate redemption action set includes initiating a donation based on the donation recipient selection, wherein the donation is based on a value of a gift associated with the gift order.

11. The computer-implemented method of claim 1, wherein the alternate redemption information includes a donation recipient selection, and performing the alternate redemption action set includes transmitting donation information, wherein when the donation information is received at the recipient device, a recipient associated with the recipient device initiates a donation using the donation information.

12. The computer-implemented method of claim 1, wherein the alternate redemption information includes a donation recipient selection, and performing the alternate redemption action set comprises:

determining a value of a gift associated with the gift order;
determining an alternate value representation based on the value and the donation recipient selection; and
transmitting the alternate value representation to the recipient device.

13. The computer-implemented method of claim 1, wherein performing the alternate redemption action set comprises:
determining a difference between a value of a gift associated with the gift order and a redeemed gift associated with the alternate redemption information to obtain a value difference; and
transmitting a donation option to a gifting entity device associated with the gift order, wherein the donation option facilitates a donation of the value difference by a gifting entity associated with the gifting entity device.

14. The computer-implemented method of claim 1, wherein performing the alternate redemption action set comprises:
determining a difference between a value of a gift associated with the gift order and a redeemed gift associated with the alternate redemption information to obtain a value difference; and
transmitting a donation option to the recipient device, wherein the donation option facilitates a donation of the value difference by a recipient associated with the recipient device.

15. The computer-implemented method of claim 1, wherein the redemption options algorithm generates the alternate redemption option when the gift order was submitted within a particular time range.

16. The computer-implemented method of claim 1, wherein the redemption options algorithm generates the alternate redemption option when a gift associated a gift order is associated with a particular gift type.

17. The computer-implemented method of claim 1, wherein the alternate redemption action set is performed without notifying a gifting entity associated with the gift order.

18. The computer-implemented method of claim 1, wherein the consumer information includes interactions between the recipient device and one or more gifting entities associated with the gift order.

19. A system, comprising:
one or more processors; and
memory storing thereon instructions that, as a result of being executed by the one or more processors, cause the system to:
receive a gift order;
analyze consumer information using a redemption options algorithm to generate redemption options including an alternate redemption option, wherein the redemption options are generated as the consumer information is being received in real-time, wherein the redemption options algorithm is a clustering machine-learning algorithm, wherein analyzing the consumer information includes using the redemption options algorithm to identify the redemption options specified by a cluster of a set of clusters, and wherein the cluster includes characteristics that are associated with the consumer information;
provide an initial gift notification based on the gift order, wherein the initial gift notification includes the redemption options and the alternate redemption option, and wherein when the initial gift notification is received, a recipient device generates an alternate redemption request;

receive the alternate redemption request;

transmit an alternate redemption information request;

receive alternate redemption information;

add the alternate redemption information to the consumer information to obtain updated consumer information;

generate in real-time a training dataset based on the updated consumer information, wherein generating the training dataset includes associating the alternate redemption information of the updated consumer information with a corresponding outcome label, and wherein the corresponding outcome label is determined based on one or more operations performed by the recipient device;

train the redemption options algorithm using the training dataset to obtain an updated redemption options algorithm, wherein the redemption options algorithm is trained using an unsupervised training technique as the alternate redemption information is being added to the consumer information in real-time, and wherein the redemption options algorithm is trained to increase a likelihood of future alternate redemption options being selected by the recipient device; and perform an alternate redemption action set using the alternate redemption information.

20. The system of claim 19, wherein the alternate redemption information includes a regift recipient identifier, and wherein performing the alternate redemption action set includes transmitting an updated gift notification using the regift recipient identifier.

21. The system of claim 19, wherein the memory stores further instructions that, as a result of being executed by the one or more processors, cause the system to:
decrement, in response to receiving the alternate redemption request, a regift counter,
wherein the regift counter is initially set to a maximum allowed regifts quantity, and
wherein, when the regift counter reaches zero, no additional regift offers are presented in association with a gift corresponding to the gift order.

22. The system of claim 19, wherein the alternate redemption request includes a donation request.

23. The system of claim 19, wherein the alternate redemption information request includes a plurality of donation recipient options, and the plurality of donation recipient options are determined by a gifting entity associated with the gift order.

24. The system of claim 19, wherein the redemption options algorithm generates the alternate redemption option when the gift order was submitted within a particular time range.

25. The system of claim 19, wherein the redemption options algorithm generates the alternate redemption option when a gift associated a gift order is associated with a particular gift type.

26. The system of claim 19, wherein the alternate redemption action set is performed without notifying a gifting entity associated with the gift order.

27. The system of claim 19, wherein the consumer information includes interactions between the recipient device and one or more gifting entities associated with the gift order.

28. A non-transitory, computer-readable storage medium storing thereon executable instructions that, as a result of being executed by a computer system, cause the computer system to:

receive a gift order;

analyze consumer information using a redemption options algorithm to generate redemption options including an alternate redemption option, wherein the redemption options are generated as the consumer information is being received in real-time, wherein the redemption options algorithm is a clustering machine-learning algorithm, wherein analyzing the consumer information includes using the redemption options algorithm to identify the redemption options specified by a cluster of a set of clusters, and wherein the cluster includes characteristics that are associated with the consumer information;

provide an initial gift notification based on the gift order, wherein the initial gift notification includes the redemption options and the alternate redemption option, and wherein when the initial gift notification is received, a recipient device generates an alternate redemption request;

receive the alternate redemption request;

transmit an alternate redemption information request;

receive alternate redemption information;

add the alternate redemption information to the consumer information to obtain updated consumer information;

generate in real-time a training dataset based on the updated consumer information, wherein generating the training dataset includes associating the alternate redemption information of the updated consumer information with a corresponding outcome label, and wherein the corresponding outcome label is determined based on one or more operations performed by the recipient device;

train the redemption options algorithm using the training dataset to obtain an updated redemption options algorithm, wherein the redemption options algorithm is trained using an unsupervised training technique as the alternate redemption information is being added to the consumer information in real-time, and wherein the redemption options algorithm is trained to increase a likelihood of future alternate redemption options being selected by the recipient device; and perform an alternate redemption action set using the alternate redemption information.

29. The non-transitory, computer-readable storage medium of claim 28, wherein the redemption options algorithm generates the alternate redemption option when the gift order was submitted within a particular time range.

30. The non-transitory, computer-readable storage medium of claim 28, wherein the redemption options algorithm generates the alternate redemption option when a gift associated a gift order is associated with a particular gift type.

31. The non-transitory, computer-readable storage medium of claim 28, wherein the alternate redemption action set is performed without notifying a gifting entity associated with the gift order.

32. The non-transitory, computer-readable storage medium of claim 28, wherein the consumer information includes interactions between the recipient device and one or more gifting entities associated with the gift order.

* * * * *